US012709233B2

(12) United States Patent
Kvarnvik et al.

(10) Patent No.: US 12,709,233 B2
(45) Date of Patent: Aug. 18, 2026

(54) LOAD CARRIER SYSTEM FOR A MOTOR VEHICLE

(71) Applicant: Thule Sweden AB, Hillerstorp (SE)

(72) Inventors: Gustav Kvarnvik, Åsenhöga (SE); Filip Nyström, Värnamo (SE); Renee Slagter, Eindhoven (NL)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 18/686,809

(22) PCT Filed: Jul. 8, 2022

(86) PCT No.: PCT/EP2022/069141
§ 371 (c)(1),
(2) Date: Feb. 26, 2024

(87) PCT Pub. No.: WO2023/006388
PCT Pub. Date: Feb. 2, 2023

(65) Prior Publication Data

US 2025/0001950 A1 Jan. 2, 2025

(30) Foreign Application Priority Data

Jul. 26, 2021 (EP) .................................... 21187657

(51) Int. Cl.
*B60R 9/06* (2006.01)
*B62D 35/00* (2006.01)

(52) U.S. Cl.
CPC ............ *B60R 9/065* (2013.01); *B62D 35/007* (2013.01)

(58) Field of Classification Search
CPC .. B60R 9/06; B60R 9/065; B60R 9/10; B62D 35/007; B60P 3/127
USPC ....... 224/517, 518, 412, 413, 488, 547, 519, 224/520, 539, 541, 540
See application file for complete search history.

(56) References Cited

U.S. PATENT DOCUMENTS 5,439,151 A 8/1995 Clayton
5,460,304 A 10/1995 Porter et al.
6,036,070 A * 3/2000 Gauthier ................ B60R 9/065 224/527

(Continued)

FOREIGN PATENT DOCUMENTS

DE 19855776 A1 6/2000

OTHER PUBLICATIONS

International Search Report and Written Opinion of the International Searching Authority for PCT/EP2022/069141, mailed on Nov. 9, 2022, 12 pages.

*Primary Examiner* — Jack W Lavinder
(74) *Attorney, Agent, or Firm* — Sterne, Kessler, Goldstein & Fox P.L.L.C.

(57) ABSTRACT

The present invention relates to a load carrier system for a vehicle comprising a base (12) and a load carrier (10). The load carrier (10) is configured for mounting to the rear of the vehicle. The load carrier (10) is configured to improve aerodynamics of the vehicle with the mounted load carrier as compared to the vehicle without the mounted load carrier, in particular by reducing an aerodynamic drag. The system may be configured for attachment of the load carrier (10) to the base (12) with an interlocking engagement of an attachment element (66). The invention further relates to a load carrier (10) and a method for attaching a load carrier (10) to a baser (12).

28 Claims, 22 Drawing Sheets

(56) References Cited

U.S. PATENT DOCUMENTS

| | | | | |
|---|---|---|---|---|
| 6,202,909 | B1 | 3/2001 | Belinky et al. | |
| 8,646,668 | B2 * | 2/2014 | Oakes | B60R 9/065 224/539 |
| 2004/0164113 | A1 * | 8/2004 | Thomas | B62J 9/00 224/413 |
| 2008/0011796 | A1 | 1/2008 | Threet et al. | |
| 2012/0325876 | A1 * | 12/2012 | Hill | B65F 1/1452 224/401 |
| 2013/0068813 | A1 * | 3/2013 | Choates | B62J 9/27 224/413 |
| 2016/0129847 | A1 * | 5/2016 | Mehlen | B60D 1/58 224/509 |
| 2019/0193621 | A1 | 6/2019 | Ayoub | |

* cited by examiner 300
200
204
38
10
16
14
64
64
60
58

10
14
614
54
614

LOAD CARRIER SYSTEM FOR A MOTOR VEHICLE

TECHNICAL FIELD

The present disclosure relates to a load carrier system for a vehicle, such as a motor vehicle. The present disclosure also relates to a load carrier, for example configured for mounting to the rear of a vehicle and/or configured for attachment to the vehicle via a base, and to a method of attaching a load carrier to a base.

PRIOR ART

Load carriers are available in a wide range of forms and sizes to provide additional external storage on a car. For example, load carriers allow skis to be safely stored and transported on a roof of a vehicle. As another example, load carriers allow extensive camping equipment to be safely stored and transported at the rear of a vehicle when interior cargo space is insufficient in the vehicle.

For this purpose, the load carrier needs to be securely attachable to a vehicle. In particular, when driving at a high speed with a heavy load, strong forces may act on the load carrier. Attachment of the load carrier to the vehicle needs to withstand these forces, which may result in an attachment concept that is difficult to handle and heavy.

Further, load carriers may cause additional air resistance when driving with the vehicle. A mounted load carrier also enlarges overall exterior dimensions of the vehicle, which may complicate maneuvering and may render finding a parking spot more difficult.

Moreover, cost of load carriers needs to be low. Simultaneously, there is a need for load carriers adapted to specific needs of different users. For example, a single person will usually require a smaller load carrier than a large family. Similarly, a load carrier for transportation of bicycles is usually different than a load carrier for surfing equipment to facilitate handling of this sport equipment. Such adaptation results in a large variety of products but small quantities and high costs for each variety.

SUMMARY OF THE INVENTION

A first aspect relates to a load carrier system for a vehicle. The vehicle may be configured as a motor vehicle, such as a car or van, or as a mobile home. The load carrier system comprises a base and a load carrier. The base may be configured to support the load carrier. For example, the base may be permanently or removably attached to the vehicle. The load carrier may be configured for transportation and/or storage of goods, such as sport equipment, camping equipment and/or personal luggage. For example, the load carrier may comprise a clamp for attachment of a bicycle. The load carrier may be configured to provide an internal storage space. For example, the load carrier may comprise tub and a lid, which may be adjustable between an open and closed position. In the closed state, the tub and the lid may enclose an interior volume.

The system is configured for attachment of the load carrier to the base with an interlocking engagement of an attachment element. The attachment of the load carrier to the base may be detachable. The load carrier can thus be removed from the base. An interlocking engagement may be a positive locking of the attachment element in a corresponding receiving element. The attachment element may be a part of the base or the load carrier. The interlocking engagement may be configured as a snap-fit. The interlocking engagement may prevent movement of the load carrier relative to the base in an attachment position. The interlocking engagement may be configured to require certain engagement movements, such as a tilting and/or sliding movement, for example in a specific order. The engagement movement may be different to the direction of forces mainly acting on the load carrier during use. The interlocking engagement may be configured to require a certain deformation of the attachment element and/or the receiving element during engagement. For example, the attachment element may be deflected during engagement. The interlocking engagement may comprise a locking into place, for example due to the attachment element not being deflected anymore in the attached state. The system may be configured for attachment of the load carrier to the base with an interlocking engagement of multiple attachment elements. Correspondingly, attachment of the load carrier to the base can be provided by at least a first attachment element and a second attachment element brought into interlocking engagement with a common receiving element or a corresponding first receiving element and a corresponding second receiving element. The attachment elements may both be part of the base or load carrier or one attachment element may be part of the base and another of the load carrier. Multiple attachment elements may be arranged spaced apart to each other.

The interlocking engagement provides a very secure attachment of the load carrier to the base, which may withstand large forces and is easy to use. Due to the load carrier system, the load carrier can easily be exchanged, for example even while the base remains mounted to the vehicle. A user may exchange a variety of load carriers, for example switching from a load carrier configured for bicycles to a load carrier with an internal storage volume for luggage, while the same base is used for both. A modular system may therefore be provided for users that require different load carriers and/or frequent exchange of the load carriers that is low-cost since only one common base may be required.

In an embodiment of the system according to the first aspect, the attachment element is configured as a protruding part of the interlocking engagement. The receiving element may be configured to provide a corresponding recess or hole for insertion and engagement of the attachment element. Moreover, an undercut in the receiving element may be engaged by a section of the protruding attachment element. The protruding part is easy to identify and align for the engagement. For example, the attachment element may at least partially protrude from a body, wall element and/or frame of the load carrier.

In an embodiment of the system according to the first aspect, the attachment is configured as a bayonet joint and/or keyhole joint. A bayonet joint may be configured for a rotational attachment movement. The keyhole joint may be configured for a sliding attachment movement. For example, the receiving element may comprise a keyhole with a larger section and a smaller section. The larger section allows insertion of the attachment element. The attachment element is then slid to the smaller section, which retains the attachment element in the keyhole. Both the keyhole joint and the bayonet joint are intuitive to use and very secure against unwanted detachment. The attachment element may form part of the joint, in particular a protruding part.

A base side part of the keyhole joint may be a part attached to the frame forming the base. For example, the base side part may be received in a recess of a bar. The base side part may be attached by a screw. The base side part of the keyhole joint may be configured as the receiving element.

The attachment element may be configured as a screw element with a head protruding from a bottom of the load carrier. The head may be formed correspondingly to the base side part of the keyhole joint such that in an attached position extraction of the screw, in particular from the receiving element, along a longitudinal direction of the screw element is prevented. The screw element may be a cost-effective and robust attachment element.

In an embodiment of the system according to the first aspect, the system is configured for attachment of the load carrier to the base with at least a step of tilting the load carrier upwards relative to a mounted position into a tilted position and a step of inserting the attachment element of the load carrier into the base in the tilted position. Tilting may facilitate achieving an interlocking engagement. During normal use, no or only small forces act on a load carrier causing a tilting, so that a very secure attachment may be achieved. For example, for detachment, the load carrier needs to be tilted in the tilted position again. Otherwise, the interlocking engagement may block detachment. The tilted position may be a position in which the load carrier is not arranged with a floor in a substantially horizontal position and/or a bottom side of the load carrier is not arranged parallel to the base and/r wherein the interlocking engagement of the attachment element is not yet achieved and/or wherein the load carrier cannot be used for transportation of objects.

In an embodiment of the system according to the first aspect, the system is configured for attachment of the load carrier to the base with at least a step of tilting the load carrier downwards into alignment with a mounted position. For example, a user attaching the load carrier to the base may release the load carrier from the tilted position, which may cause gravity to pull the load carrier in the mounted position. The mounted position may be a position in which the load carrier is arranged with a floor in a substantially horizontal position and/or a bottom side of the load carrier is arranged parallel to the base and/or wherein the interlocking engagement of the attachment element is achieved and/or wherein the load carrier can be used for transportation of objects. Additionally or alternatively, the system may be configured for attachment of the load carrier to the base with at least a step of sliding the load carrier along the base into the mounted position. A sliding movement may be very easy and intuitive. In particular, the base may already support the load carrier during the sliding movement. The load carrier can be slid before, after and/or simultaneously with the tilting into alignment with the mounted position. The sliding movement may also be used to achieve interlocking engagement after the attachment element has been inserted into a keyhole.

In an embodiment of the system according to the first aspect, the base comprises a receiving element. The receiving element may be part of the base if the attachment element is part of the load carrier and vice versa. Such a configuration facilitates design of the interlocking attachment. The receiving element may be configured to enter into an interlocking engagement with the attachment element. The receiving element may have a hole and/or recess that corresponds in size and/or shape with the attachment element. The hole and/or recess may be configured to only allow insertion of the attachment element in a predetermined orientation and/or block insertion of the attachment in at least one orientation. The attachment element and/or the receiving element may have an undercut that forms part of the interlocking engagement when the load carrier is attached to the base. For example, the receiving element may be part of a body and/or frame of the base. The attachment element and/or the receiving element may be a separate part and/or replaceable in case of failure.

The load carrier system may be configured for insertion of the attachment element of the load carrier into the receiving element. Insertion can, for example, be achieved by a sliding movement and/or by moving the load carrier downwards towards the base. An attachment with the attachment element inserted in the receiving element may protect the attachment from manipulation, provide an overall smooth exterior and/or protect a user from pinching during attachment of the load carrier to the base.

In an embodiment of the system according to the first aspect, the base comprises a frame. The frame may extend in a forward-backward direction of the load carrier system, which may correspond to a forward-backward direction of a vehicle when mounted thereto. The frame can be formed by one or several rods and/or tubes. The rods and/or tubes may extend in the forward-backward direction and/or parallel to each other. For example, the tubes and/or rods may have a rectangular or round cross-section. The frame may be at least partially hollow. The frame may be made from metal. The frame may be configured to support the load carrier. The receiving element may be configured as part of the frame. For example, the receiving element can be a section or a complete tube or bar of the frame. A frame may result in a lightweight and sturdy base. It may not be necessary to provide the receiving element as a separate part if the receiving element is configured as part of the frame. The receiving element may be integral to the frame. The system thus may be manufactured in a cost-effective way.

The receiving element may be attached to the frame, for example welded, glued or screwed to the frame. As another example, the receiving element may be attached to the frame with a snap-connection. Such a connection is easy to assemble and disassemble. For example, the receiving element may snap into a receiving space of a bar of the base. The receiving element may be secured additionally to the snap-connection, for example with a screw.

In an embodiment of the system according to the first aspect, the receiving element is a hollow bar. The hollow bar may have at least one hole for insertion of the attachment element. The hole for insertion may be arranged at a top side of the hollow bar. The hole may be formed in a circumferential surface and/or an upper surface of the receiving element. The top side may be defined as a side facing upward and/or towards the load carrier when the base is mounted to the vehicle and/or when the load carrier is attached to the base. An arrangement of the hole at the top side may facilitate attachment of the load carrier to the base.

Alternatively or additionally, the receiving element may be attached to a hollow bar of the frame.

In an embodiment of the system according to the first aspect, the base comprises two receiving elements arranged parallel and spaced apart to each other. Correspondingly, the load carrier may comprise two attachment elements arranged parallel and spaced apart to each other. Attachment may be more secure, in particular being very resistant to unwanted rotation of the load carrier when attached to the base. If the two receiving elements are configured each as a part of the frame, for example as a hollow bar, the load carrier may provide a support that is very resistant to tilting forces acting on the load carrier.

In an embodiment of the system according to the first aspect, the receiving element forms a keyhole. For example, the keyhole may be formed by the hole at the top side of the hollow bar forming part of the frame.

In an embodiment of the system according to the first aspect, the receiving element has a sloped surface configured to guide the attachment element into the interlocking engagement with the base. For example, the sloped surface may be sloped downwards so that the load carrier resting thereon is guided downwards with its attachment element below a smaller section of a keyhole when sliding along the sloped surface.

In an embodiment of the system according to the first aspect, the attachment element is attached with an end to a body and/or support frame of the load carrier. Providing the attachment element to the load carrier may result in a larger space available for transporting objects than if the receiving element is provided to the load carrier. The attachment element may be attached to an outside of the body and/or support frame of the load carrier, for example without extending into an interior of the load carrier. The body may enclose the interior volume of the load carrier. For example, the body may be formed by a tub and a lid. The attachment element may be attached to the tub. The support frame of the load carrier may be formed by one or several rods and/or tubes. An opposing end of the attachment element may form a free end when the load carrier is not attached to the base. The opposing end may engage the receiving element when the load carrier is attached to the base.

In an embodiment of the system according to the first aspect, the attachment element comprises at least two flanges supporting the attachment element against the body and/or support frame of the load carrier and/or receiving element. For example, the two flanges may extend upwards when the load carrier is mounted in its intended use position. The two flanges may extend in the left-right direction. Another set of two flanges may extend downward when the load carrier is mounted in its intended use position. The other set of two may extend in the forward-backward direction and/or parallel to the receiving element. The flanges may be configured as integral walls of a unitarian attachment element or as a separate part, for example in the form of an injection-molded plastic part of metal part. The flanges may extend pairwise parallel to each other. The flanges may allow the attachment element to withstand higher forces, in particular forces causing the load carrier to twist around a horizontal axis on the base. Attachment may thus be more secure.

In an embodiment of the system according to the first aspect, the attachment element is attached to the body and/or support frame of the load carrier with an attachment device. The attachment device allows to replace and/or readjust the attachment element. For example, the attachment device may be configured as a screw connection or a clamping device. The attachment device may also be configured to engage the interlocking engagement of the load carrier to the base. For example, the attachment device may be tightened to bring the attachment element into interlocking engagement with the receiving element, in particular after the attachment element has been inserted into the receiving element. The attachment device may thus allow easy attachment and/or detachment of the load to the base.

In an embodiment of the system according to the first aspect, the attachment device is only accessible from an interior of the load carrier. Such a configuration may provide a simple theft prevention. For example, a lid of the load carrier needs to be opened before the attachment device can be accessed. Access to the attachment device may allow a user to untighten the attachment element from the interlocking engagement, thus allowing detachment of the load carrier from the base. For example, by simply locking a lid of the load carrier into a closed position, an unauthorized person may thus not remove the load carrier from the base.

In an embodiment of the system according to the first aspect, the attachment device is configured for providing a biased snap-in connection. Mounting the attachment element may thus be fast and easy.

In an embodiment of the system according to the first aspect, the attachment device comprises at least one of the following: a nut, a screw, a bolt or a tension lever. Screws and bolts are very cost-effective means for attaching the attachment element. A tension lever may provide easy and tool-free adjustment, for example to quickly bring the attachment element into interlocking engagement with the receiving element and/or to quickly disengage the attachment element from interlocking engagement with the receiving element.

In an embodiment of the system according to the first aspect, the system is configured for detachment of the load carrier from the base with at least a step of tilting the load carrier upwards out of alignment with the mounted position. Tilting for detachment is rarely or not caused at all by forces acting on the load carrier during normal use when attached to the vehicle via the base, resulting in a very secure attachment. Alternatively or additionally, the system is configured for detachment of the load carrier from the base with at least a step of sliding the attachment element out of the base in the tilted position. Sliding allows the base to further support the load carrier during detachment, allowing very comfortable detachment. For example, for detaching the load carrier from the base, the reverse steps as for attachment may be required. Detachment may thus be very intuitive.

In an embodiment of the system according to the first aspect, the system is configured for attachment of the load carrier by arranging the load carrier spaced away from a mounted position, in particular essentially parallel to the mounted position and/or resting on the base. Further, the system is configured for attachment of the load carrier by inserting the attachment element of the load carrier into the base, in particular with a forward sliding motion. Such an attachment may be particular easy. For example, the base, in particular the receiving element, may comprise a sloped surface guiding the attachment element into attachment without requiring tilting of the load carrier. Such a configuration is well suited to effect attachment with a keyhole joint.

The system may be configured for attachment of the load carrier to the base by additional tightening of a screw connecting the load carrier to the base. The screw may prevent movement in the forward/backward direction and/or lateral direction and thus unwanted disengagement. The screw may thus secure attachment of the load carrier to the base. The screw may be arranged spaced apart to the receiving element and/or attachment element. The screw may fix the load carrier to the base.

In an embodiment of the system according to the first aspect, an end of the attachment element inserted into the base comprises a protrusion that is configured to engage the base in the mounted position to block a sliding movement of the attachment element in the base. For example, the receiving element may comprise an additional recess or hole for receiving the protrusion. The attachment element may slot into the additional recess or hole of the receiving element with the protrusion. An interlocking engagement may be formed. In case of the additional hole for the protrusion, external visual verification that the attachment element has correctly engaged the base may be possible. In case of the additional recess, accidental disengagement of the protrusion from the outside of the receiving element may be impossible. The attachment element may comprise a longitudinally extending main section, for example extending in the forward-backward direction. The protrusion may extend transversally to the main section, for example in the upward-downward direction when the load carrier is attached to the base and the whole system is mounted to the vehicle. Disengagement of the protrusion may be caused by tilting a part of the load carrier upward away from the base. Upward tilting may require previous untightening of the attachment device.

In an embodiment of the system according to the first aspect, the protrusion of the attachment element engages a recess or hole of the frame of the base in the mounted position. This recess or hole may be provided in addition to a recess or hole for insertion of the attachment element. This recess or hole may be arranged so that the protrusion may be inserted from below.

In an embodiment of the system according to the first aspect, the system is configured for detachment of the load carrier from the base with a step of disengaging the protrusion of the attachment element from the base to allow a sliding movement of the attachment element in the base. The system may be configured to block any detachment without previous disengaging of the protrusion.

In an embodiment of the system according to the first aspect, the load carrier is fixed to the base with at least one additional screw spaced apart from the attachment element, in particular wherein the screw blocks a sliding movement of the load carrier relative to the base.

In an embodiment of the system according to the first aspect, the attachment element is protruding from the bottom surface of the load carrier. The bottom surface may be an underside of the load carrier and/or an outside surface. The bottom surface may face downwards when the load carrier is attached to the base and mounted to the vehicle. The bottom surface may be an exterior bottom surface, for example opposite to a floor of the load carrier. The base may be arranged below the load carrier when the load carrier is attached to the base and mounted to the vehicle. Due to the attachment element protruding from the bottom surface of the load carrier, alignment of the load carrier to the base is simplified. Further, the base may support the load carrier during a large part of an attachment and/or detachment process.

In an embodiment of the system according to the first aspect, the attachment element is substantially hook shaped. A hook shaped attachment element may comprise at least one curved or angled section, for example between the protrusion and the main section. A hook shape is cost-effective to manufacture and easy to handle by a user. Further, the hook shape may avoid having sharp edges, points and/or corners that could potentially cause damage or pain during attachment and/or detachment of the load carrier.

In an embodiment of the system according to the first aspect, the attachment element is immovably relative to the bottom surface of the load carrier. Connecting between the attachment element and the load carrier may be very sturdy and simple in this case. For example, the attachment element may be glued, welded and/or screwed to a body of the load carrier.

In an embodiment of the system according to the first aspect, the attachment element extends essentially in a forward-backward direction. The load carrier attachment and/or detachment from the base may thus require movement primarily in the forward-backward direction, resulting in an intuitive handling. Moreover, such an arrangement allows the attachment elements to be aligned with similarly extending parts of the frame of the base, resulting in a compact base.

In an embodiment of the system according to the first aspect, the load carrier comprises two attachment elements arranged parallel and spaced apart to each other.

In an embodiment of the system according to the first aspect, the base is configured for attachment to a motor vehicle. For example, the base may be configured for a roof-top mounting, in particular a roof-top rails, and/or mounting to a rear lid of the vehicle. The attachment may be removable, so that the base may be removed from the motor vehicle if not needed.

In an embodiment of the system according to the first aspect, the base is configured for removable attachment to a towing device of the vehicle. The towing device may be configured, for example, as a trailer hitch or tow ball. The towing device may be arranged at the rear of the vehicle. The load carrier and the base will be easily accessible in such a position, facilitating attachment and detachment of the load carrier to and from the base.

A second aspect of the invention relates to a load carrier for a vehicle. The load carrier is configured for mounting to a base of a load carrier system with an interlocking attachment. The load carrier may be configured not to be mountable to the vehicle directly and/or without the base.

In an embodiment of the load carrier according to the second aspect, the load carrier comprises an attachment element protruding from the load carrier, in particular a bottom surface. The load carrier may be configured for insertion of the attachment element in the base, in particular the receiving element of the base, in a position of the load carrier tilted relative to a mounted position. The load carrier may be configured for insertion of the attachment element in the base in a translatory movement straight downward from above, for example if an attachment is configured as a keyhole joint.

In an embodiment of the load carrier according to the second aspect, the load carrier is configured as the load carrier of the load carrier system according to the first aspect. Embodiments, examples and features of the first aspect constitute embodiments, examples and features of the second aspect and vice-versa.

In an embodiment of the load carrier according to the second aspect, the attachment element is substantially hook shaped with one end attached to a body of the load carrier and an opposing end configured as a free end for insertion in the base.

In an embodiment of the load carrier according to the second aspect, the attachment element is essentially L-shaped, C-shaped or J-shaped. For example, a shorter leg of the L-shape or the J-shape may form an end attached to the body of the load carrier.

In a specific embodiment of the load carrier according to the second aspect described in this paragraph, the load carrier is configured for mounting to the rear of the vehicle. For example, the load carrier may be mounted to the rear of the vehicle via the base but not directly without the base. The load carrier may comprise a first wall element and a second wall element. The first wall element may form a tub and the second wall element may form a lid. The two wall elements may be moveable relative to each other between a closed state enclosing an interior volume of the load carrier and an open state. For example, the two wall elements may be connected to each other with a hinge. The load carrier may further comprise a lock system for releasably engaging the two wall elements to each other in the closed state. The lock system may prevent unwanted adjustment of the load carrier into the open state. For example, to open the load carrier, a user first needs to actuate an actuation element, such as a button or lever. The lock system may comprise a lock element attached to the first wall element and a first engagement element attached to the second wall element and a second engagement element attached to the second wall element spaced apart from the first engagement element attached to the second wall element. For example, the lock element may be a moveable rod or bar that is configured to engage eyelets in the first engagement element and the second engagement element to engage the two wall elements to each other in the closed state. The lock element may be configured to move along a predetermined engagement path to engage the engagement elements. For example, the lock element may be attached to the first wall element with a rail. Alternatively, the lock element may also be configured as a deformable element which is deformed to engage the engagement elements. The lock element may be biased towards its engagement position to automatically engage the two wall elements to each other when the load carrier is adjusted into the closed state. The lock system may be adjustable between a locked state and an unlocked state, wherein disengagement of the lock element from the first engagement element and the second engagement is prevented in the locked state. For example, it may be necessary to unlock the lock with a key, passcode or smartphone application before the lock element can be disengaged. This can provide theft prevention of objects in the load carrier. The first wall element or the second wall element may have a non-planar section. At least one of the elements of the lock system may be attached to the non-planar section. The load carrier is configured to align the lock element and the engagement elements with the predetermined engagement path. Use of the lock is thus facilitate. In addition, inexpensive standard parts for the lock system may be used due to the alignment. For example, the lock element may be configured as a straight part and/or the two engagement elements may be identical to each other due to the alignment. For the alignment, the load carrier may comprise spacers compensating any off-set due to the non-planar section. Alternatively, the wall element with the non-planar section may have protrusions and/or recesses that compensate the non-planar section. The protrusions and/or recesses may provide different attachment regions for the elements of the lock system that are arranged in a common plane despite the non-planar section. The load carrier further comprises a reinforcement element attached to the first wall element or the second wall element. The reinforcement element may cover the protrusions and/or recesses, for example on an outside of the load carrier. The reinforcement element may compensate strengthen the areas with protrusions and/or recesses. The reinforcement element may be arranged adjacent and/or parallel to one of the two wall elements of the load carrier. At least one element of the lock system may be attached to both one of the wall elements and the reinforcement element. The load carrier may have a bottom surface inclined upwards away from the vehicle. For example, the bottom surface may be inclined upwards in a backwards direction when the system is mounted to the rear of the vehicle. This inclination may provide additional ground clearance. Further, it may cause objects stored in the load carrier to shift towards the vehicle when the load carrier is mounted to the vehicle. A center of gravity closer to the vehicle is beneficial for driving stability. Also, if the load is closer to an attachment location to the vehicle, such as a towball, a torque acting on the attachment may be smaller, potentially allowing transportation of a higher maximum load. In addition, the load may not shift or shift less during a braking maneuver and when accelerating due to the inclined bottom surface. The load carrier may comprise a mounting device configured for removable attachment of the load carrier to a towing device of the vehicle, wherein a section of the mounting device is arranged below a mounting section of the mounting device configured for attachment to the vehicle. The load carrier may also comprise the base in this case, which may comprise the mounting device. This may prevent covering of taillights of the vehicle with the load carrier. Further, aerodynamics of the car with the mounted load carrier may be improved. In addition, the load carrier will be arranged low on the vehicle and thus be more easily accessible for loading and unloading. Clearance with a rear lid of the vehicle may be increased so that a trunk of the vehicle can be opened without requiring adjusting and/or detachment of the load carrier. The load carrier may have a countersunk exterior region at a top forward region. The countersunk exterior region may increase clearance with a rear lid of the vehicle so that a trunk of the vehicle can be opened without requiring adjustment and/or detachment of the load carrier while adjacent regions of the load carrier that cannot cause obstruction of the rear lid may extend further towards the vehicle to increase overall interior volume. The load carrier is configured to not obstruct rear lights of the vehicle, a license plate of the vehicle and/or sensor of park assistance system when mounted to the vehicle. Hence, no additional lights and/or license plates may be required for the load carrier and/or the park assistance system may stay functional. The load carrier may be configured to provide a spoiler effect. The spoiler effect may decrease air resistance during forward driving with the vehicle when the load carrier is mounted. The load carrier may thus not cause additional energy consumption during driving or even reduce energy consumption as compared to driving with the vehicle without a load carrier and/or a different load carrier. The load carrier may comprise a foot configured for supporting the load carrier when standing on the ground. The load carrier may thus safely be placed on the ground when not mounted to the vehicle, for example even with objects still stored in the load carrier. The foot may have at least one through hole configured for draining liquid from the interior of the load carrier. Hence, less or no additional through holes for draining liquid may be required.

The load carrier may generally be configured to improve aerodynamics of the vehicle with the mounted load carrier as compared to the vehicle without the mounted load carrier. For example, the load carrier may reduce an aerodynamic drag of the vehicle with the mounted load carrier as compared to the vehicle without the mounted load carrier. Additionally or alternatively, the load carrier may provide the before-mentioned spoiler effect. The load carrier may be shaped to avoid significant low pressure zones at its rear end and/or at a rear end of the vehicle.

In an embodiment of the load carrier according to the second aspect, the load carrier is configured for rear mounting. In an embodiment of the load carrier according to the second aspect, the load carrier is configured as a roof top load carrier. In an embodiment of the load carrier according to the second aspect, the load carrier is configured as a box.

For example, the first and second wall element may form the box when in the closed state. In an embodiment of the load carrier according to the second aspect, the load carrier is configured as a bike carrier, a ski carrier and/or scooter carrier. The load carrier may comprise one or more support arms that may hold the bike or scooter upright on a tray of the load carrier. In an embodiment of the load carrier according to the second aspect, the load carrier is configured as a tray.

A third aspect of the invention relates to a method of attaching a load carrier to a base. The method may be suitable to attach the load carrier to the base of the system of the first aspect and/or to attach the load carrier according to the second aspect.

The method may comprise a step of tilting the load carrier upwards relative to a mounted position into a tilted position. For example, a side of the load carrier facing in the backward direction may be tilted upwards while a lower forward corner of the load carrier rests on the base.

Alternatively or additionally, the method may comprise a step of arranging the load carrier substantially parallel onto the base spaced away from the mounted position. Such a position allows easy sliding of the load carrier along the base for insertion of the attachment element of the load carrier into the base.

The method may comprise a step of inserting an attachment element of the load carrier into the base, for example in the tilted position and/or the position substantially parallel to the base.

In an embodiment of the method according to the third aspect, the method comprises a step of resting the load carrier on the base before inserting the attachment element into the base and/or before tilting the load carrier upwards. For example, the load carrier may be placed with its bottom surface on the base before tilting the load carrier upwards.

In an embodiment of the method according to the third aspect, the method comprises a step of tilting the load carrier downwards into alignment with a mounted position. For example, the load carrier may be tilted downwards out of the tilted position after the attachment element has been inserted. In the aligned position, the attachment element may be in interlocking engagement, for example with a receiving element. In the aligned position, a bottom surface of the load carrier may be resting on the base and/or be arranged parallel to the base.

In an embodiment of the method according to the third aspect, the method comprises a step of sliding the load carrier along the base into the mounted position after inserting the attachment element. For example, the load carrier may already be arranged in the aligned position when sliding the load carrier. Alternatively, the load carrier may be tilted into the aligned position together with sliding the load carrier into the mounted position. The sliding can be a sliding in a forward direction. In the mounted position, the attachment element may be brought into interlocking engagement so that sliding in the reverse direction is blocked.

The method according to the third aspect may also comprise a step of attaching the base to the vehicle. For example, the base can be attached before and/or after attaching the load carrier to the base.

In an embodiment of the method according to the third aspect, the upwards tilting is a rotation of an end section of the load carrier away from the base. The end section rotating away from the base may be a rear end section of the load carrier. Rotation may occur around an opposing end section of the load carrier, which may rest on the base.

In an embodiment of the method according to the third aspect, the downwards tilting is a rotation of the end section of the load carrier towards the base. After downward tilting, an interior bottom surface of the load carrier may be inclined downward in a forward direction towards the vehicle.

In an embodiment of the method according to the third aspect, the upwards tilting is a rotation transversal to a direction of travel of a vehicle when the base is mounted to the vehicle. For example, an axis of rotation may extend in the left-right direction of the vehicle.

In an embodiment of the method according to the third aspect, the sliding along the base is a transversal movement of the load carrier towards a front end of the base. The front end of the base may be an end of the base adjacent to the vehicle when the base is attached to the vehicle.

In an embodiment of the method according to the third aspect, the load carrier is resting with an end section on the base during tilting and/or the load carrier is resting with an end section on the base in the tilted position. The load carrier may be resting on the base with a bottom surface in the mounted position. At least a section of the bottom surface of the load carrier resting on the base in the mounted position may be spaced apart from the base in the tilted position. The load carrier may be slid along the base for the insertion of the attachment element in the tilted position.

In an embodiment of the method according to the third aspect, the method may comprise a step of providing the load carrier system according to the first aspect. The method may include providing the load carrier of the system according to the first aspect and the base of the system according to the first aspect.

In an embodiment of the method according to the third aspect, the method may comprise a step of providing the load carrier according to the second aspect.

A fourth aspect relates to a load carrier configured for mounting a vehicle, in particular to a rear of the vehicle and/or to a roof-top of the vehicle. The load carrier according to the fourth aspect may be configured as the load carrier of the load carrier system according to the first aspect and/or the load carrier according to the second aspect. Embodiments, examples and features of the first and second aspect constitute embodiments, examples and features of the fourth aspect and vice-versa.

The load carrier according to the fourth aspect comprises a first wall element and a second wall element, wherein the two wall elements are moveable relative to each other between a closed state and an open state. In the closed state, objects stored in the load carrier may be protected from environment. In the open state, an interior of the load carrier may be accessible for loading and unloading. In the closed state, access to the interior may be blocked. For example, both wall elements may be thermoformed elements, in particular thermoformed plastic elements, or metal elements formed by deep drawing. The wall elements may have a unitarian one-piece configuration.

The load carrier according to the fourth aspect further comprises a lock system for releasably engaging the two wall elements to each other in the closed state. The lock system comprises a lock element attached to the first wall element and at least a first engagement element attached to the second wall element. The lock element may be moveably attached to the first wall element. The lock element may be moveable along a movement path corresponding to the engagement path. The engagement element may be fixed in place to the second wall element. The lock element may engage the first engagement element, thus preventing that the two wall elements are adjusted from the closed state into the open state with prior release of the engagement.

In an embodiment of the load carrier according to the fourth aspect, the lock system comprises a second engagement element attached to the second wall element spaced apart from the first engagement element. Two spaced apart engagement elements allow better locking engagement. As compared to a single engagement element, the lock system may withstand loads better and better prevent unwanted gaps between the two wall elements in the closed state, achieving an overall more even closure. The load carrier may only comprise a single lock element. Hence, lock adjustment is simplified since a user only needs to adjust the single lock element so that the load carrier may be opened. Further, only the single lock element needs to be fixed in place in a locked state to provide an anti-theft function. The lock element may be configured to be moveable along a predetermined engagement path to engage the engagement elements. This ensures that the lock element engages both engagement elements. Correspondingly, the engagement elements may be arranged aligned with the engagement path. The engagement elements may be made from a metal material. The engagement elements may have an attachment section for attachment to the second wall element and an engagement region for engagement by the lock element. For example, the engagement element may be configured as a through hole. For example, the attachment section may comprise holes for screwing the engagement element to one of the wall elements. The lock system may comprise more than two spaced apart engagement elements.

The first wall element or the second wall element may have a non-planar section. The non-planar section may provide attachment for the lock element or one or more of the engagement elements. Alignment of the engagement elements with the engagement path may be rendered difficult due to the non-planar section. Moveable attachment of the lock element may be rendered difficult due to the non-planar section. The load carrier is configured to align the lock element and the engagement elements with the predetermined engagement path. The lock system can thus be adjusted reliably despite the non-planar section. The non-planar section may, for example, be curved and/or angled. The non-planar section may allow a higher degree of design freedom for the shape of the load carrier. For example, the non-planar section allows to easily configure the load carrier to not inhibit access to the vehicle, such as through the rear lid. Further, the load carrier may have a shape with better aerodynamic properties due to the non-planar section without impairing closure. Boundaries for the geometry of the load carrier may be better utilized due to the non-planar section to provide a larger storage space.

In an embodiment of the load carrier according to the fourth aspect, the engagement path is a substantially straight line. The lock element may thus be simple, such as being a substantially straight bar or metal strip. Moving the lock element along a straight engagement path may be very simple and reliable.

In an embodiment of the load carrier according to the fourth aspect, the lock element is moveably attached to the first wall element.

In an embodiment of the load carrier according to the fourth aspect, the lock element is a rigid element. A rigid element may be resistant to lock manipulation and withstand high loads.

In an embodiment of the load carrier according to the fourth aspect, the lock element is form-adjustable for engaging the engagement elements. For example, the lock element may have a shutter-like design.

In an embodiment of the load carrier according to the fourth aspect, the lock system is configured for simultaneous engagement of the first engagement element and the second engagement element by the lock element. Simultaneous engagement may ensure that all engagement elements are engaged by the lock element to ensure reliable and correct closure of the load carrier. Alternatively, the engagement elements may be engaged one after the other when moving the lock element along the predetermined engagement path to reduce a force required for moving the lock element. For example, the lock system only comprises one moveable lock element configured to engage all engagement elements.

In an embodiment of the load carrier according to the fourth aspect, the first wall element has the non-planar section and the lock element is attached to the non-planar section. For example, the lock element may be attached to the first wall element at two attachment regions of the first wall element spaced apart from each other, wherein the two regions are inclined to each other and/or are not arranged in a plane parallel to the predetermined engagement path.

In an embodiment of the load carrier according to the fourth aspect, the second wall element has the non-planar section and the engagement elements are attached to the non-planar section. For example, the first engagement element may be attached to the second wall element at first attachment region of the second wall element and the second engagement element may be attached to the second wall element at second attachment region of the second wall element. The two attachment regions may be inclined to other regions of the non-planar section and/or may not be arranged in a plane parallel to the predetermined engagement path. The other regions of the non-planar section besides any attachment regions may not be planar and/or parallel to each other. Both wall elements may have a non-planar section, in particular a non-planar section comprising attachment regions of the lock element or engagement elements, respectively.

In an embodiment of the load carrier according to the fourth aspect, the non-planar section has an attachment region for the lock element or for the first engagement element and/or the second engagement element countersunk relative to an adjacent first region that aligns the lock element and/or the engagement elements with the predetermined engagement path. The countersunk region may, for example, form a protrusion in the respective wall element in the interior. The countersunk attachment region may align the element attached to this attachment region with the predetermined engagement path of the lock element. The countersunk configuration may stiffen the respective wall element, resulting in a more reliable closure and/or allowing to use a thinner wall element. Each wall element may comprise several attachment regions. For example, the second wall element may comprise a corresponding attachment region per engagement element of the lock system. The attachment region may be a planar or non-planar. The adjacent regions may be non-planar and/or a transition between the attachment regions and adjacent regions may be non-planar. The transition between an attachment region and an adjacent region may be a stepped transition, which may further strengthen the respective wall element. The first wall element and/or the second wall element may have a unitarian one-piece configuration. Each wall element may be a single part. Alternatively, the countersunk region may be formed by a first part and the adjacent region by a second part.

In an embodiment of the load carrier according to the fourth aspect, the adjacent first region is countersunk relative to an adjacent second region. The respective wall element is therefore double-countersunk. Such a configuration allows the attachment region to protrude further in a direction, providing a higher degree of design freedom, for example without overly stressing the material of the respective wall element in a forming process. The transition between the first adjacent region and second adjacent region may be stepped. The second adjacent region may be adjacent to the first adjacent region but not be in direct contact with the attachment region.

In an embodiment of the load carrier according to the fourth aspect, the adjacent first region surrounds the attachment region.

In an embodiment of the load carrier according to the fourth aspect, the adjacent second region surrounds the adjacent first region.

In an embodiment of the load carrier according to the fourth aspect, the attachment region is countersunk relative to the adjacent first region towards the interior of the load carrier. With such a design, the countersunk configuration may provide handling means for a user on the exterior.

In an embodiment of the load carrier according to the fourth aspect, the adjacent first region is countersunk relative to the adjacent second region towards the interior of the load carrier.

In an embodiment of the load carrier according to the fourth aspect, the lock system comprises a first spacer element. The spacer element may align elements of the lock system with the predetermined engagement path without requiring recesses and/or protrusions, for example forming a countersunk region, in the wall elements.

In an embodiment of the load carrier according to the fourth aspect, the first engagement element is attached to the second wall element with the first spacer element, wherein the first spacer element is configured to align the first engagement element with the predetermined engagement path. In an embodiment of the load carrier according to the fourth aspect, the lock system comprises a second spacer element. The second spacer element may be configured to align the second engagement element with the predetermined engagement path. The first spacer element may be different to the second spacer element, for example being thinner or thicker. The two spacer elements may thus compensate different distances of the attachment regions for the two engagement elements to the predetermined engagement path. Different spacer elements may allow the use of identical engagement elements despite different distances of their respective attachment to a wall element to the predetermined engagement path, thus possibly reducing costs. In an embodiment of the load carrier according to the fourth aspect, the lock system comprises a third spacer element, wherein the lock element is attached to the first wall element with the third spacer element, wherein the spacer element is configured to align the lock element with the predetermined engagement path.

In an embodiment of the load carrier according to the fourth aspect, the engagement elements are identical. In particular, identical engagement elements may have the same geometry.

In an embodiment of the load carrier according to the fourth aspect, a shape of the lock element corresponds to the predetermined path. For example, if the engagement path is curved, the lock element may have a corresponding curved shape.

In an embodiment of the load carrier according to the fourth aspect, the lock element comprises a substantially straight bar. The lock element may have protrusions on the straight bar configured for engaging the engagement elements.

In an embodiment of the load carrier according to the fourth aspect, the lock element is attached to an inside of the first wall element. Alternatively or additionally, the engagement elements are attached to an inside of the second wall element. The lock system may thus be protected from outside manipulation.

In an embodiment of the load carrier according to the fourth aspect, the engagement elements are not formed identical to align the engagement elements with the predetermined engagement path. Thus, no protrusions or recesses may be necessary to align the elements of the lock system, allowing cost-effective manufacturing of the wall elements. Compared to an alignment with spacers, overall number of parts may be low. For example, the lock system may comprise at least two engagement elements with a different geometry.

In an embodiment of the load carrier according to the fourth aspect, the engagement elements each have an engagement region configured for engagement by the lock element, wherein a geometry of the first engagement element is different to a geometry of the second engagement element to align the engagement regions with the predetermined path. The engagement regions may be formed by an engagement region, which may comprise a through hole.

In an embodiment of the load carrier according to the fourth aspect, the lock system is configured to automatically engage the lock element to the engagement elements when adjusting the two wall elements in the closed state. For example, if a user presses a lid down against a tub, the lock can automatically engage. This facilitates use of the load carrier and also avoids situations where a user has forgotten to engage the lock system, in which the load carrier may accidentally open during a drive.

In an embodiment of the load carrier according to the fourth aspect, the lock system is configured to move the lock element along the predetermined path to disengage the lock element from the engagement elements when the two wall elements are in the closed state. For example, a user may pull or push an actuation element, such as a handle or lever, to disengage the lock element so that the load carrier can be opened. This allows central disengagement of all engagement elements.

In an embodiment of the load carrier according to the fourth aspect, the lock element is spring biased towards engagement with the engagement elements. The lock element may comprise inclined sections that cause the lock element to be deflected away from an engagement position by the engagement elements so that the load carrier can be closed without requiring manual movement of the lock element.

In an embodiment of the load carrier according to the fourth aspect, the first wall element is configured as a tub element of the load carrier. For example, the tub may be a bottom part of the load carrier. The tub may stay in place when opening or closing the load carrier.

In an embodiment of the load carrier according to the fourth aspect, the second wall element is configured as a lid of the load carrier. For example, the lid may be a top part of the load carrier. The lid may be moved when opening or closing the load carrier.

In an embodiment of the load carrier according to the fourth aspect, the first wall element and the second wall element enclose an interior volume of the load carrier in the closed state.

In an embodiment of the load carrier according to the fourth aspect, the first wall element and the second wall element are hingedly connected to each other. The hinge may allow to reliably return the lock element and/or the engagement elements into alignment with the predetermined engagement path after the load carrier has been opened.

In an embodiment of the load carrier according to the fourth aspect, the first wall element and/or the second wall element are thermoformed elements. In an embodiment of the load carrier according to the fourth aspect, the first wall element and/or the second wall element comprise a plastic material and/or glass fiber. In an embodiment of the load carrier according to the fourth aspect, the first wall element and/or the second wall element have a monolithic one-piece configuration.

In an embodiment of the load carrier according to the fourth aspect, the non-planar section and the engagement path are differently shaped. For example, the engagement path may not be parallel to an inside surface of the second wall element connecting the attachment region of the first engagement element with the attachment region of the second engagement element. In an embodiment of the load carrier according to the fourth aspect, an inside surface of the non-planar section is not parallel to the engagement path when the load carrier is in the closed state. In an embodiment of the load carrier according to the fourth aspect, the non-planar section is curved and/or is irregularly shaped and/or comprises a corner. The engagement path may be free of curves and/or corners. A surface of the curved non-planar section may not have the same shape as the engagement path. For example, no surface of the first wall element and/or second wall element is parallel to the engagement path. The non-planar section may comprise several planar attachment regions that are not directly adjacent to each other and/or may be arranged parallel to the engagement path.

In an embodiment of the load carrier according to the fourth aspect, the load carrier further comprises a reinforcement element attached to the first wall element or the second wall element. The reinforcement element may form a second layer of the tub or the lid. The reinforcement element may be smaller than the respective wall element. The reinforcement element may only extend along a section of the respective wall element. The reinforcement element may be formed from the same material and/or may be manufactured with the same process as the respective wall element. For example, the reinforcement element may be a thermoformed element. The reinforcement element may stiffen the respective wall element, in particular in an attachment region of an element of the lock system and/or the hinge. Said regions may receive the highest loads and/or need to keep their shape under forces acting on the load carrier during closing for reliable closure.

In an embodiment of the load carrier according to the fourth aspect, the reinforcement element is attached to the first wall element and the lock element extends through the first wall element and the reinforcement element for attachment. Alternatively, the reinforcement element is attached to the second wall element and the first engagement element and optionally also other engagement elements extend through the second wall element and the reinforcement element for attachment. The reinforcement element may act as a second layer of material for attachment in addition to the respective wall element. The load carrier may also comprise a first reinforcement for the first wall element and a second reinforcement element for the second wall element. The reinforcement element may also be attached to the second wall element and the first engagement element and the second engagement element both may extend through the second wall element and the reinforcement element for attachment. For example, all engagement elements may extend through one reinforcement element. The load carrier may also comprise a separate reinforcement element per lock element and/or engagement element.

In an embodiment of the load carrier according to the fourth aspect, the reinforcement element is configured as a sheet. A sheet may be a substantially flat piece. In an embodiment of the load carrier according to the fourth aspect, the reinforcement element comprises a plastic material and/or glass fiber. In an embodiment of the load carrier according to the fourth aspect, the reinforcement element has a monolithic one-piece configuration.

In an embodiment of the load carrier according to the fourth aspect, the reinforcement element has a different color than the wall element to which the reinforcement element is attached. A user may thus distinguish reinforced areas from non-reinforced areas, in particular if the reinforcement element is arranged on an exterior surface and/or if the respective wall element is at least partially transparent. This may instruct a user on where to best press on the load carrier for closing the load carrier to achieve reliable engagement of the lock system. The reinforcement element may be attached to an outside of the load carrier and/or mark areas for handling of a lid. The reinforcement element may also be attached to an inside of the load carrier.

In an embodiment of the load carrier according to the fourth aspect, a shape of the reinforcement element corresponds to a shape of the wall element to which the reinforcement element is attached. For example, the reinforcement element may extend substantially parallel to the wall element to which the reinforcement element is attached.

In an embodiment of the load carrier according to the fourth aspect, the reinforcement element is arranged flush with the wall element to which the reinforcement element is attached. This may cover an attachment of the elements of the lock system, such as a screw or bolt attaching one of the engagement elements to a lid. The flush arrangement may also minimize a gap between the wall element to which the reinforcement element is attached and the reinforcement element, which may collect dirt. Due to the flush arrangement, there may be no or only a small ridge present between the wall element to which the reinforcement element is attached and the reinforcement element, so that catching on clothing of a user and additional drag during driving can be avoided.

In an embodiment of the load carrier according to the fourth aspect, the reinforcement element is smaller than the wall element to which the reinforcement element is attached. In an embodiment of the load carrier according to the fourth aspect, the reinforcement element only partially covers the wall element to which the reinforcement element is attached.

In an embodiment of the load carrier according to the fourth aspect, the load carrier comprises a hinge attached to the first wall element and the second wall element. The hinge may also be attached to the reinforcement element, for example extending through the reinforcement element and the wall element to which the reinforcement element is attached.

In an embodiment of the load carrier according to the fourth aspect, an edge of the reinforcement element is bend towards the wall element to which the reinforcement element is attached. Such a configuration may provide a very smooth exterior. In addition, sharp edges which may catch on clothing or a user's skin may not be present with such a design. For example, all edges of the reinforcement element are bend towards the wall element to which the reinforcement element is attached.

In an embodiment of the load carrier according to the fourth aspect, the reinforcement element covers the attachment region and is countersunk relative to the adjacent first region and/or adjacent second region. The reinforcement element may thus mark the attachment regions and form one or several troughs as a handling area for pushing on the wall element.

Alternatively, the reinforcement element covers the attachment region and is flush with the adjacent first region and/or adjacent second region. The reinforcement element may thus provide a smooth exterior surface of the load carrier without depressions in the attachment regions despite the respective wall element having a countersunk region. Such a configuration may minimize air resistance and noise when driving with the car with the mounted load carrier.

In an embodiment of the load carrier according to the fourth aspect, the load carrier has a first attachment region and a second attachment region each countersunk relative to an adjacent first region. The reinforcement element may cover the first attachment region and is countersunk relative to the adjacent first region. The reinforcement element may cover the second attachment region and is flush with the adjacent first region and/or adjacent second region.

In an embodiment of the load carrier according to the fourth aspect, the reinforcement element is configured to provide a hand grip for opening the load carrier from its closed state. This may facilitate opening the load carrier. An area of the reinforcement element providing the hand grip may comprise the only edge section of the reinforcement element not bend towards the wall element to which the reinforcement element is attached.

In an embodiment of the load carrier according to the fourth aspect, the hand grip is formed by a section of the reinforcement element protruding from the wall element to which the reinforcement element is attached. The protruding section may be grabbed or pushed from below for opening the load carrier. For example, the hand grip may be formed by a section protruding from the lid of the load carrier at a top side in the backward direction.

In an embodiment of the load carrier according to the fourth aspect, the lock system is adjustable between a locked state, in which disengagement of the lock element from at least the first engagement element is prevented, and an unlocked state. For example, the lock system may comprise a locking cylinder configured to block movement of the lock element at least in a disengagement direction in the locked state. In the unlocked state, the lock element can be disengaged from the engagement elements. In an embodiment of the load carrier according to the fourth aspect, disengagement of the lock element from the first engagement element and the second engagement element is prevented in the locked state.

In an embodiment of the load carrier according to the fourth aspect, the lock system comprises a third engagement element attached to the second wall element spaced apart from the first engagement element and the second engagement element. In the locked state, disengagement of the lock element from the first engagement element, the second engagement and third engagement element may be prevented.

In an embodiment of the load carrier according to the fourth aspect, the load carrier is configured for mounting to the rear of the vehicle and the load carrier has a bottom surface inclined upwards away from the vehicle. An inclination upwards may be angled relative to longitudinal direction of the vehicle and/or the ground. For example, an interior bottom surface may be inclined upwards away from the vehicle. For example, a bottom wall, such as the bottom facing side of the tub, is inclined upwards away from the vehicle. Such an inclination may cause objections loaded to the load carrier to be arranged closer to the vehicle. This inclination may provide additional ground clearance. Further, it may cause objects stored in the load carrier to shift towards the vehicle when the load carrier is mounted to the vehicle. A center of gravity closer to the vehicle is beneficial for driving stability. Also, if the load is closer to an attachment location to the vehicle, such as a tow ball, a torque acting on the attachment may be smaller, potentially allowing transportation of a higher maximum load. In addition, the load will then not shift during a braking maneuver.

For example, the bottom surface may be inclined by about 5° to 20° with respective to horizontal plane when the load carrier is mounted to the vehicle, more particularly by about 10° to 15° and even more particularly about 13°. Such an angle may provide good ground clearance. In addition, such an angle may improve the aerodynamics of the load carrier and even the vehicle with the load carrier attached thereto.

In an embodiment of the load carrier according to the fourth aspect, the bottom surface is formed by the first wall element or the second wall element. In an embodiment of the load carrier according to the fourth aspect, the bottom surface is inclined upwards away from the vehicle when the load carrier is mounted to the rear of the vehicle.

In an embodiment of the load carrier according to the fourth aspect, the load carrier is configured to be adjusted between a use position and a loading position. For example, the load carrier may be tilted and/or shifted backwards away from the vehicle in the loading position. The use position may be an upright position for driving and transportation of objects. The loading position may be tilted downwards and/or shifted away from the vehicle in a horizontal direction. The loading position may facilitate loading when the vehicle is standing still, in particular when mounted to the rear of the vehicle. The load carrier may comprise an adjustment device, for example configured to tilt and/or horizontally shift the load carrier between the two positions. The adjustment device may be part of a mounting device of the load carrier.

In an embodiment of the load carrier according to the fourth aspect, the load carrier comprises a mounting device configured for removable attachment of the load carrier to a towing device of the vehicle and/or a base of a load carrier system. For example, the mounting device may be configured to attach the load carrier to a tow ball of the vehicle.

In an embodiment of the load carrier according to the fourth aspect, the mounting device is configured to allow a person to stand between the rear end of the vehicle and a front side of the load carrier. This may allow a user to easily access a rear cargo space of the vehicle even with the load carrier attached to the vehicle. The front side may be formed by the first wall element and/or second wall element. The person may be able to stand between the rear end of the vehicle and a front side of the load carrier in the loading position and/or use position of the load carrier.

In an embodiment of the load carrier according to the fourth aspect, the load carrier comprises a mounting device configured for removable attachment of the load carrier to a towing device of the vehicle. The load carrier may also comprise the base in this case, which may comprise the mounting device. A section of the mounting device may be arranged below a mounting section of the mounting device configured for attachment to the vehicle. The section arranged below the mounting section may be a section where a body of the load carrier is attached to the mounting device. The mounting device may thus support the load carrier at a position shifted downwards relative to the towing device of the vehicle. For example, a bottom surface of the load carrier may thus be partially arranged below the tow ball of the vehicle. This provides more clearance for taillights, sensors of the vehicle and/or allow access to a rear lid of the vehicle with the mounted load carrier, possibly even in the use position.

In an embodiment of the load carrier according to the fourth aspect, a section of the mounting device is arranged below the towing device of the vehicle when the load carrier is mounted to the rear of the vehicle.

In an embodiment of the load carrier according to the fourth aspect, the mounting device comprises a connection element that at least partially extends downwards when the load carrier is mounted to the rear of the vehicle. The connection element may, for example, be a metal shaft or metal sheet. The connection element may connect the mounting section and the section arranged below the towing device of the vehicle when the load carrier is mounted to the rear of the vehicle. The mounting section and section arranged below the towing device of the vehicle when the load carrier is mounted to the rear of the vehicle may form opposing ends of the mounting device. The mounting section may comprise a clamp. The section arranged below the towing device of the vehicle when the load carrier is mounted to the rear of the vehicle may comprise attachment means for attachment to a wall element of the load carrier or may be permanently fixed to the load carrier and/or base.

In an embodiment of the load carrier according to the fourth aspect, the mounting section is configured for attachment to a tow ball of the vehicle. In an embodiment of the load carrier according to the fourth aspect, the section of the mounting device arranged below the towing device of the vehicle when the load carrier is mounted to the rear of the vehicle is attached to the first wall element and/or to the second wall element.

In an embodiment of the load carrier according to the fourth aspect, the inclined bottom surface is partially or fully arranged below the towing device of the vehicle when the load carrier is mounted to the rear of the vehicle. Load distribution and forces acting on the towing device of the vehicle may thus be improved.

In an embodiment of the load carrier according to the fourth aspect, the load carrier is configured for mounting to the rear of the vehicle and wherein the load carrier has a countersunk exterior region at a top forward region. The countersunk exterior region may increase clearance with a rear lid of the vehicle may be increased so that a trunk of the vehicle can be opened without requiring adjusting and/or detachment of the load carrier while adjacent regions of the load carrier that cannot cause obstruction of the rear lid may extend further towards the vehicle to increase overall interior volume. Alternatively or additionally, the load carrier may be arranged closer to the rear of the vehicle, potentially improving aerodynamics.

In an embodiment of the load carrier according to the fourth aspect, the countersunk exterior region is formed at a top forward corner of the load carrier. In an embodiment of the load carrier according to the fourth aspect, the countersunk exterior region is formed in a lid of the load carrier. In an embodiment of the load carrier according to the fourth aspect, the countersunk exterior region extends at least as far as a lower edge of a rear lid of the vehicle in a left-right direction. A section of the load carrier adjacent the countersunk region in the left and/or right direction may protrude further towards the rear of the vehicle than the countersunk region.

In an embodiment of the load carrier according to the fourth aspect, a transition from the countersunk exterior region to adjacent regions of the load carrier is a stepped transition. This may reinforce a forward top section of the load carrier, which may at least partially support a hinge.

In an embodiment of the load carrier according to the fourth aspect, when the load carrier is mounted to the vehicle, the countersunk exterior region comes closest to a rear lid of vehicle in an upward direction and/or a forward direction.

In an embodiment of the load carrier according to the fourth aspect, the load carrier has a projecting exterior region arranged in the countersunk exterior region in a middle region in a left-right direction. The projecting exterior region may provide additional space and/or reinforcement for mounting of the hinge.

In an embodiment of the load carrier according to the fourth aspect, the first wall element and the second wall element are hingedly attached to each other at the projecting exterior region. For example, for this purpose, a hinge may be arranged in the interior of the load carrier.

In an embodiment of the load carrier according to the fourth aspect, the load carrier is configured for mounting to the rear of the vehicle and the load carrier is configured to not obstruct rear lights of the vehicle, a license plate of the vehicle and/or sensors of park assistance systems when mounted to the vehicle. For example, load carrier may not obstruct a camera or distance sensor.

In an embodiment of the load carrier according to the fourth aspect, a top surface of the load carrier extends below a virtual plane extending from a rear bottom edge of a rear light of the vehicle line extending backwards at a downward angle of 15° when the load carrier is mounted to the vehicle. The load carrier may thus comply with regulations without requiring additional taillights. The top surface may be formed by the lid of the load carrier. The top surface may be inclined relative to a horizontal line.

In an embodiment of the load carrier according to the fourth aspect, a top surface of the load carrier is angled downwards in the backwards direction in relation to the bottom surface by at least 15°. The forgoing thus provides a tapering height of the load carrier in the rearward direction, the tapering height facilitates reducing the risk of significant low pressure zones forming behind and/or around the load carrier which can provide undesired drag. The top surface of the load carrier may be angled downwards in the backwards direction when the load carrier is mounted to the vehicle.

Additionally or alternatively, a section of the top surface of the load carrier, in particular a section backwards of the countersunk exterior region, is angled downwards in the backwards direction by about −2° to 10° when the load carrier is mounted to the vehicle, in particular by about 0° to 5°, more particularly by about 1°-4°. Such an angle may improve the aerodynamics of the load carrier and even the vehicle with the load carrier attached thereto. For example, the top side of the countersunk exterior region may not be angled downwards in the backwards direction to allow for more storage space in the load carrier. In addition, such a section of the top surface may not be relevant or only of minor relevance for the aerodynamic effect of the load carrier due to being arranged fully or nearly fully in a slipstream of the vehicle.

In an embodiment of the load carrier according to the fourth aspect, the load carrier is configured for mounting to the rear of the vehicle and wherein the load carrier is configured to improve aerodynamics of the vehicle with the mounted load carrier as compared to the vehicle without the mounted load carrier, in particular by reducing an aerodynamic drag. Alternatively or additionally, the load carrier may provide a spoiler effect to improve the aerodynamics.

In an embodiment of the load carrier according to the fourth aspect, a forward facing side of the load carrier is curved in a top-view of the load carrier with a left end section of the forward facing side, in particular a left forward corner, and/or with a right end section of the forward facing side, in particular a right forward corner, extending more forward than a middle section of the forward facing side of the load carrier. The middle section may comprise the countersunk region and/or may be formed by the countersunk region. The mounting device may be arranged in the middle section in the left-right direction. Such a configuration may allow easy opening of the load carrier while minimizing a gap between the rear of the vehicle and the load carrier. For example, the gap between the rear of the vehicle and the front of the mounted load carrier may be substantially equidistant along its width due to such a design or may be smaller at the left and/or right forward corner. This may reduce drag due to causing less turbulences than a load carrier with a large gap between the vehicle and the left and/or right forward corner.

In an embodiment of the load carrier according to the fourth aspect, the left end section of the forward facing side, in particular the left forward corner, and/or the right end section of the forward facing side, in particular the right forward corner, are arranged closer to the rear of the vehicle when the load carrier is mounted to the vehicle than the middle section of the forward facing side of the load carrier. In particular, this may improve aerodynamics by reducing or preventing airflow capture in the space between the load carrier and the rear of the vehicle during vehicle movement.

In an embodiment of the load carrier according to the fourth aspect, the curved shape of the forward facing side of the load carrier reduces an average distance of the forward facing side of the load carrier to the rear of the vehicle when the load carrier is mounted to the vehicle as compared to a load carrier with a substantially forward facing side that is substantially straight in a top view. This may also have a beneficial aerodynamic effect.

In an embodiment of the load carrier according to the fourth aspect, the curved shape is at least partially formed by the countersunk region. This may facilitate manufacturing of the load carrier.

In an embodiment of the load carrier according to the fourth aspect, the load carrier is configured for mounting to the rear of the vehicle and the load carrier is configured to provide a spoiler effect. For example, the load carrier may cause the spoiler effect when driving forward with the vehicle. The spoiler may improve air drag of the vehicle.

For example, the spoiler effect may avoid or reduce low pressure zones behind the vehicle and/or behind the load carrier when driving with the vehicle.

In an embodiment of the load carrier according to the fourth aspect, the load carrier is configured for mounting to the rear of the vehicle and the load carrier tapers from a larger front end towards a smaller rear end. This may provide the spoiler effect. Alternatively or additionally, the load carrier may be configured with a wing-shape to provide the spoiler effect.

For example, the load carrier may be configured to provide a rear end that is extended and/or ends with a less steep backward facing side than would be the case with just the vehicle without the mounted load carrier.

In an embodiment of the load carrier according to the fourth aspect, the load carrier is essentially wing-shaped. In an embodiment of the load carrier according to the fourth aspect, a height of the load carrier tapers from the larger front end towards the smaller rear end.

A largest height of a height tapering section may about 1.1 to 1.5 time the smallest height of height tapering section, more particularly about 1.2 to 1.4, even more particularly about 1.3. For example, the height tapering section may be arranged backwards of the countersunk region. The largest height may be directly adjacent backwards of the countersunk region. The heights may be a distance from the bottom exterior surface to the top exterior surface of the load carrier in a vertical direction when mounted to the vehicle and/or when standing on the ground. The height may be a distance extending orthogonally from a bottom of the load carrier to a top of the load carrier. The height tapering section may end at a backwards corner of the load carrier.

In an embodiment of the load carrier according to the fourth aspect, a width of the load carrier tapers from a larger front end towards a smaller rear end. The width may be an extension of the load carrier in the left-right direction.

A largest width may be about 1.05 to 1.5 times the smallest width of a width tapering section, more particularly about 1.1 to 1.4, even more particularly about 1.2. For example, the width tapering section may be arranged backwards of the countersunk region. The largest height may be directly adjacent backwards of the countersunk region. The width may be a distance from a left exterior surface to a right exterior surface of the load carrier in a horizontal direction when mounted to the vehicle and/or when standing on the ground. The width tapering section may end at a backwards corner of the load carrier.

A depth of the countersunk region in the forward-backward direction may be about 0.02 to 0.2 times a length of the load carrier in the forward-backward direction. In particular, the depth of the countersunk region in the forward-backward direction may be about 0.03 to 0.1 times a length of the load carrier in the forward-backward direction, more in particular about 0.05. Such a configuration may provide a smooth airflow over the countersunk region when driving the vehicle. The depth of the countersunk region may be a length between a most forward corner of the load carrier and a most backward section of the front surface of the load carrier in the top view, for example the middle of the curved front side. The length of the load carrier in the forward-backward direction may be a length in the forward-backward direction from the most forward section, such as a most forward corner of the load carrier, to a most backward rear side, in particular without the mounting device and/or in the top view.

The load carrier may comprise attachment means for rear lights. The load carrier may also comprise the rear lights attached to the attachment means. A top exterior surface may extend backwards beyond the rear lights, for example formed by a lid of the load carrier. Additionally or alternatively, the rear lights are arranged recessed in the load carrier exterior surface, for example formed by a bottom part of the load carrier. The lights may thus be arranged below an overhang. This may provide further tapering of the height of the load carrier and/or a more gradual rear ending to the box. This may further reduce a risk of forming significant low pressure zones that may cause additional unwanted drag.

In an embodiment of the load carrier according to the fourth aspect, any exterior corners of the load carrier are rounded. This may provide a smooth exterior and reduce air drag caused by the load carrier. In an embodiment of the load carrier according to the fourth aspect, the load carrier comprises a top corner extending in the forward-backward direction, wherein a radius of the corner decreases from the front end of the load carrier towards the rear end and/or wherein the corner increases in sharpness from the front end of the load carrier towards the rear end. For example, said top corner may be a left or right top corner of the load carrier. This may allow a very smooth airflow over the load carrier, resulting in an air drag reduction.

In an embodiment of the load carrier according to the fourth aspect, the load carrier is configured for mounting to the rear of the vehicle and the load carrier is configured such that a laminar air flow over the vehicle continues as a laminar airflow over the load carrier when the load carrier is mounted to the vehicle and the vehicle is driven forward. The load carrier may increase aerodynamic length of the vehicle, resulting in an air drag reduction. At the rear end of the load carrier, a spoiler effect may transform the laminar flow into a turbulent flow.

In an embodiment of the load carrier according to the fourth aspect, the load carrier comprises a foot configured for supporting the load carrier when standing on the ground. The load carrier may also comprise several feet arranged spaced apart from each other. The load carrier can be configured to essentially be arranged in the same orientation when standing on the ground as when being mounted to the vehicle. Alternatively, the load carrier may be configured to have a substantially horizontal interior bottom surface when standing on the ground while having an inclined interior bottom surface when mounted to the vehicle.

In an embodiment of the load carrier according to the fourth aspect, the foot has at least one through hole configured for draining liquid from the interior of the load carrier. The load carrier thus does not require additional provisions for liquid drainage. Further, the foot may form a trough in the bottom of the load carrier, which may automatically collect liquid from the interior. Drainage may thus be optimized. In addition, the foot allows easy integration of means for preventing backflow into the interior, such as a plug, valve or labyrinth construction of the through hole.

In an embodiment of the load carrier according to the fourth aspect, the foot protrudes from an underside of the load carrier. In an embodiment of the load carrier according to the fourth aspect, the foot is a part of the first wall element or the second wall element. In an embodiment of the load carrier according to the fourth aspect, the foot is integrally formed in the first wall element or the second wall element. For example, the foot can be thermoformed cost-effectively as part of the first wall element. In an embodiment of the load carrier according to the fourth aspect, the load carrier comprises a plurality of feet configured for supporting the load carrier together when standing on the ground. Each foot may comprise a through hole for liquid drainage.

In an embodiment of the load carrier according to the fourth aspect, the load carrier has at least one through hole configured for draining liquid from the interior of the load carrier. Such a through hole may be provided in addition to the through hole in the foot or may be formed in the foot, as previously described.

In an embodiment of the load carrier according to the fourth aspect, a through hole configured for draining liquid from the interior of the load carrier is arranged at a lowest region of the load carrier. The lowest region may be the lowest region when the load carrier is mounted to the vehicle and/or when the load carrier is standing on the ground. A first through hole may be provided to the lowest region when the load carrier is mounted to the vehicle and a second through hole to the lowest region when the load carrier is standing on the ground. The lowest region may be located at the foot or at a different location.

In an embodiment of the load carrier according to the fourth aspect, an interior bottom surface of the load carrier is divided fluidly into at least two sections by a protrusion. For example, the protrusion may provide a receptacle on the exterior of the load carrier that receives part of the base. The load carrier may comprise a through hole configured for draining liquid from the interior of the load carrier for each section.

In an embodiment of the load carrier according to the fourth aspect, a through hole configured for draining liquid from the interior of the load carrier is arranged at a lowest region of each fluidly divided section of the load carrier when mounted to the vehicle. Alternatively or additionally, a second through hole configured for draining liquid from the interior of the load carrier is arranged at a lowest region of each fluidly divided section of the load carrier when standing on the ground.

In an embodiment of the load carrier according to the fourth aspect, the load carrier comprises a frame that is at least partially arranged in a receptacle formed by the protrusion fluidly dividing the interior bottom surface.

In an embodiment of the load carrier according to the fourth aspect, the load carrier comprises a plug for at least one of the through hole configured for draining liquid from the interior of the load carrier. The plug may prevent unwanted backflow into the interior.

In an embodiment of the load carrier according to the fourth aspect, the through holes are configured to prevent or minimize spray liquid from entering into the interior during forward driving. For example, an exterior mouth of the through hole may be angled away from the ground and/or may be angled backwards.

A fifth aspect relates to a load carrier system. The load carrier system according to the fifth aspect may comprise a vehicle and a load carrier according to the second and fourth aspect. The load carrier system according to the fifth aspect may comprise a vehicle and a load carrier system according to the first aspect. Embodiments, examples and features of the other aspects constitute embodiments, examples and features of the fifth aspect and vice-versa.

ITEM LISTS

The following item lists relates to further embodiments, examples and features. Item A2 relates to a lock system. Item A18 relates to a reinforcement element. Item A30 relates to an inclined bottom surface. Item A36 relates to a downward shifted mounting of the load carrier. Item A41 relates to a countersunk top forward region, which may provide additional clearance for a rear lid of the vehicle. Item A47 relates to avoiding obstruction of vehicle parts, such as taillights. Items A49 to A58 relate to an exterior shape of the load carrier, which may influence aerodynamics. Item A59 to A61 relate to support feet and liquid drainage. Items B relate to attachment of the load carrier to a base. Item list C relates to further configurations of the invention.

Item List A

A1. Load carrier (10) configured for mounting to a rear of a vehicle, wherein the load carrier (10) comprises a first wall element (14) and a second wall element (16), wherein the two wall elements (14, 16) are moveable relative to each other between a closed state and an open state, wherein the load carrier (10) further comprises a lock system for releasably engaging the two wall elements (14, 16) to each other in the closed state, wherein the lock system comprises a lock element (200) attached to the first wall element (14) and at least a first engagement element (204) attached to the second wall element (16), and wherein the lock element (200) is configured to engage the first engagement element (204).

A2. Load carrier (10) according to item A1, wherein the lock system comprises a second engagement element (204) attached to the second wall element (16) spaced apart from the first engagement element (204), wherein the lock element (200) is configured to be moveable along a predetermined engagement path to engage the engagement elements (204), wherein the first wall element (14) or the second wall element (16) has a non-planar section and the load carrier (10) is configured to align the lock element (200) and the engagement elements (204) with the predetermined engagement path.

A3. Load carrier (10) according to item A2, wherein the engagement path is a substantially straight line (216)

and/or wherein the lock element (200) is moveably attached to the first wall element (14)

and/or wherein the lock element (200) is a rigid element or wherein the lock element (200) is form-adjustable for engaging the engagement elements (204).

A4. Load carrier (10) according to any one of the preceding items A, wherein the lock system is configured for simultaneous engagement of the first engagement element (204) and the second engagement element (204) by the lock element (200).

A5. Load carrier (10) according to any one of the preceding items A, wherein the first wall element (14) has the non-planar section and the lock element (200) is attached to the non-planar section.

A6. Load carrier (10) according to any one of the preceding items A, wherein the second wall element (16) has the non-planar section and the engagement elements (204) are attached to the non-planar section.

A7. Load carrier (10) according to any one of the preceding items A, wherein the non-planar section has an attachment region (206) for the lock element (200) or for the first engagement element (204) and/or the second engagement element (204) countersunk relative to an adjacent first region that aligns the lock element (200) and/or the engagement elements (204) with the predetermined engagement path.

A8. Load carrier (10) according to item A7, wherein the adjacent first region is countersunk relative to an adjacent second region.

A9. Load carrier (10) according to items A7 or A8, wherein the adjacent first region surrounds the attachment region (206)

and/or wherein the adjacent second region surrounds the adjacent first region and/or wherein the attachment region (206) is countersunk relative to the adjacent first region towards an interior of the load carrier (10)

and/or wherein the adjacent first region is countersunk relative to the adjacent second region towards the interior of the load carrier (10).

A10. Load carrier (10) according to any one of the preceding items A, wherein the lock system comprises a first spacer element, wherein the first engagement element (204) is attached to the second wall element (16) with the first spacer element, wherein the first spacer element is configured to align the first engagement element (204) with the predetermined engagement path and/or wherein the lock system comprises a second spacer element, wherein the second engagement element (204) is attached to the second wall element (16) with the second spacer element, wherein the second spacer element is configured to align the second engagement element (204) the predetermined engagement path and/or wherein the lock system comprises a third spacer element, wherein the lock element (200) is attached to the first wall element (14) with the third spacer element, wherein the spacer element is configured to align the lock element (200) with the predetermined engagement path.

A11. Load carrier (10) according to any one of the preceding items A, wherein the engagement elements (204) are identical and/or wherein a shape of the lock element (200) corresponds to the predetermined path and/or wherein the lock element (200) comprises a substantially straight bar and/or wherein the lock element (200) is attached to an inside of the first wall element (14)

and/or wherein the engagement elements (204) are attached to an inside of the second wall element (16).

A12. Load carrier (10) according to any one of the preceding items A1 to A10, wherein the engagement elements (204) are not formed identical to align the engagement elements (204) with the predetermined engagement path.

A13. Load carrier (10) according to item A12, wherein the engagement elements (204) each have an engagement region (208) configured for engagement by the lock element (200), wherein a geometry of the first engagement element (204) is different to a geometry of the second engagement element (204) to align the engagement regions (208) with the predetermined path.

A14. Load carrier (10) according to any one of the preceding items A, wherein the lock system is configured to automatically engage the lock element (200) to the engagement elements (204) when adjusting the two wall elements (14, 16) in the closed state and/or wherein the lock system is configured to move the lock element (200) along the predetermined path to disengage the lock element (200) from the engagement elements (204) when the two wall elements (14, 16) are in the closed state.

A15. Load carrier (10) according to any one of the preceding items A14, wherein the lock element (200) is spring biased towards engagement with the engagement elements (204).

A16. Load carrier (10) according to any one of the preceding items A, wherein the first wall element (14) is configured as a tub element of the load carrier (10)

and/or wherein the second wall element (16) is configured as a lid of the load carrier (10)

and/or the first wall element (14) and the second wall element (16) enclose an interior volume of the load carrier (10) in the closed state and/or wherein the first wall element (14) and the second wall element (16) are hingedly connected to each other and/or wherein the first wall element (14) and/or the second wall element (16) are thermoformed elements and/or wherein the first wall element (14) and/or the second wall element (16) comprise a plastic material and/or glass fiber and/or wherein the first wall element (14) and/or the second wall element (16) have a monolithic one-piece configuration.

A17. Load carrier (10) according to any one of the preceding items A, wherein the non-planar section and the predetermined engagement path are differently shaped and/or wherein an inside surface of the non-planar section is not parallel to the engagement path when the load carrier (10) is in the closed state and/or wherein the non-planar section is curved and/or is irregularly shaped and/or comprises a corner.

A18. Load carrier (10) according to any one of the preceding items A, wherein the load carrier further comprises a reinforcement element (300) attached to the first wall element (14) or the second wall element (16).

A19. Load carrier (10) according to item A18, wherein the reinforcement element (300) is attached to the first wall element (14) and the lock element (200) extends through the first wall element (14) and the reinforcement element (300) for attachment or wherein the reinforcement element (300) is attached to the second wall element (16) and the first engagement element (204) extends through the second wall element (16) and the reinforcement element (300) for attachment.

A20. Load carrier (10) according to item A18 or A19, wherein the reinforcement element (300) is configured as a sheet and/or wherein the reinforcement element (300) comprises a plastic material and/or glass fiber and/or wherein the reinforcement element (300) has a monolithic one-piece configuration and/or wherein the reinforcement element (300) has a different color than the wall element (14, 16) to which the reinforcement element (300) is attached and/or wherein a shape of the reinforcement element (300) corresponds to a shape of the wall element (14, 16) to which the reinforcement element (300) is attached and/or wherein the reinforcement element (300) is attached to an outside or inside of the load carrier (10)

and/or wherein the reinforcement element (300) is arranged flush with the wall element (14, 16) to which the reinforcement element (300) is attached and/or wherein the reinforcement element (300) is smaller than the wall element (14, 16) to which the reinforcement element (300) is attached and/or wherein the reinforcement element (300) only partially covers the wall element (14, 16) to which the reinforcement element (300) is attached.

A21. Load carrier (10) according to any one of items A18 or A20, wherein the load carrier (10) comprises a hinge (20) attached to the first wall element (14) and the second wall element (16), and wherein the hinge (20) is also attached to the reinforcement element (300).

A22. Load carrier (10) according to any one of items A18 or A21, wherein an edge of the reinforcement element (300) is bend towards the wall element (14, 16) to which the reinforcement element (300) is attached.

A23. Load carrier (10) according to any one of items A18 or A22 when referring back to item A7 and/or A8, wherein the reinforcement element (300) covers the attachment region (206) and is countersunk relative to the adjacent first region and/or adjacent second region or the reinforcement element (300) covers the attachment region (206) and is flush with the adjacent first region and/or adjacent second region.

A24. Load carrier (10) according to item A23, wherein the load carrier (10) has a first attachment region (206) and a second attachment region (206) each countersunk relative to an adjacent first region the reinforcement element (300) covers the first attachment region (206) and is countersunk relative to the adjacent first region and the reinforcement element (300) covers the second attachment region (206) and is flush with the adjacent first region and/or adjacent second region.

A25. Load carrier (10) according to any one of items A18 or A24, wherein the reinforcement element (300) is configured to provide a hand grip for opening the load carrier (10) from its closed state.

A26. Load carrier (10) according to item A25, wherein the hand grip is formed by a section (302) of the reinforcement element (300) protruding from the wall element (14, 16) to which the reinforcement element (300) is attached.

A27. Load carrier (10) according to any one of the preceding items A, wherein the lock system is adjustable between a locked state, in which disengagement of the lock element (200) from at least the first engagement element (204) is prevented, and an unlocked state.

A28. Load carrier (10) according to item A27 when referring back to item A2, wherein disengagement of the lock element (200) from the first engagement element (104) and the second engagement (204) is prevented in the locked state.

A29. Load carrier (10) according to item A28 when referring back to item A2, wherein the lock system comprises a third engagement element (204) attached to the second wall element (16) spaced apart from the first engagement element (204) and the second engagement element (204), wherein in the locked state, disengagement of the lock element (200) from the first engagement element (204), the second engagement element (204) and third engagement element (204) is prevented.

A30. Load carrier (10) according to any one of the preceding items A, wherein the load carrier (10) is configured for mounting to the rear of the vehicle and the load carrier (10) has a bottom surface (54) inclined upwards away from the vehicle, in particular inclined by about 5° to 20° with respective to horizontal plane when the load carrier (10) is mounted to the vehicle, more particularly by about 10° to 15°.

A31. Load carrier (10) according to item A30, the bottom surface (54) is formed by the first wall element (14) or the second wall element (16).

A32. Load carrier (10) according to item A30 or A31, the bottom surface (54) is inclined upwards away from the vehicle when the load carrier (10) is mounted to the rear of the vehicle.

A33. Load carrier (10) according to any one of items A30 to A32, the load carrier (10) is configured to be adjusted between a use position and a loading position.

A34. Load carrier (10) according to any one of items A30 to A33, wherein the load carrier (10) comprises a mounting device (24) configured for removable attachment of the load carrier (10) to a towing device of the vehicle and/or a base (12) of a load carrier system.

A35. Load carrier (10) according to item 34, wherein the mounting device (24) is configured to allow a person to stand between the rear end of the vehicle and a front side of the load carrier (10).

A36. Load carrier (10) according to any one of the preceding items A, wherein the load carrier (10) comprises a mounting device (24) configured for removable attachment of the load carrier (10) to a towing device of the vehicle, wherein a section of the mounting device (24) is arranged below a mounting section (48) of the mounting device (24) configured for attachment to the vehicle.

A37. Load carrier (10) according to item A36, wherein a section of the mounting device (24) is arranged below the towing device of the vehicle when the load carrier (10) is mounted to the rear of the vehicle.

A38. Load carrier (10) according to item A36 or A37, wherein the mounting device (24) comprises a connection element (50) that at least partially extends downwards when the load carrier (10) is mounted to the rear of the vehicle.

A39. Load carrier (10) according to any one of items A36 to A39, wherein the mounting section (48) is configured for attachment to a tow ball of the vehicle and/or wherein the section of the mounting device (24) arranged below the towing device of the vehicle when the load carrier (10) is mounted to the rear of the vehicle is attached to the first wall element (14) and/or to the second wall element (16).

A40. Load carrier (10) according to any one of items A36 to A40 when referring to any one of items A30 to A35, wherein the inclined bottom surface (54) is partially or fully arranged below the towing device of the vehicle when the load carrier (10) is mounted to the rear of the vehicle.

A41. Load carrier (10) according to any one of the preceding items A, wherein the load carrier (10) is configured for mounting to the rear of the vehicle and wherein the load carrier (10) has a countersunk exterior region (30) at a top forward region.

A42. Load carrier (10) according to item A41, wherein the countersunk exterior region (30) is formed at a top forward corner (26) of the load carrier (10)

and/or wherein the countersunk exterior region (30) is formed in a lid of the load carrier (10)

and/or wherein the countersunk exterior region (30) extends at least as far as a lower edge of a rear lid of the vehicle in a left-right direction.

A43. Load carrier (10) according to item A41 or A42, wherein a transition (32) from the countersunk exterior region (30) to adjacent regions (34) of the load carrier (10) is a stepped transition.

A44. Load carrier (10) according to any one of items A41 to A43, wherein, when the load carrier (10) is mounted to the vehicle, the countersunk exterior region (30) comes closest to a rear lid of vehicle in an upward direction and/or a forward direction.

A45. Load carrier (10) according to any one of items A41 to A44, wherein the load carrier (10) has a projecting exterior region (38) arranged in the countersunk exterior region (30) in a middle region (36) in a left-right direction.

A46. Load carrier (10) according to item A45, wherein the first wall element (14) and the second wall element (16) are hingedly attached to each other at the projecting exterior region (38).

A47. Load carrier (10) according to any one of the preceding items A, wherein the load carrier (10) is configured for mounting to the rear of the vehicle and wherein the load carrier (10) is configured to not obstruct rear lights of the vehicle, a license plate of the vehicle and/or sensors of park assistance system when mounted to the vehicle.

A48. Load carrier (10) according to item A47, wherein a top surface (44) of the load carrier (10) extends below a virtual plane (46) extending from a rear bottom edge of a rear light of the vehicle line backwards at a downward angle of 15° when the load carrier (10) is mounted to the vehicle.

A49. Load carrier (10) according to item A47 or A48, wherein a top surface (44) of the load carrier (10) is angled downwards in the backwards direction in relation to the bottom surface (54) by at least 15° and/or wherein a section of the top surface (44) of the load carrier (10), in particular a section backwards of the countersunk exterior region (30), is angled downwards in the backwards direction by about −2° to 10° when the load carrier (10) is mounted to the vehicle, in particular by about 0° to 5°, more particularly by about 1 to 4°.

A50. Load carrier (10) according to any one of the preceding items A, wherein the load carrier (10) is configured for mounting to the rear of the vehicle and wherein the load carrier (10) is configured to improve aerodynamics of the vehicle with the mounted load carrier as compared to the vehicle without the mounted load carrier, in particular by reducing an aerodynamic drag.

A51. Load carrier (10) according to any one of the preceding items A, wherein a forward facing side of the load carrier is curved in a top-view of the load carrier with a left end section of the forward facing side, in particular a left forward corner, and/or with a right end section of the forward facing side, in particular a right forward corner, extending more forward than a middle section of the forward facing side of the load carrier.

A52. Load carrier (10) according to item A51, wherein the left end section of the forward facing side, in particular the left forward corner, and/or the right end section of the forward facing side, in particular the right forward corner, are arranged closer to the rear of the vehicle when the load carrier is mounted to the vehicle than the middle section of the forward facing side of the load carrier, in particular improving aerodynamics by reducing or preventing airflow capture in the space between the load carrier and the rear of the vehicle during vehicle movement.

A53. Load carrier (10) according to item A51 or A52, wherein the curved shape of the forward facing side of the load carrier reduces an average distance of the forward facing side of the load carrier to the rear of the vehicle when the load carrier is mounted to the vehicle as compared to a load carrier with a substantially forward facing side that is substantially straight in a top view.

A54. Load carrier (10) according to any one of items A50 or A54, wherein the curved shape is at least partially formed by the countersunk region.

A55. Load carrier (10) according to any one of the preceding items A, wherein the load carrier (10) is configured for mounting to the rear of the vehicle and wherein the load carrier (10) is configured to provide a spoiler effect.

A56. Load carrier (10) according to any one of the preceding items A, wherein the load carrier (10) is configured for mounting to the rear of the vehicle and the load carrier (10) tapers from a larger front end towards a smaller rear end.

A57. Load carrier (10) according to any one of the preceding items A, wherein the load carrier (10) is essentially wing-shaped and/or wherein a height of the load carrier (10) tapers from the larger front end towards the smaller rear end, in particular wherein a largest height is about 1.1 to 1.5 time the smallest height of height tapering section, more particularly about 1.2 to 1.4, even more particularly about 1.3 and/or wherein a width of the load carrier (10) tapers from a larger front end towards a smaller rear end, in particular wherein a largest width is about 1.05 to 1.5 times the smallest width of a width tapering section, more particularly about 1.1 to 1.4, even more particularly about 1.2, and/or wherein the load carrier comprises attachment means for rear lights, wherein a top exterior surface extends backwards beyond the rear lights and/or wherein the rear lights are arranged recessed in the load carrier exterior surface and/or wherein any exterior corners of the load carrier (10) are rounded and/or wherein the load carrier (10) comprises a top corner extending in the forward-backward direction, wherein a radius of the corner decreases from the front end of the load carrier (10) towards the rear end and/or wherein the corner increases in sharpness from the front end of the load carrier towards the rear end.

A58. Load carrier (10) according to any one of the preceding items A, wherein the load carrier (10) is configured for mounting to the rear of the vehicle and wherein the load carrier (10) is configured such that a laminar air flow over the vehicle continues as a laminar air flow over the load carrier (10) when the load carrier (10) is mounted to the vehicle and the vehicle is driven forward.

A59. Load carrier (10) according to any one of the preceding items A, the load carrier (10) comprises a foot (100) configured for supporting the load carrier (10) when standing on the ground.

A60. Load carrier (10) according to item A59, wherein the foot (100) has at least one through hole (80) configured for draining liquid from the interior of the load carrier (10)

and/or wherein the foot (100) protrudes from an underside of the load carrier (100)

and/or wherein the foot (100) is a part of the first wall element (14) or the second wall element (16)

and/or wherein the foot (100) is integrally formed in the first wall element (14) or the second wall element (16), and/or wherein the load carrier (10) comprises a plurality of feet (100) configured for supporting the load carrier (10) together when standing on the ground.

A61. Load carrier (10) according to any one of the preceding items A, the load carrier (10) has at least one through hole (80) configured for draining liquid from the interior of the load carrier (10).

A62. Load carrier (10) according to item A61, wherein a first through hole (80) configured for draining liquid from the interior of the load carrier (10) is arranged at a lowest region of the load carrier (10) when mounted to the vehicle and/or wherein a second through hole (80) configured for draining liquid from the interior of the load carrier (10) is arranged at a lowest region of the load carrier (10) when standing on the ground.

A63. Load carrier (10) according to item A61 or A62, an interior bottom surface (56) of the load carrier (10) is divided fluidly into at least two sections by a protrusion (70), wherein the load carrier (10) comprises a through hole (80) configured for draining liquid from the interior of the load carrier (10) for each section.

A64. Load carrier (10) according to item A63, wherein a through hole (80) configured for draining liquid from the interior of the load carrier (10) is arranged at a lowest region of each fluidly divided section of the load carrier (10) when mounted to the vehicle and/or wherein a second through hole (80) configured for draining liquid from the interior of the load carrier (10) is arranged at a lowest region of each fluidly divided section of the load carrier (10) when standing on the ground.

A65. Load carrier (10) according to item A63 or A64, wherein the load carrier (10) comprises a frame (62) that is at least partially arranged in a receptacle formed by the protrusion (70) fluidly dividing the interior bottom surface (56).

A66. Load carrier (10) according to any one of items A60 to A65, wherein the load carrier (10) comprises a plug for at least one of the through holes (80) configured for draining liquid from the interior of the load carrier (10).

A67. Load carrier (10) according to any one of items A60 to A66, wherein the through holes (80) are configured to prevent or minimize spray liquid from entering into the interior during forward driving.

A68. Load carrier (10) according to any one of the preceding items A, wherein the load carrier (10) is configured as load carrier (10) according to any one of claim 15 to 19 and/or as a load carrier (10) of the load carrier system according to any one of claims 1 to 18.

A69. Load carrier system, the load carrier system comprising a vehicle and a load carrier (10) according to any one of the preceding items A mounted to the vehicle.

Item List B

B1. Load carrier system for a vehicle comprising a base (12) and a load carrier (10), wherein the system is configured for attachment of the load carrier (10) to the base (12) with an interlocking engagement of an attachment element (66).

B2. Load carrier system according to item B1, wherein the attachment element (66) is configured as a protruding part of the interlocking engagement and/or wherein the attachment is configured as a bayonet joint or keyhole joint.

B3. Load carrier system according to item B1 or B2, wherein wherein the system is configured for attachment of the load carrier (10) to the base (12) with the following steps:

Tilting the load carrier (10) upwards relative to a mounted position into a tilted position;

Inserting the attachment element (66) of the load carrier (10) into the base (12) in the tilted position.

B4. Load carrier system according to item B3, wherein the system is further configured for attachment of the load carrier (10) to the base (12) with the following steps:

Tilting the load carrier (10) downwards into alignment with a mounted position and/or Sliding the load carrier (10) along the base into the mounted position.

B5. Load carrier system according to any one of the preceding items B, wherein the base (12) comprises a receiving element (58), wherein the load carrier system is configured for insertion of the attachment element (66) of the load carrier (10) into the receiving element (58).

B6. Load carrier system according to item B5, wherein the base (12) comprises a frame and the receiving element (58) is configured as part of the frame and/or wherein the receiving element (58) is a hollow bar with a hole (72) for insertion of the attachment element (66) at its top side and/or wherein the base (12) comprises two receiving elements (58) arranged parallel and spaced apart to each other and/or wherein the receiving element (58) forms a keyhole.

B7. Load carrier system according to any one of the preceding items B, wherein the attachment element (66) is attached with an end to a body and/or support frame (62) of the load carrier (10)

and/or wherein the attachment element (66) comprises at least two flanges (76, 68) supporting the attachment element (66) against the body and/or support frame (62) of the load carrier (10) and/or the receiving element (58).

B8. Load carrier system according to any one of the preceding items B, wherein the attachment element (66) is attached to the body and/or support frame (62) of the load carrier (10) with an attachment device.

B9. Load carrier system according to item B8, wherein the attachment device is only accessible from an interior of the load carrier (10)

and/or wherein the attachment device is configured for providing a biased snap-in connection and/or wherein the attachment device comprises at least one of the following: a nut, a screw, a bolt or a tension lever.

B10. Load carrier system according to any one of the preceding items B, wherein the system is configured for detachment of the load carrier (10) from the base (12) with the following steps:

Tilting the load carrier (10) upwards out of alignment with the mounted position and/or Sliding the attachment element (66) out of the base (12) in the tilted position.

B11. Load carrier system according to any one of the preceding items B, wherein an end of the attachment element (66) inserted into the base (12) comprises a protrusion (70) that is configured to engage the base (12) in the mounted position to block a sliding movement of the attachment element (66) in the base (12).

B12. Load carrier system according to item B11, wherein the protrusion (70) of the attachment element (66) engages a recess or hole (74) of the frame of the base (12) in the mounted position.

B13. Load carrier system according to any one of the preceding items B, wherein the system is configured for detachment of the load carrier (10) from the base (12) with the following step:

Disengaging the protrusion (70) of the attachment element (66) from the base (12) to allow a sliding movement of the attachment element (66) in the base.

B14. Load carrier system according to any one of the preceding items B, wherein the attachment element (66) is protruding from the bottom surface (54) of the load carrier (10)

and/or wherein the attachment element (66) is substantially hook shaped and/or wherein the attachment element (66) is immovably relative to the bottom surface (54) of the load carrier (10)

and/or wherein the attachment element (66) extends essentially in a forward-backward direction and/or wherein the load carrier (10) comprises two attachment elements (66) arranged parallel and spaced apart to each other.

B15. Load carrier system according to any one of the preceding items B, wherein the base (12) is configured for attachment to a motor vehicle.

B16. Load carrier system according to any one of the preceding items B, wherein the base (12) is configured for removable attachment to a towing device of the vehicle.

B17. Load carrier for a vehicle, wherein the load carrier (10) is configured for mounting to a base (12) of a load carrier system with an interlocking attachment.

B18. Load carrier according to item B17, wherein the load carrier (10) comprises an attachment element (66) protruding from a bottom surface (54) of the load carrier (10), and the load carrier (10) is configured for insertion of the attachment element (66) in the base (12) in a position of the load carrier (10) tilted relative to a mounted position and/or wherein the load carrier (10) is configured as the load carrier (10) of the load carrier system according to any one of preceding claims 1 to 16.

B19. Load carrier (10) according to items B17 or B18, wherein the attachment element (66) is substantially hook shaped with one end attached to a body of the load carrier (10) and an opposing end configured as a free end for insertion in the base.

B20. Load carrier (10) according to item B19, wherein the attachment element (66) is essentially L-shaped, C-shaped or J-shaped.

B21. Load carrier (66) according to any one of items B17 to B20, wherein the load carrier (66) is configured for mounting to the rear of the vehicle, wherein the load carrier (10) comprises a first wall element (14) and a second wall element (16), wherein the two wall elements (14, 16) are moveable relative to each other between a closed state enclosing an interior volume of the load carrier (10) and an open state, wherein the load carrier (10) further comprises a lock system for releasably engaging the two wall elements (14, 16) to each other in the closed state, wherein the lock system comprises a lock element (200) attached to the first wall element (14) and a first engagement element (204) attached to the second wall element (16) and a second engagement element (204) attached to the second wall element (16) spaced apart from the first engagement element (204) attached to the second wall element (16), and wherein the lock element (200) is configured to move along a predetermined engagement path to engage the engagement elements (204), wherein the lock system is adjustable between a locked state and an unlocked state, wherein disengagement of the lock element (200) from the first engagement element (204) and the second engagement (204) is prevented in the locked state, wherein the first wall element (14) or the second wall element (16) has a non-planar section and wherein the load carrier (10) is configured to align the lock element (200) and the engagement elements (204) with the predetermined engagement path, the load carrier (10) further comprising a reinforcement element (300) attached to the first wall element (14) or the second wall element (16), wherein the load carrier (10) has a bottom surface (54) inclined upwards away from the vehicle, wherein the load carrier (10) comprises a mounting device (24) configured for removable attachment of the load carrier (10) to a towing device of the vehicle, wherein a section of the mounting device (24) is arranged below a mounting section (48) of the mounting device (24) configured for attachment to the vehicle and wherein the load carrier (10) has a countersunk exterior region (30) at a top forward region, wherein the load carrier (10) is configured to not obstruct rear lights of the vehicle, a license plate of the vehicle and/or sensor of park assistance system when mounted to the vehicle, wherein the load carrier (10) is configured to improve aerodynamics of the vehicle with the mounted load carrier as compared to the vehicle without the mounted load carrier, in particular by reducing an aerodynamic drag and/or by providing a spoiler effect and wherein the load carrier (10) comprises a foot (100) configured for supporting the load carrier (10) when standing on the ground, wherein the foot (100) has at least one through hole (80) configured for draining liquid from the interior of the load carrier (10).

B22. Load carrier (10) according to any one of items B17 to B21 wherein the load carrier (10) is configured
for rear mounting
and/or
as a roof top load carrier
and/or
as a box
and/or
as a bike carrier
and/or
as a ski carrier
and/or
as a tray
and/or
as scooter carrier
and/or
as a load carrier according to any one of items A.

B23. Method of attaching a load carrier (10) to a base (12), the method comprising the following steps:

Tilting the load carrier (10) upwards relative to a mounted position into a tilted position;

Inserting an attachment element (66) of the load carrier (10) into the base (12) in the tilted position.

B24. Method according to item B23, the method further comprising at least one of the following steps:

Resting the load carrier (10) on the base (12) before tilting the load carrier (10) upwards;

Tilting the load carrier (10) downwards into alignment with a mounted position;

Sliding the load carrier (10) along the base into the mounted position.

B25. Method according to item B23 or B24, wherein the upwards tilting is a rotation of an end section of the load carrier (10) away from the base (12)
and/or
the downwards tilting is a rotation of the end section of the load carrier (10) towards the base (12)
and/or
the upwards tilting is a rotation transversal to a direction of travel of a vehicle when the base (12) is mounted to the vehicle
and/or
the sliding along the base is a transversal movement of the load carrier (10) towards a front end of the base (12).

B26. Method according to any one of items B23 to B25, wherein the load carrier (10) is resting with an end section on the base (12) during tilting
and/or
the load carrier (10) is resting with an end section on the base (12) in the tilted position
and/or
the load carrier (10) is resting on the base (12) with a bottom surface (54) in the mounted position
and/or
at least a section of the bottom surface (54) of the load carrier (10) resting on the base (12) in the mounted position is spaced apart from the base (12) in the tilted position
and/or
the load carrier (10) is slid along the base (12) for the insertion of the attachment element (66) in the tilted position.

B27. Method according to any one of items B23 to B26, further comprising at least one of the following steps:

Providing a load carrier system according to any one of claims 1 to 17; and Providing a load carrier (10) according to any one of claims 18 to 22.

Item List C

C1. Load carrier system for a vehicle comprising a base (12) and a load carrier (10), wherein the system is configured for attachment of the load carrier (10) to the base (12) with an interlocking engagement of an attachment element (66).

C2. Load carrier system according to item C1, wherein the attachment element (66) is configured as a protruding part of the interlocking engagement
and/or
wherein the attachment is configured as a bayonet joint and/or keyhole joint
and/or
wherein the attachment element is configured as a screw element with a head protruding from a bottom of the load carrier (10).

C3. Load carrier system according to item C1 or C2, wherein wherein the system is configured for attachment of the load carrier (10) to the base (12) with the following steps:

Tilting the load carrier (10) upwards relative to a mounted position into a tilted position;

Inserting the attachment element (66) of the load carrier (10) into the base (12) in the tilted position, wherein the system further optionally configured for attachment of the load carrier (10) to the base (12) with the following steps:

Tilting the load carrier (10) downwards into alignment with a mounted position and/or Sliding the load carrier (10) along the base into the mounted position wherein the system optionally is configured for detachment of the load carrier (10) from the base (12) with the following steps:

Tilting the load carrier (10) upwards out of alignment with the mounted position and/or Sliding the attachment element (66) out of the base (12) in the tilted position.

C4. Load carrier system according to item C1 or C2, wherein wherein the system is configured for attachment of the load carrier (10) to the base (12) with the following steps:

Arranging the load carrier (10) spaced away from a mounted position, in particular essentially parallel to the mounted position and/or resting on the base;

Inserting the attachment element (66) of the load carrier (10) into the base (12), in particular with a forward sliding motion, wherein the system further optionally configured for attachment of the load carrier (10) to the base (12) with the following steps:

tightening a screw connecting the load carrier to the base.

C5. Load carrier system according to any one of the preceding items C, wherein the base (12) comprises a receiving element (58), wherein the load carrier system is configured for insertion of the attachment element (66) of the load carrier (10) into the receiving element (58), optionally wherein the base (12) comprises a frame and the receiving element (58) is configured as part of the frame and/or wherein the receiving element (58) is attached to the frame, in particular with a snap-connection, and/or optionally wherein the receiving element (58) is a hollow bar with a hole (72) for insertion of the attachment element (66) at its top side and/or optionally wherein the base (12) comprises two receiving elements (58) arranged parallel and spaced apart to each other and/or optionally wherein the receiving element (58) forms a keyhole and/or optionally the receiving element has a sloped surface configured to guide the attachment element into the interlocking engagement with the base.

C6. Load carrier system according to any one of the preceding items C, wherein the attachment element (66) is attached with an end to a body and/or support frame (62) of the load carrier (10)

and/or wherein the attachment element (66) comprises at least two flanges (76, 68) supporting the attachment element (66) against the body and/or support frame (62) of the load carrier (10) and/or the receiving element (58)

and/or the attachment element (66) is attached to the body and/or support frame (62) of the load carrier (10) with an attachment device, in particular wherein the attachment device is only accessible from an interior of the load carrier (10)

and/or in particular wherein the attachment device is configured for providing a biased snap-in connection and/or in particular wherein the attachment device comprises at least one of the following: a nut, a screw, a bolt or a tension lever.

C7. Load carrier system according to any one of the preceding items C, wherein an end of the attachment element (66) inserted into the base (12) comprises a protrusion (70) that is configured to engage the base (12) in the mounted position to block a sliding movement of the attachment element (66) in the base (12), wherein the protrusion (70) of the attachment element (66) optionally engages a recess or hole (74) of the frame of the base (12) in the mounted position and/or wherein the system is optionally configured for detachment of the load carrier (10) from the base (12) with the following step:

Disengaging the protrusion (70) of the attachment element (66) from the base (12) to allow a sliding movement of the attachment element (66) in the base.

C8. Load carrier system according to any one of the preceding items C1 to C7, wherein the load carrier (10) is fixed to the base (12) with at least one additional screw spaced apart from the attachment element (66), in particular wherein the screw blocks a sliding movement of the load carrier (10) relative to the base (12).

C9. Load carrier system according to any one of the preceding items C, wherein the attachment element (66) is protruding from the bottom surface (54) of the load carrier (10)

and/or wherein the attachment element (66) is substantially hook shaped and/or wherein the attachment element (66) is immovably relative to the bottom surface (54) of the load carrier (10)

and/or wherein the attachment element (66) extends essentially in a forward-backward direction and/or wherein the load carrier (10) comprises two attachment elements (66) arranged parallel and spaced apart to each other.

C10. Load carrier system according to any one of the preceding items C, wherein the base (12) is configured for attachment to a motor vehicle.

and/or wherein the base (12) is configured for removable attachment to a towing device of the vehicle.

C11. Load carrier for a vehicle, wherein the load carrier (10) is configured for mounting to a base (12) of a load carrier system with an interlocking attachment, wherein the load carrier (10) optionally comprises an attachment element (66) protruding from a bottom surface (54) of the load carrier (10), and the load carrier (10) is optionally configured for insertion of the attachment element (66) in the base (12) in a position of the load carrier (10) tilted relative to a mounted position and/or wherein the load carrier (10) is optionally configured as the load carrier (10) of the load carrier system according to any one of preceding items C1 to C8.

C12. Load carrier (10) according to item C11, wherein the attachment element (66) is substantially hook shaped with one end attached to a body of the load carrier (10) and an opposing end configured as a free end for insertion in the base and/or wherein the attachment element (66) is essentially L-shaped, C-shaped or J-shaped.

C13. Load carrier (66) according to any one of items C10 to C12, wherein the load carrier (66) is configured for mounting to the rear of the vehicle, wherein the load carrier (10) comprises a first wall element (14) and a second wall element (16), wherein the two wall elements (14, 16) are moveable relative to each other between a closed state enclosing an interior volume of the load carrier (10) and an open state, wherein the load carrier (10) further comprises a lock system for releasably engaging the two wall elements (14, 16) to each other in the closed state, wherein the lock system comprises a lock element (200) attached to the first wall element (14) and a first engagement element (204) attached to the second wall element (16) and a second engagement element (204) attached to the second wall element (16) spaced apart from the first engagement element (204) attached to the second wall element (16), and wherein the lock element (200) is configured to move along a predetermined engagement path to engage the engagement elements (204), wherein the lock system is adjustable between a locked state and an unlocked state, wherein disengagement of the lock element (200) from the first engagement element (204) and the second engagement (204) is prevented in the locked state, wherein the first wall element (14) or the second wall element (16) has a non-planar section and wherein the load carrier (10) is configured to align the lock element (200) and the engagement elements (204) with the predetermined engagement path, the load carrier (10) further comprising a reinforcement element (300) attached to the first wall element (14) or the second wall element (16), wherein the load carrier (10) has a bottom surface (54) inclined upwards away from the vehicle, wherein the load carrier (10) comprises a mounting device (24) configured for removable attachment of the load carrier (10) to a towing device of the vehicle, wherein a section of the mounting device (24) is arranged below a mounting section (48) of the mounting device (24) configured for attachment to the vehicle and wherein the load carrier (10) has a countersunk exterior region (30) at a top forward region, wherein the load carrier (10) is configured to not obstruct rear lights of the vehicle, a license plate of the vehicle and/or sensor of park assistance system when mounted to the vehicle, wherein the load carrier (10) is configured to improve aerodynamics of the vehicle with the mounted load carrier as compared to the vehicle without the mounted load carrier, in particular by reducing an aerodynamic drag and/or by providing a spoiler effect and wherein the load carrier (10) comprises a foot (100) configured for supporting the load carrier (10) when standing on the ground, wherein the foot (100) has at least one through hole (80) configured for draining liquid from the interior of the load carrier (10).

C14. Method of attaching a load carrier (10) to a base (12), the method comprising the following steps:

Tilting the load carrier (10) upwards relative to a mounted position into a tilted position and/or arranging the load carrier (10) substantially parallel onto the base (12) spaced away from the mounted position;

Inserting an attachment element (66) of the load carrier (10) into the base (12).

C15. Method according to item C14, the method further comprising at least one of the following steps:

Resting the load carrier (10) on the base (12) before inserting the attachment element (66) into the base (12) and/or before tilting the load carrier (10) upwards;

Tilting the load carrier (10) downwards into alignment with a mounted position;

Sliding the load carrier (10) along the base into the mounted position;

Providing a load carrier system according to any one of claims 1 to 8; and Providing a load carrier (10) according to any one of claims 9 to 11.

C16. Method according to items C14 or C15, wherein the upwards tilting is a rotation of an end section of the load carrier (10) away from the base (12)

and/or the downwards tilting is a rotation of the end section of the load carrier (10) towards the base (12)

and/or the upwards tilting is a rotation transversal to a direction of travel of a vehicle when the base (12) is mounted to the vehicle and/or the sliding along the base is a transversal movement of the load carrier (10) towards a front end of the base (12).

C17. Method according to any one of items C14 to C16, wherein the load carrier (10) is resting with an end section on the base (12) during tilting and/or the load carrier (10) is resting with an end section on the base (12) in the tilted position and/or the load carrier (10) is resting on the base (12) with a bottom surface (54) in the mounted position and/or at least a section of the bottom surface (54) of the load carrier (10) resting on the base (12) in the mounted position is spaced apart from the base (12) in the tilted position and/or the load carrier (10) is slid along the base (12) for the insertion of the attachment element (66) in the tilted position.

DETAILED DESCRIPTION OF EXEMPLARY EMBODIMENTS OF THE INVENTION

Figure 1:
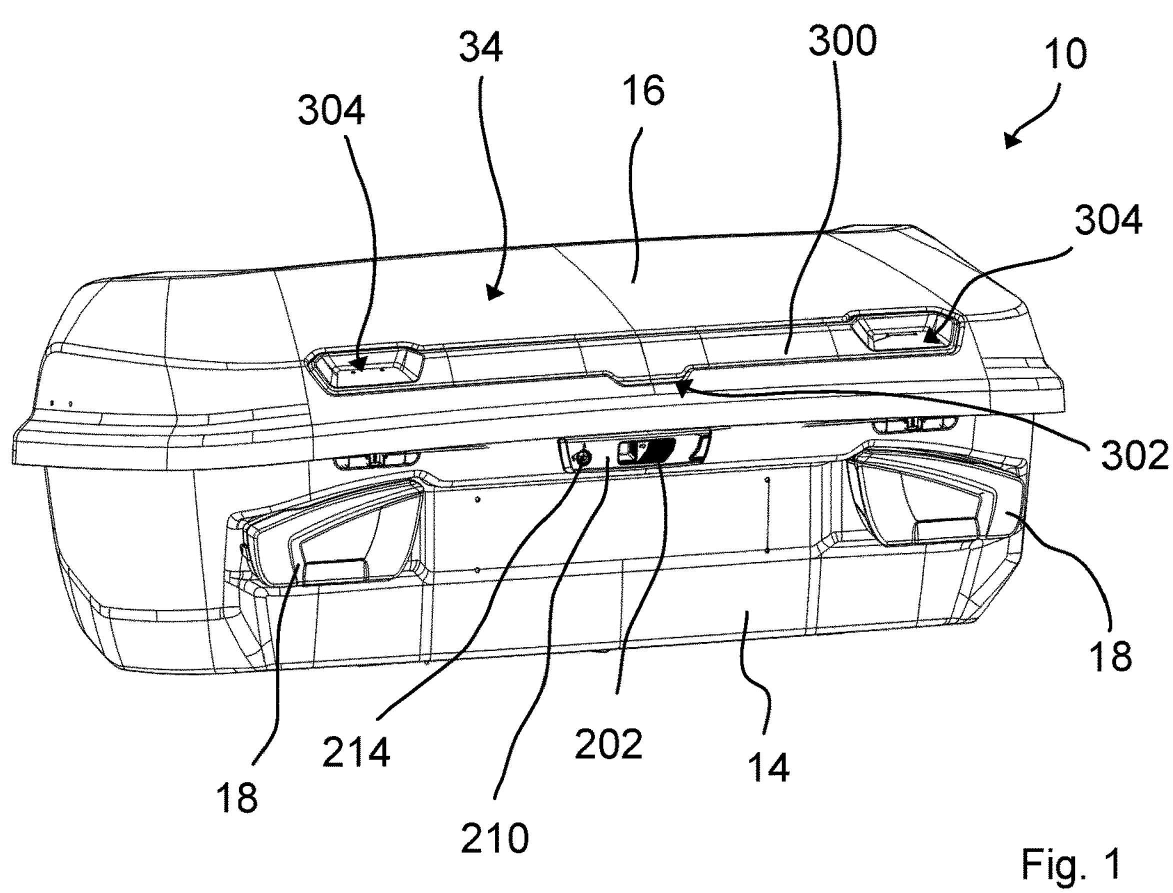
FIG. 1 illustrates in a rear perspective view an embodiment of a load carrier configured for mounting to the rear of a vehicle in a rear perspective view.

FIG. 1 illustrates an embodiment of a load carrier 10 in a perspective rear view. The load carrier 10 is configured for mounting to the rear of a vehicle via an attached base 12, which can best be seen in FIG. 3 and FIG. 5. The load carrier 10 and the base 12 together form a load carrier system.

The load carrier 10 has a body that is primarily formed by a first wall element 14 and second wall element 16. The first wall element 14 is configured as a tub. The tub forms the bottom of the load carrier 10 when mounted to the vehicle. The second wall element 16 forms a lid. The lid forms a top of the load carrier 10 when mounted to the vehicle. The load carrier 10 therefore has an upwards-downward direction, which corresponds essentially to a vertical axis when mounted to the vehicle and which corresponds to an upward-downward direction in the plane of FIG. 1. An extension of the load carrier in the upwards-downwards direction is a height of the load carrier 10. Both wall elements 14, 16 are each configured as unitarian one-piece that is manufactured in a thermoforming process.

Figures 19, 20:
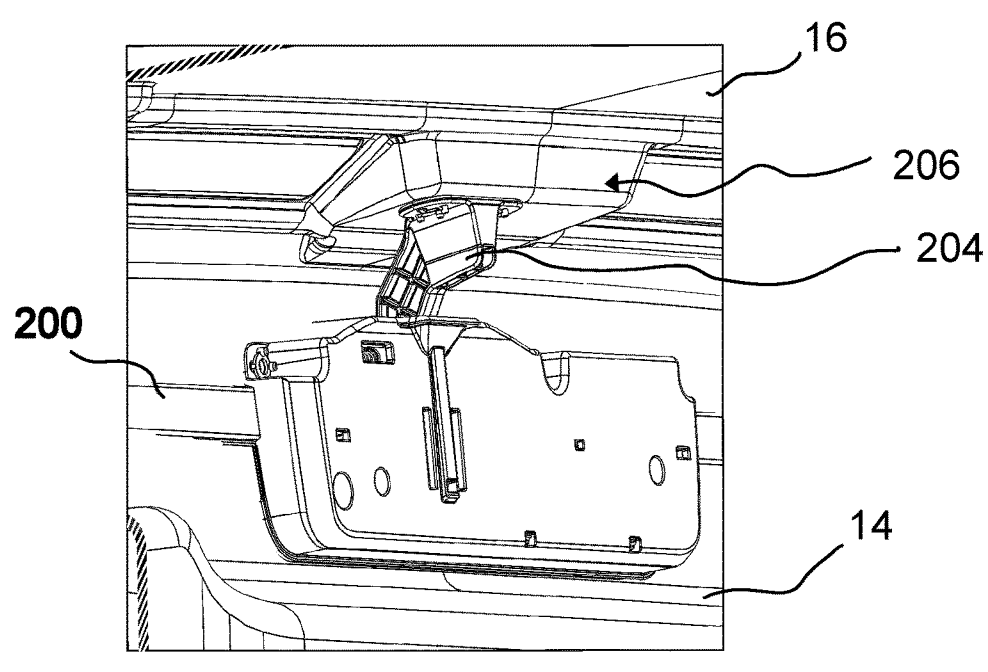
FIG. 19 illustrates the interior of the load carrier of FIG. 1 in another perspective rear view.
FIG. 20-23 illustrate details of the lock system in different views.
Figure 21:
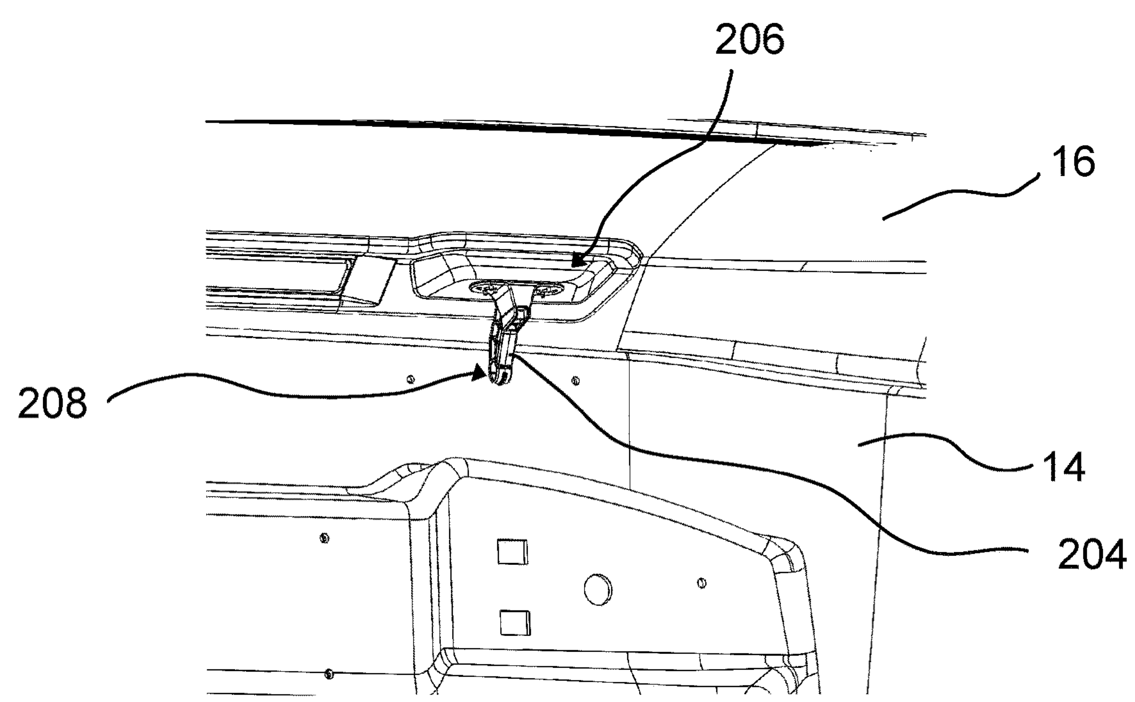
Figure 22:
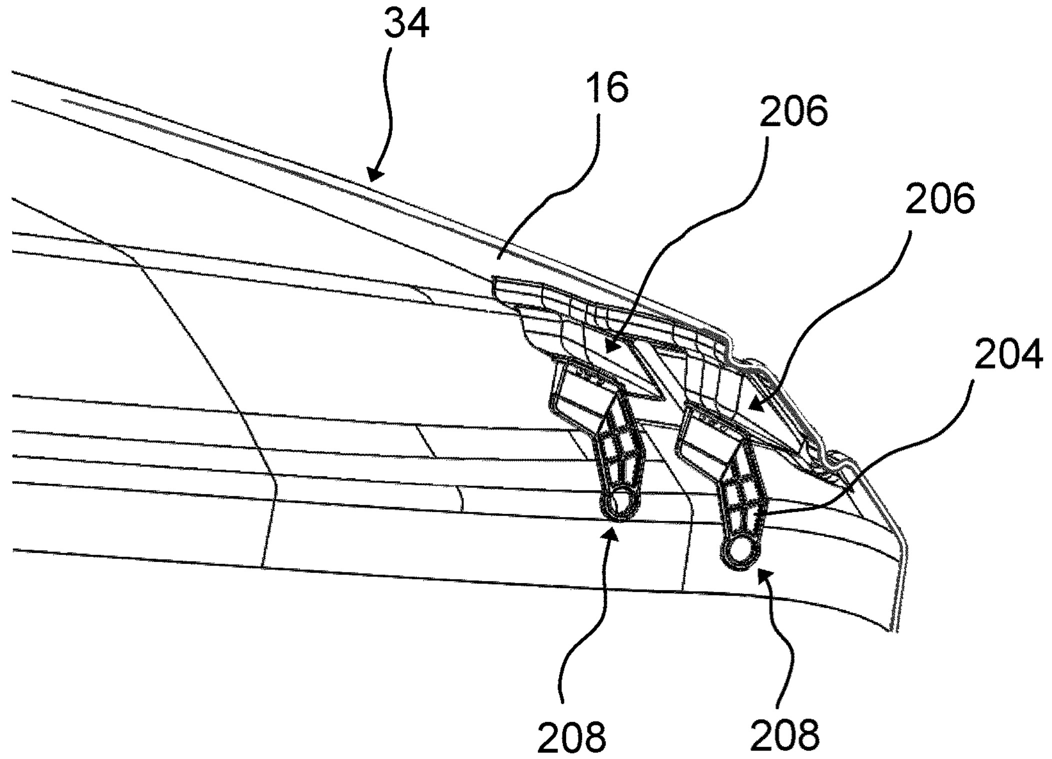
Figure 23:
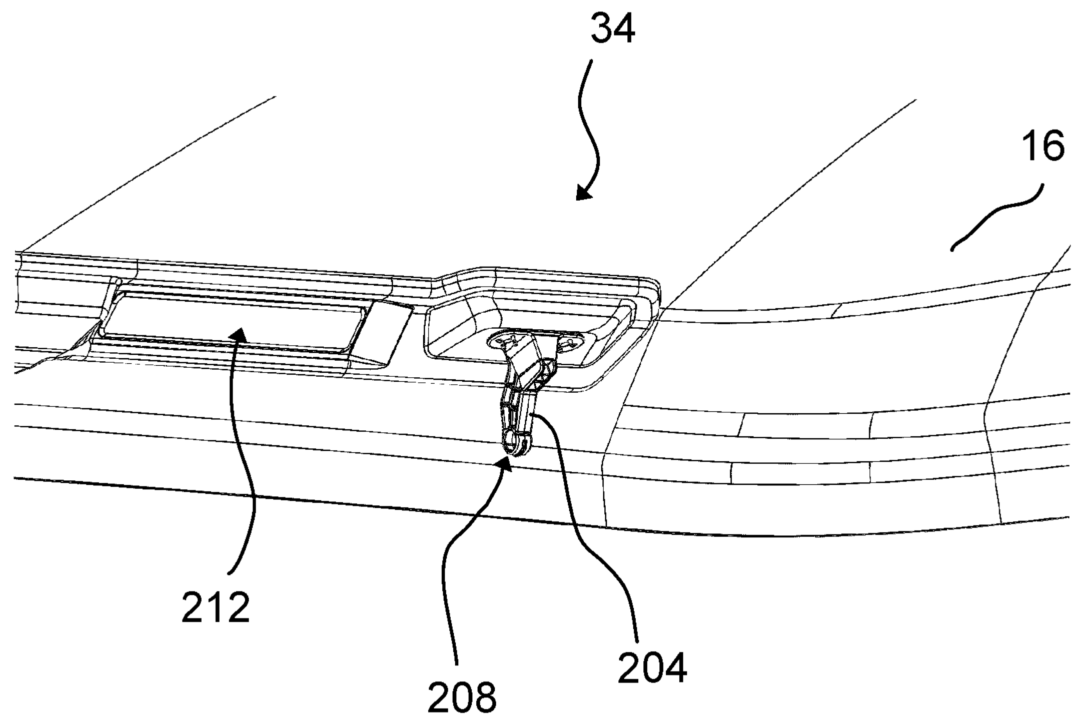
Figure 24:
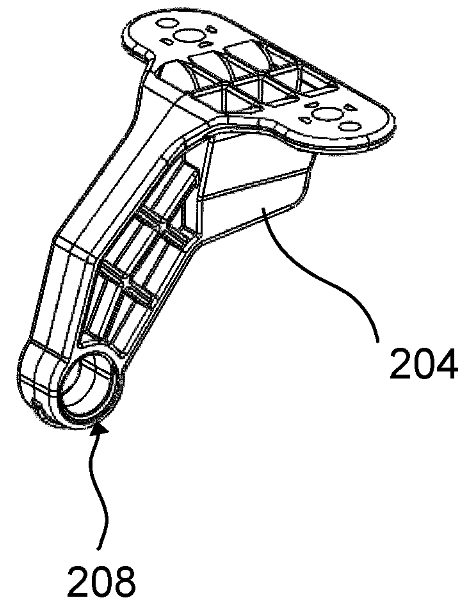
FIG. 24 illustrates an engagement element of the lock system in a perspective view.
Figure 25:
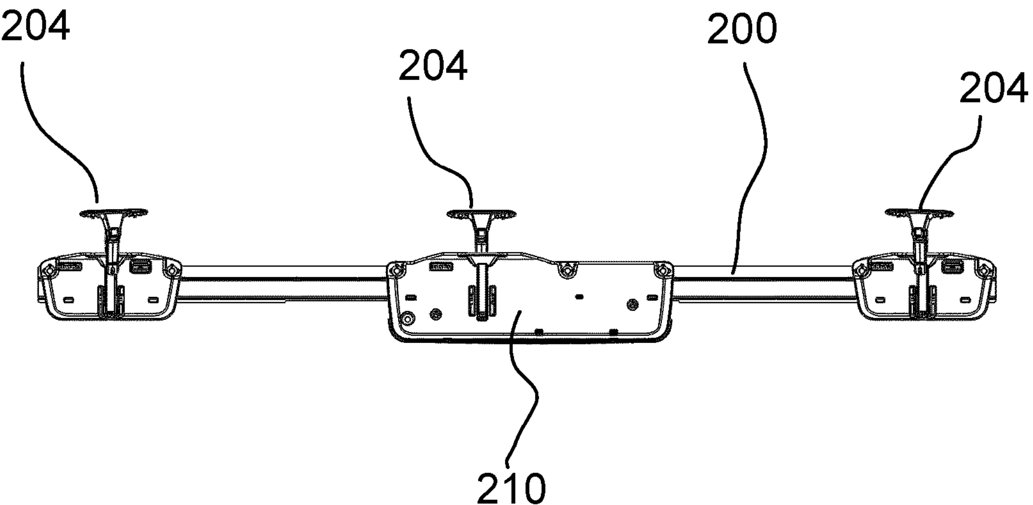
FIG. 25 illustrates three engagement elements and a lock element of the lock system in an elevational rear view.

The two wall elements 14, 16 are moveable relative to each other between a closed state, which is shown in FIG. 1 and which encloses an interior volume for storing objects, and an open state. The interior volume of the load carrier 10 can be partially seen, for example, in FIG. 19. The second wall element 16 is pivotably connected to the first wall element 14 at two opposite ends with a hinge 20. A pivot axis of the second wall element 16 relative to the first wall element 14 is located at a forward lower corner of the second wall element 16 and thus at a junction of the two wall elements 14, 16. The two opposite ends are arranged at a left side and a right side of the load carrier 10. The left-right direction corresponds to the left-right direction of the vehicle when the load carrier 10 is mounted to the vehicle. An extension of the load carrier in the left-right direction is a width of the load carrier 10. The pivot axis of the second wall element 16 relative to the first wall element 14 extends in the left-right direction.

The load carrier 10 comprises two attachment means 18 for rear lights. A side of the load carrier 10 facing the viewer in FIG. 1 is a rear side. An opposite side is facing the vehicle when the load carrier 10 is mounted to the vehicle and forms a front side. An axis between the rear side and the front side corresponds to a forward-backward direction of the load carrier 10. The forward-backward direction of the load carrier 10 corresponds to a forward-backward direction of the vehicle. The side of the vehicle, to which the load carrier 10 can be mounted, is a rear side.

Figure 2:
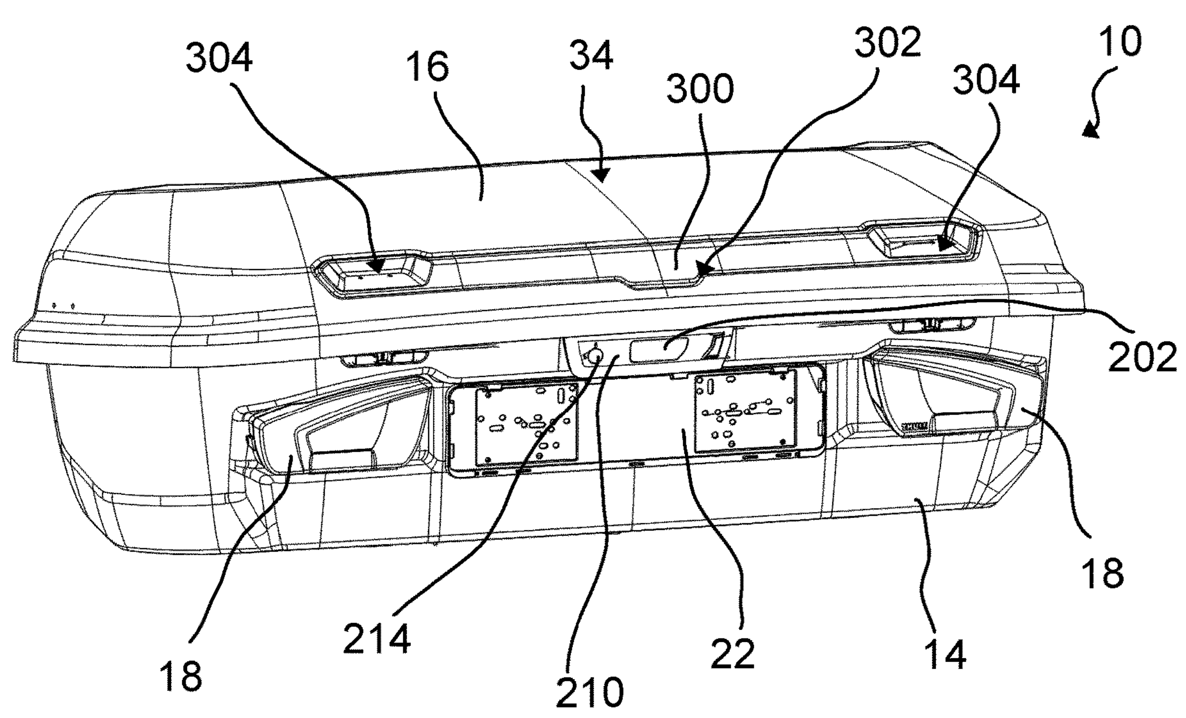
FIG. 2 illustrates the load carrier of FIG. 1 with an attached license plate holder in a rear perspective view.

FIG. 2 shows an additional license plate holder 22 mounted to the rear side of the first wall element 14. For that purpose, the first wall element 14 comprises several holes that are configured for mounting of the license plate holder 22, as can be seen in FIG. 1.

Figure 3:
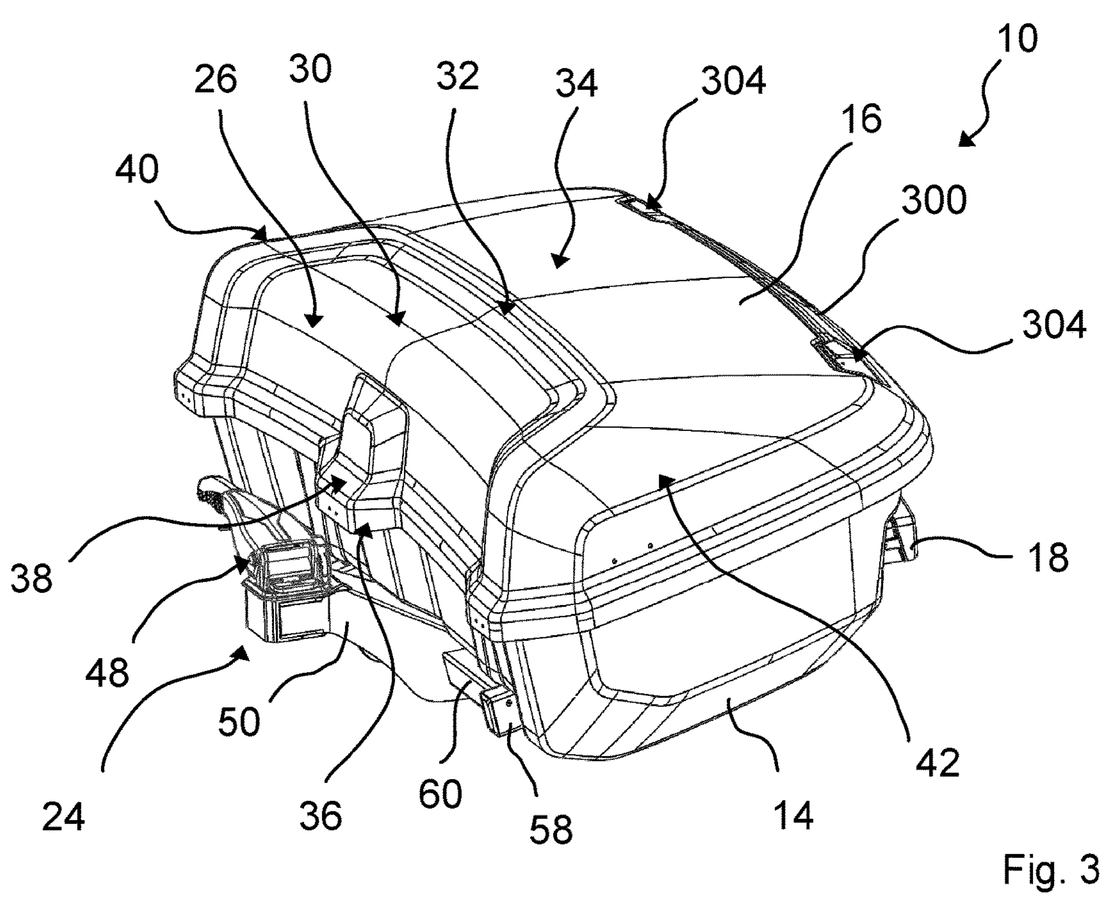
FIG. 3 illustrates the load carrier of FIG. 1 in a frontal perspective view and a base configured for attaching the load carrier to the vehicle in a bottom perspective view, the base and the load carrier together forming a load carrier system.
Figure 4:
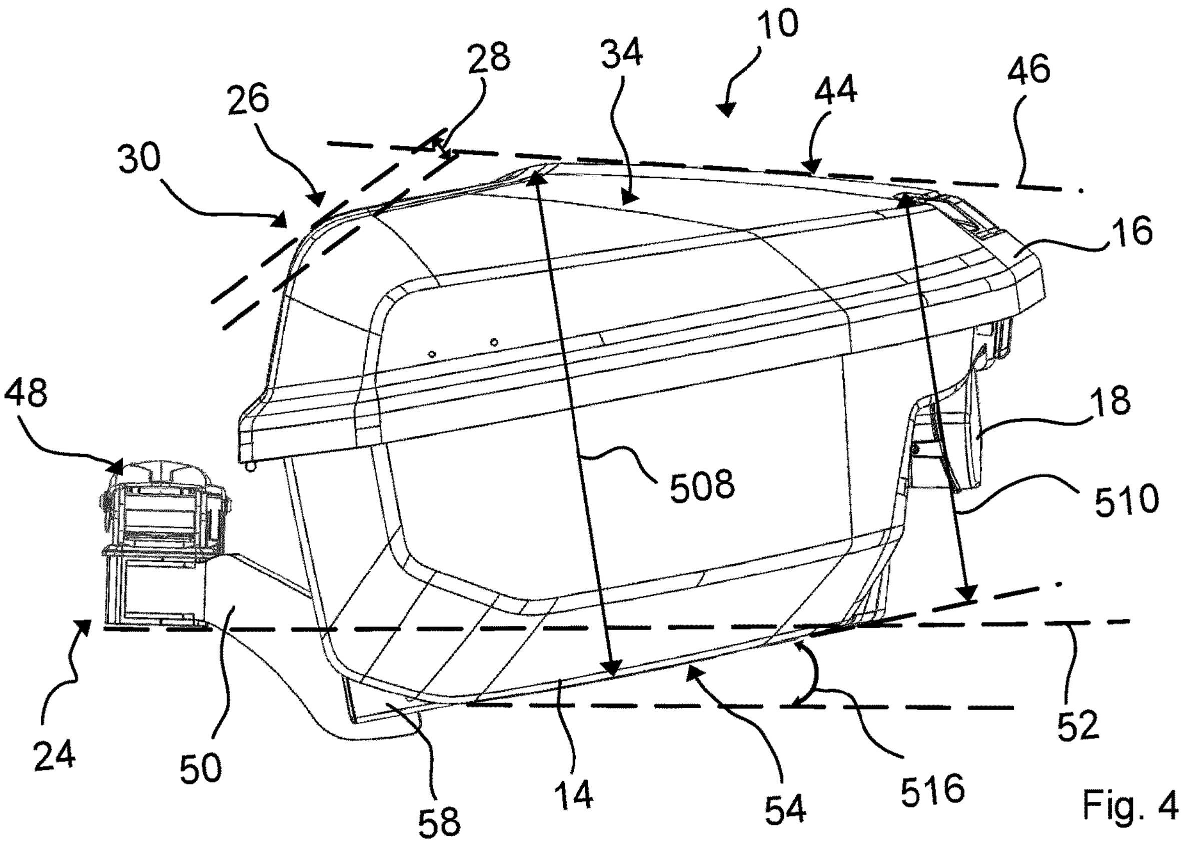
FIG. 4 illustrates the load carrier of FIG. 1 in a side view.
Figures 5, 6:
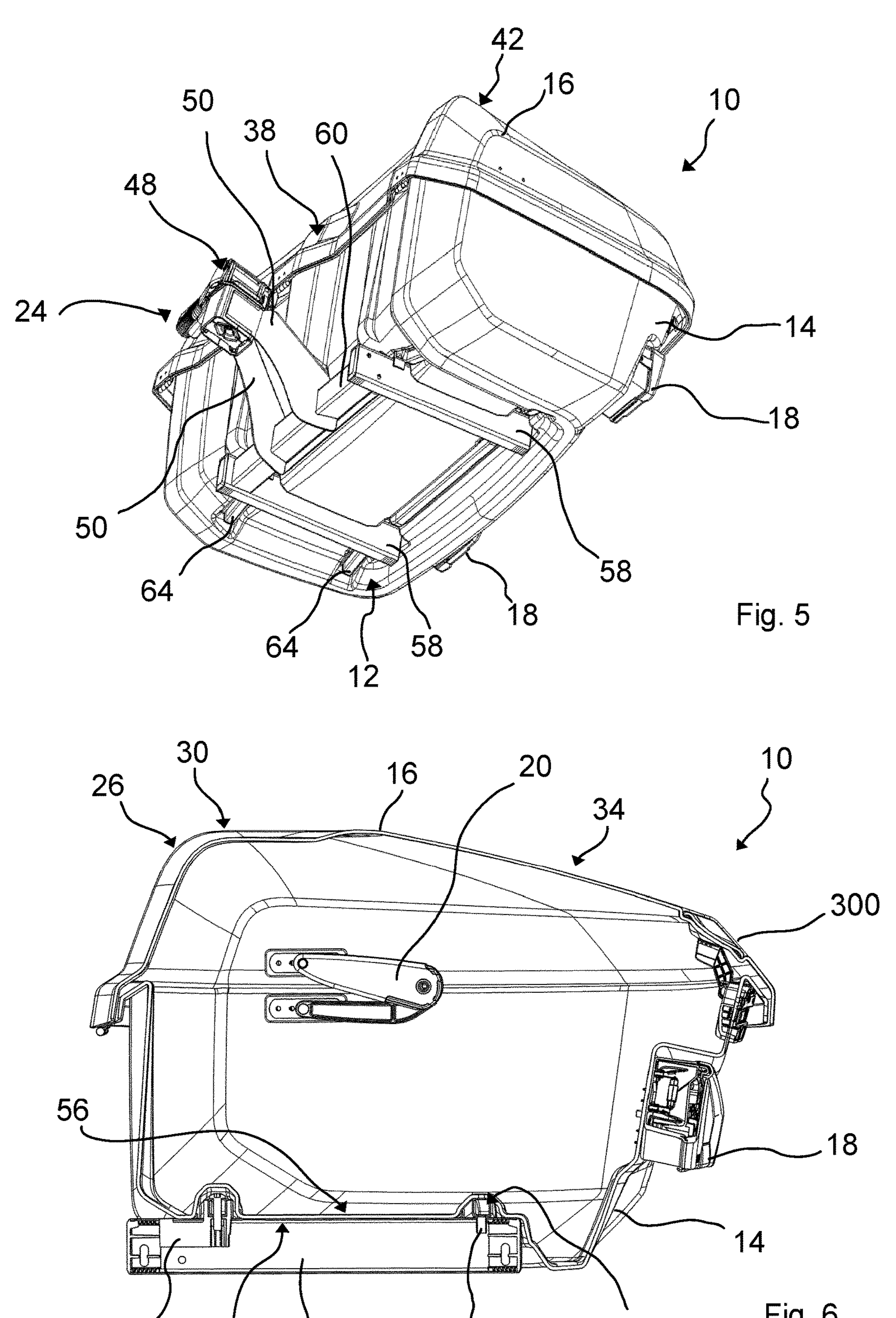
FIG. 5 illustrates the load carrier of FIG. 1.
FIG. 6 illustrates an attachment of the base to the load carrier of FIG. 1 in a sectional view.

The load carrier 10 comprises a mounting device 24, which can, for example, be seen in FIGS. 3 to 5. The mounting device 24 comprises a clamp that is configured for removable fixation of the base 12 to a towing device of the vehicle in the form of a tow ball so that the base 12 may attach the load carrier 10 supports thereon to the vehicle.

An exterior region 30 of the load carrier 10 formed by a top forward corner 26 is countersunk. As can be seen in FIG. 3, said countersunk exterior region 30 therefore does not extend as far forward towards the vehicle as the outermost top corners of the load carrier on the left and the right side. The countersunk exterior region 30 increases clearance relative to a rear lid of the vehicle when the load carrier 10 is mounted to the vehicle. This additional clearance is marked in FIG. 4 with arrow 28. The rear lid of the vehicle may therefore still be opened even if the load carrier 10 is mounted very close to the rear of the vehicle without requiring the load carrier 10 to be moved out of the way. The countersunk exterior region 30 only extends as far in the left-right direction as a lower edge of the rear lid of the vehicle so that overall interior volume is large.

The countersunk exterior region 30 is located in the second wall element 16. A transition 32 between the countersunk exterior region 30 and an adjacent region 34 surrounding the countersunk exterior region 30 is configured as a stepped transition 32. The stepped transition 32 increases stiffness of the lid in that area so that the second wall element 16 may be thinner than without such a stepped transition without risk of too large deformation during opening and closing of the load carrier 10.

A projecting exterior region 38 is arranged in a middle region 36 of the countersunk exterior 30. The projecting exterior region 36 provides additional room for an optional part of the hinge 20. The hinge construction can thus be reinforced without loss of interior volume for storage of objects in the load carrier 10. The projecting exterior region 38 is arranged below the top forward corner 26 but may extend into the top forward corner 26 in other embodiments.

Figures 7, 8:
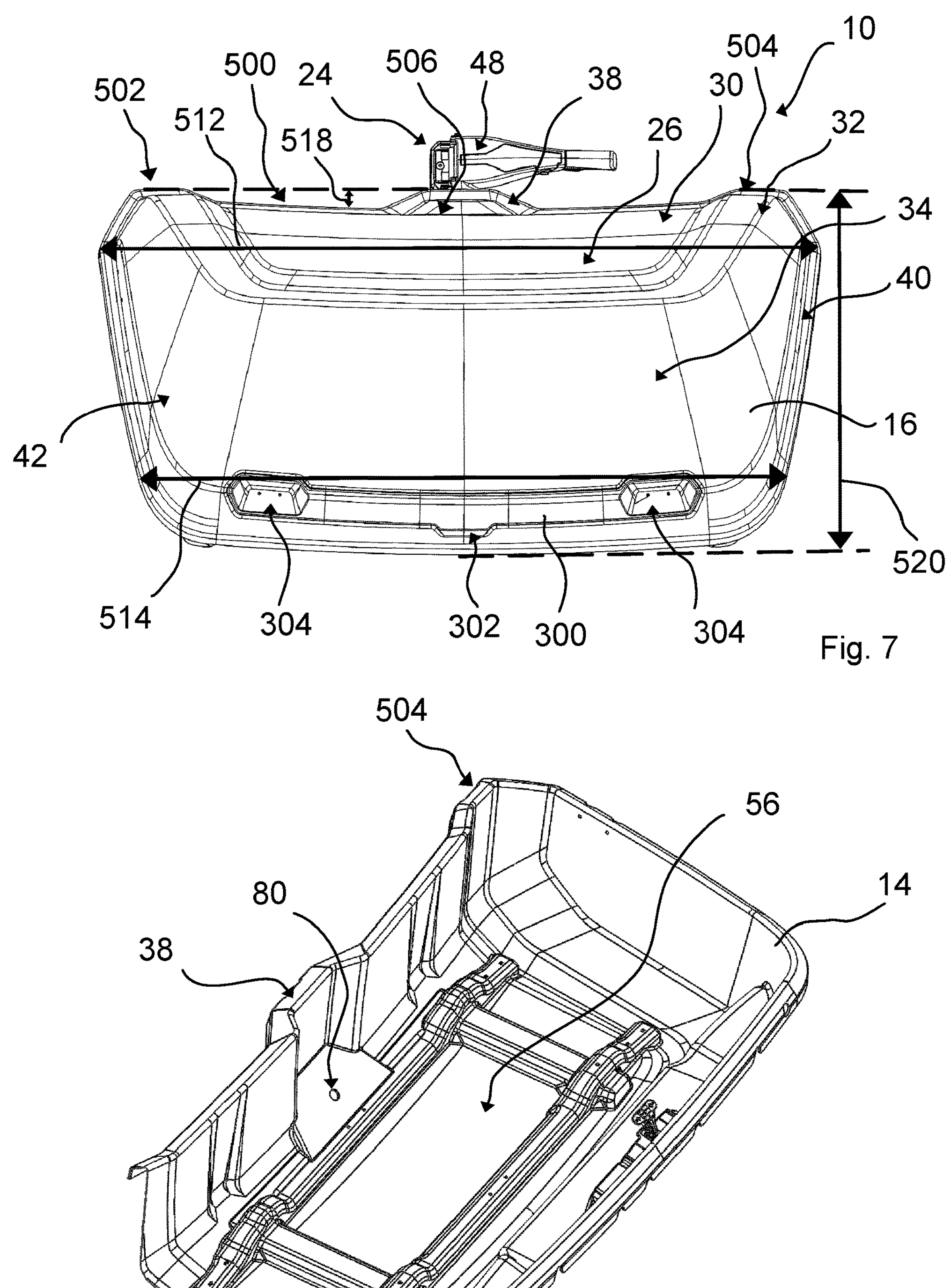
FIG. 7 illustrates the load carrier of FIG. 1 in a top view.
FIG. 8 illustrates a bottom part of an interior of the load carrier of FIG. 1 in a top perspective view.

The countersunk region 30 has a depth 518 in the forward-backward direction when seen in a top view that is about 0.02 to 0.2 times a length of a length 520 of the load carrier 10 in the forward-backward direction, as illustrated in FIG. 7. The depth 518 may be about 0.03 to 0.1 times a length of a length 520 of the load carrier 10 in the forward-backward direction, as illustrated in FIG. 4. In the shown example, the depth 518 is about 0.05 times the length of the length 520 of the load carrier 10. The depth 518 is measured as a length between the forward facing side 500 directly adjacent in the left or right direction of the projecting exterior region 38. The length 520 may be maximum length of the load carrier 10 seen in a top view. The length 520 may be measured from a most forward section of the front surface 500 to the rear surface of the load carrier.

The load carrier 10 is configured to provide a spoiler effect. The load carrier tapers from a larger front end towards a smaller rear end. As can be seen in FIG. 4, a height of the load carrier 10 is larger at the front than at the rear. As can be seen in FIG. 7, a width of the load carrier 10 is larger at the front than at the rear. A top corner 40 on the left side of the load carrier 10 and a top corner 42 on the right side of the load carrier 10 the load carrier extending in the forward-backward direction has a radius that decreases from the front end of the load carrier 10 towards the rear end. The corners 40, 42 are rather rounded at a front end and rather sharp at a rear end. Overall configuration of the load carrier 10 can be considered as wing-shaped. The load carrier 10 may improve the aerodynamics of the vehicle to which it is mounted, for example allowing a longer smooth flow around the vehicle and/or reducing drag during forward driving.

The load carrier 10 is further shaped to provide improved aerodynamics the vehicle with the load 10 carrier mounted to the rear of the vehicle as compared to the vehicle without the mounted load carrier 10, in particular by avoiding the creation of turbulences and reducing the risk of low pressure zones. As can best be seen in FIG. 7, a forward facing and upright side 500 of the load carrier 10 is curved in a top-view of the load carrier 10 with a left forward and upright extending corner 502 and a right forward and upright extending corner 504 extending more forward than a middle section 506 of the forward facing side 500 adjacent the projecting forward region 38 of the load carrier 10. The middle section 506 can be understood as being formed by the countersunk region 30 and as excluding the projecting forward region 38. The left forward and upright extending corner 502 and the right forward and upright extending corner 504 are arranged closer to the rear of the vehicle when the load carrier 10 is mounted to the vehicle than the middle section 506 of the forward facing side 500 between the left forward corner 502 and the projecting forward region 38 and the right forward corner 504 and the projecting forward region 38, respectively. Airflow capture in the space between the load carrier 10 and the rear of the vehicle during vehicle movement can thus be avoided or reduced.

A height tapering section of the load carrier 10 has a largest height 508 directly backwardly adjacent to the countersunk region 30. The height tapering section of the load carrier 10 has a smallest height 510 at a region overhanging the attachment means 18 for rear lights just forward of a rear corner extending in the left-right direction, which is measured from a virtual extension of the bottom surface 54 of the load carrier 10. The largest height 508 is about 1.2 to 1.4 times the length of the smallest height 510, in the shown example about 1.3 times the length. The heights 508, 510 are illustrated in FIG. 4.

A width tapering section of the load carrier 10 has a largest width 512 crossing the countersunk region 30. The largest width 512 may also be directly adjacent backward of the countersunk region 30. The width tapering section of the load carrier 10 has a smallest width 514 at the region overhanging the attachment means 18 for rear lights just crossing the rear corner extending in the left-right direction and a reinforcement element 300. The smallest width 514 may also be directly adjacent forward of the upper rear corner extending in the left-right direction. The largest width 512 is about 1.1 to 1.5 times the length of the smallest width 514, in the shown example about 1.2 times the length. The width 512, 514 are illustrated in FIG. 7.

The load carrier 10 is configured to not obstruct rear lights of the vehicle when mounted to the vehicle. For this purpose, a top surface 44 of the load carrier 10 extends below a virtual plane 46 extending from a rear bottom edge of a rear light of the vehicle line backwards at a downward angle of 15° when the load carrier 10 is mounted to the vehicle. Both the virtual plane 46 and the top surface 44 are illustrated in FIG. 4.

As can be seen in FIG. 4, the top exterior surface 44 extends backwards beyond the attachment means 18 for rear lights and thus the rear lights themselves. The rear lights are arranged recessed in the load carrier exterior surface at the back side of the load carrier 10.

To still achieve a sufficiently large load carrier 10 despite not obstructing the tail lights and to improve accessibility of the load carrier 10 for a user, the load carrier 10 is configured to be mounted low on the rear of the vehicle. The mounting device 24 comprises a mounting section 48 that comprises the clamp and is configured to be mounted directly to the tow ball of the vehicle. The clamp is supported by two connection elements 50, each in the form of a metal plate curving downward and away from the clamp. Each connection element 50 connects the clamp to the rest of the base 12, which primarily comprises further frame elements and attaches the mounting device to the load carrier 10. In other embodiments, the mounting device 24 comprises a different attachment section, such as a plate with holes attached to the connection element 50 that may be bolted to the body of the load carrier 10 without requiring a base. The mounting device 24 may also be part of the load carrier 10.

As a result, at least a section of the mounting device 24 and thus also a section of the load carrier 10 is arranged below the tow ball of the vehicle 10. This is illustrated in FIG. 4 by line 52. As can be seen, in the shown example, a full bottom surface 54 of the load carrier 10 is arranged below line 52 and thus the tow ball of the vehicle. The bottom surface 54 is formed by an exterior underside of the first wall element 14.

The bottom surface 54 is inclined upwards away from the vehicle when the load carrier 10 is mounted to the vehicle. For example, the bottom surface is thus inclined upwards relative to a horizontal plane. The load carrier 10 thus achieves sufficient ground clearance even when driving up and down on ramps and despite being mounted so low and while still providing a larger interior volume. By comparison, a load carrier without such an inclined bottom surface but the same low mounting and clearance for the taillights would only provide a very small interior volume.

In the shown example and as illustrated in FIG. 4, the bottom surface 54 is inclined upwards by an angle 516 of about 5° to 20° with respective to horizontal plane when the load carrier 10 is mounted to the vehicle. More particularly, the bottom surface 54 may be inclined upwards by about 10° to 15°. In the shown example, the angle is about 13°-15°.

An interior bottom surface 56 of the load carrier 10, which can for example be seen in FIG. 6, is inclined equally to the bottom surface 54 when mounted to the vehicle. As a result, objects stored in the load carrier 10 will tend to come to rest close to a forward end of the load carrier 10. This may avoid load shifting when braking. Further, the incline may also prevent load shifting during acceleration. In addition, a center of gravity will be located forward in the load carrier 10, reducing loads on the tow ball of the vehicle. Further, the larger interior height at the front of the load carrier 10 and the smaller interior height at the rear of the load carrier 10 will also result in a center of gravity being located forward in the load carrier 10, in particular when heavy objects are store in the load carrier 10.

FIG. 5 shows details of the base 12. The two connection elements 50, which extend in a forward-backward direction, are connected to each other by a crossbar 60 extending in a left-right direction. The crossbar 60 also connects two parallel and spaced apart receiving elements 58 in the form of bars that extend in the forward-backward direction. The receiving elements 58 are arranged below the tub of the load carrier 10 when the load carrier is attached to the base 12 and support the load carrier 10.

The load carrier 10 is attached to the base 12 with two attachment elements 66 mounted to a bottom frame 62 of the load carrier 10 and the first wall element 14. The bottom frame 62 comprises two bars 64 extending in the left-right direction. One of bars 64 can be seen, for example, in FIG. 12. Each bar 64 of the bottom frame 62 is received in a corresponding recess in the bottom of the first wall element 14. Similarly, each receiving element 58 of the base 12 is also received in a corresponding recess in the bottom of the first wall element 14. Such a configuration provides a very secure attachment with little or no room for unwanted movement of the load carrier 10 relative to the base 12. The interior top perspective view of the first wall element 14 in FIG. 8 shows a resulting protruding shape in the interior bottom surface 56. In other embodiments, the interior bottom surface 56 may be smooth or the load carrier 10 may comprise a floorboard resting on the interior bottom surface 56, the floorboard being configured to provide a plane floor in the interior.

As can be taken from FIG. 6, the load carrier 10 comprises two attachment elements 66 that each are inserted in one of the receiving elements 58 of the base 12 when the load carrier 10 is attached to the base. Each attachment element 66 is mounted to both the first wall element 14 and a forward one of the two bars 64, for example with a bolt or screw. The load carrier 10 also comprises two straight pins 68, each extending downwards from a rear one of the two bars 64 into one of the receiving elements 58.

Figure 9:
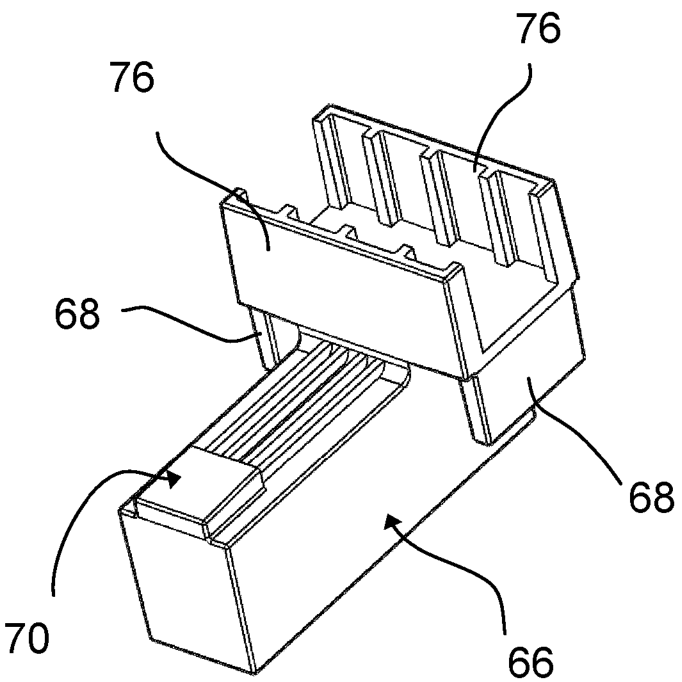
FIG. 9-11 illustrate an attachment element configured for interlocking attachment of the load carrier of FIG. 1 to the base in several different perspective views.
Figure 10:
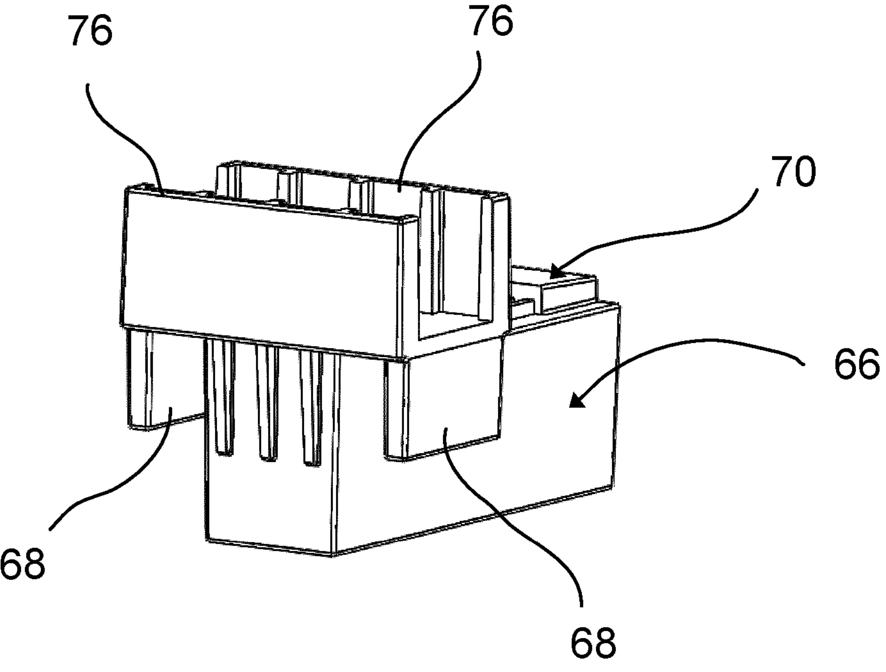
Figure 11:
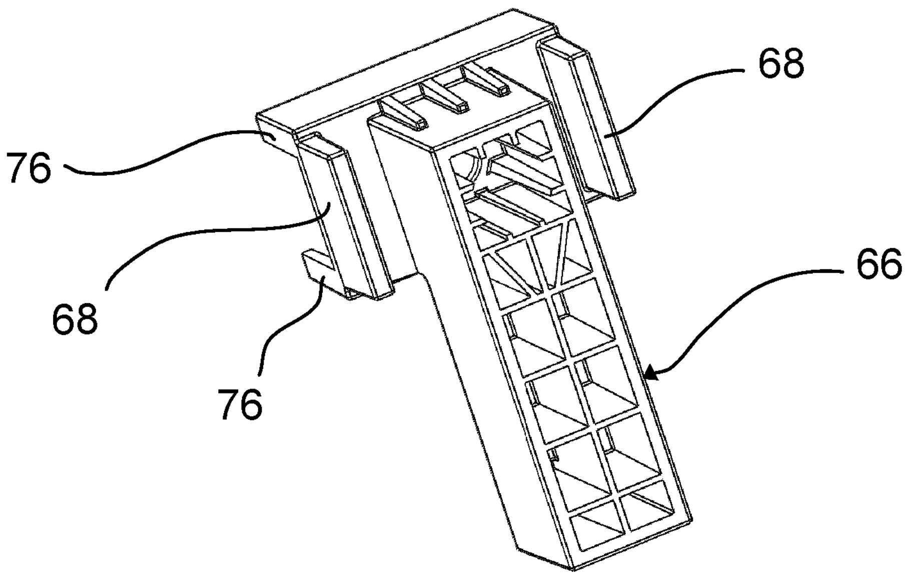

Details of the attachment elements 66 are shown in FIGS. 9 to 11. Each of the attachment elements 66 comprises at one end a pair of parallel flanges 76 extending upwards and in the left-right direction. The flanges 76 are configured to support the attachment element 66 against an outside of the bar 64 to prevent rotation and/or increase stability. Each attachment element 66 comprises at the same end a further pair of parallel flanges 68 extending downwards and in the forward-backward direction. The flanges 68 are configured to support the attachment element 66 against an outside of the receiving element 58 to prevent rotation and/or increase stability. At an opposite end, the attachment element 66 comprises a protrusion 70 extending from a top side of the attachment element 66. Overall, the attachment element 66 forms a hook shape. The attachment elements 66 are injection molded parts and configured for an interlocking engagement.

Figure 12:
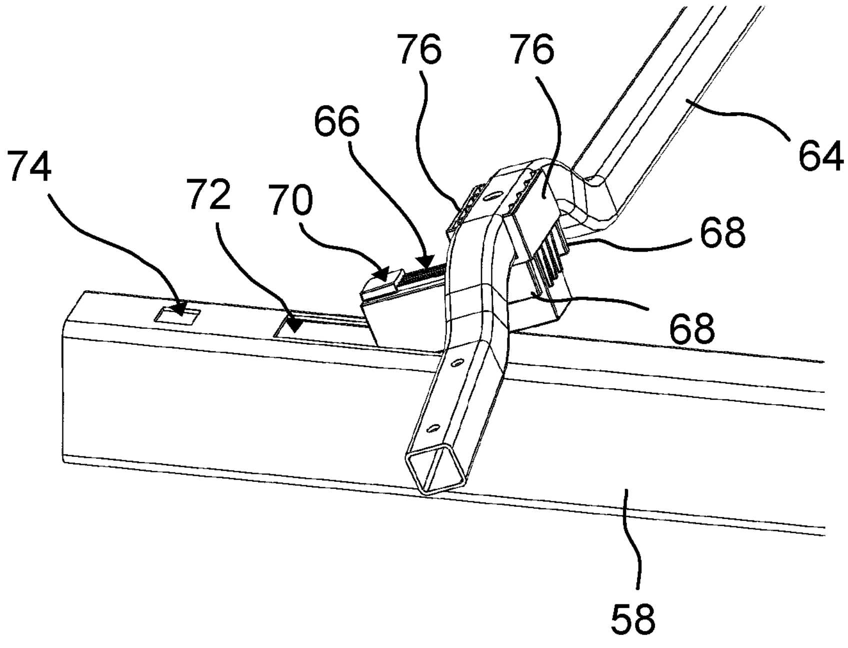
FIG. 12-16 illustrate a method for attaching the load carrier of FIG. 1 to the base in several perspective views.
Figure 13:
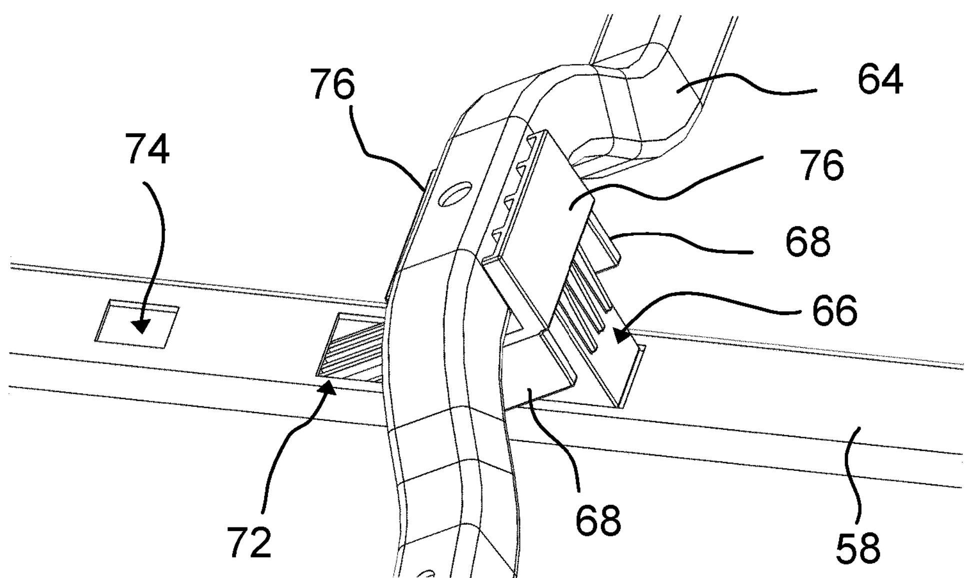
Figure 14:
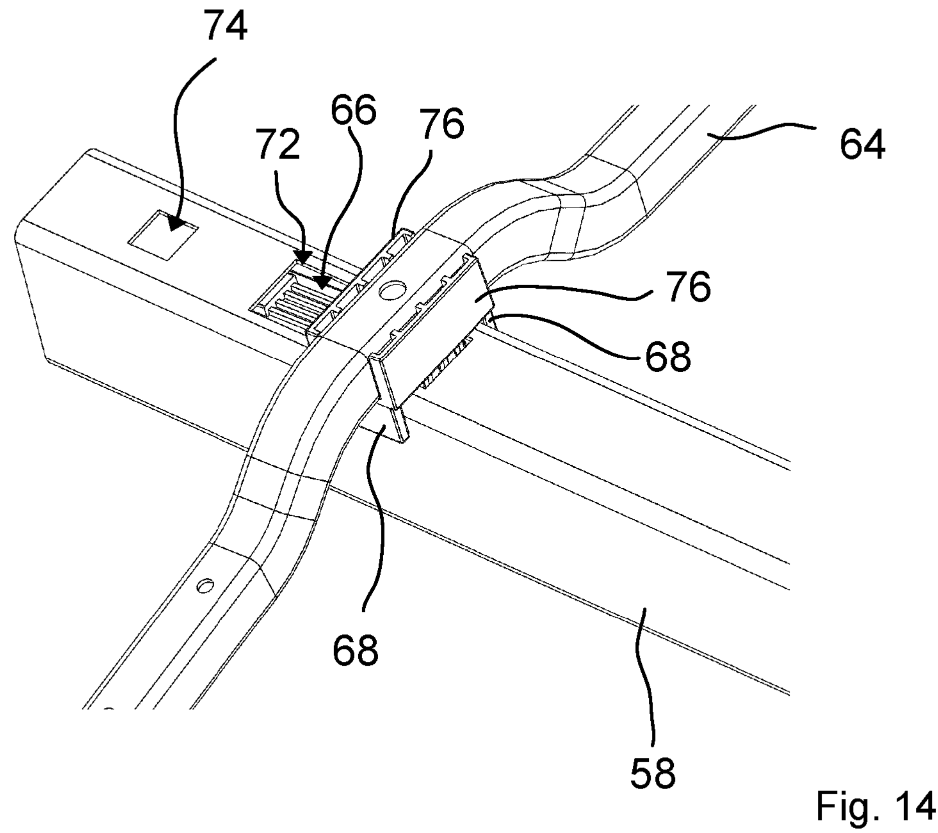
Figure 15:
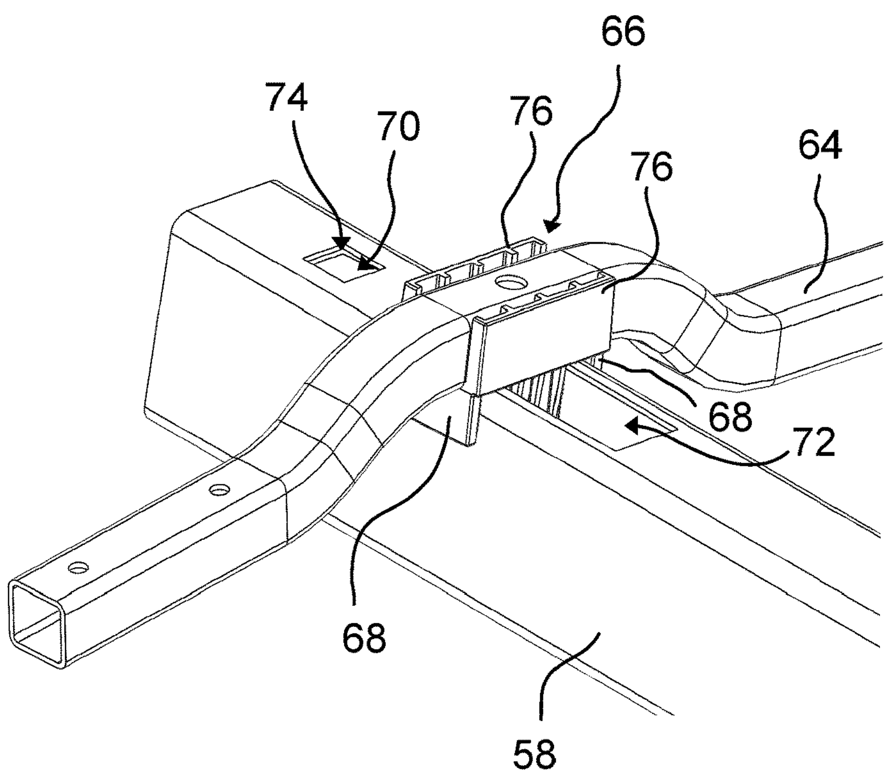
Figure 16:
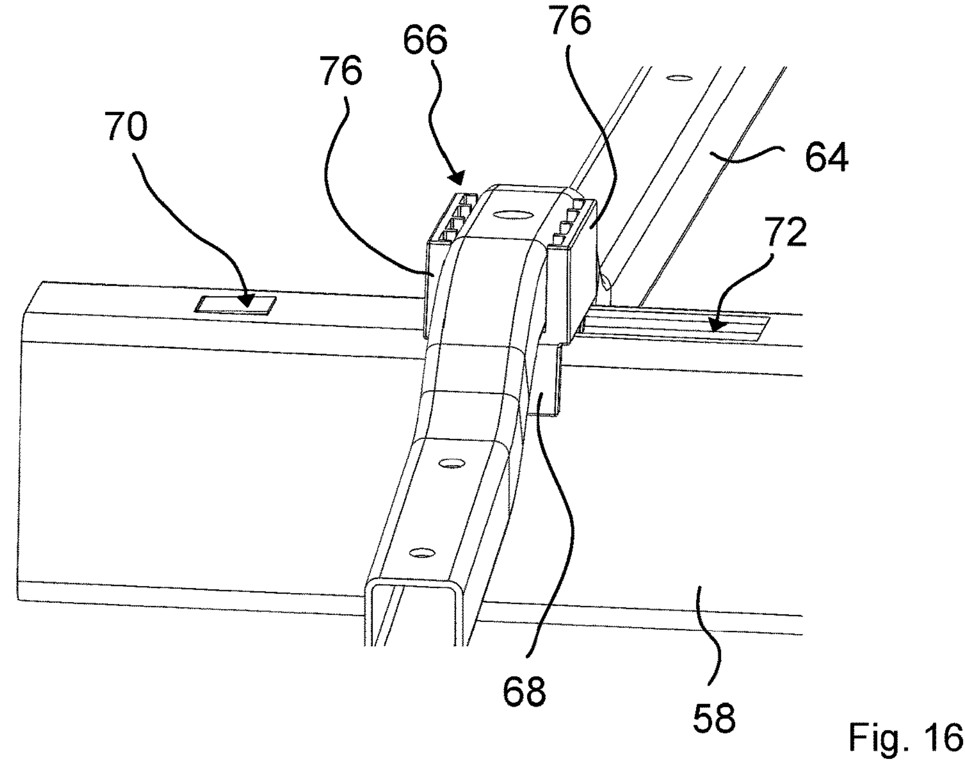
Figure 17:
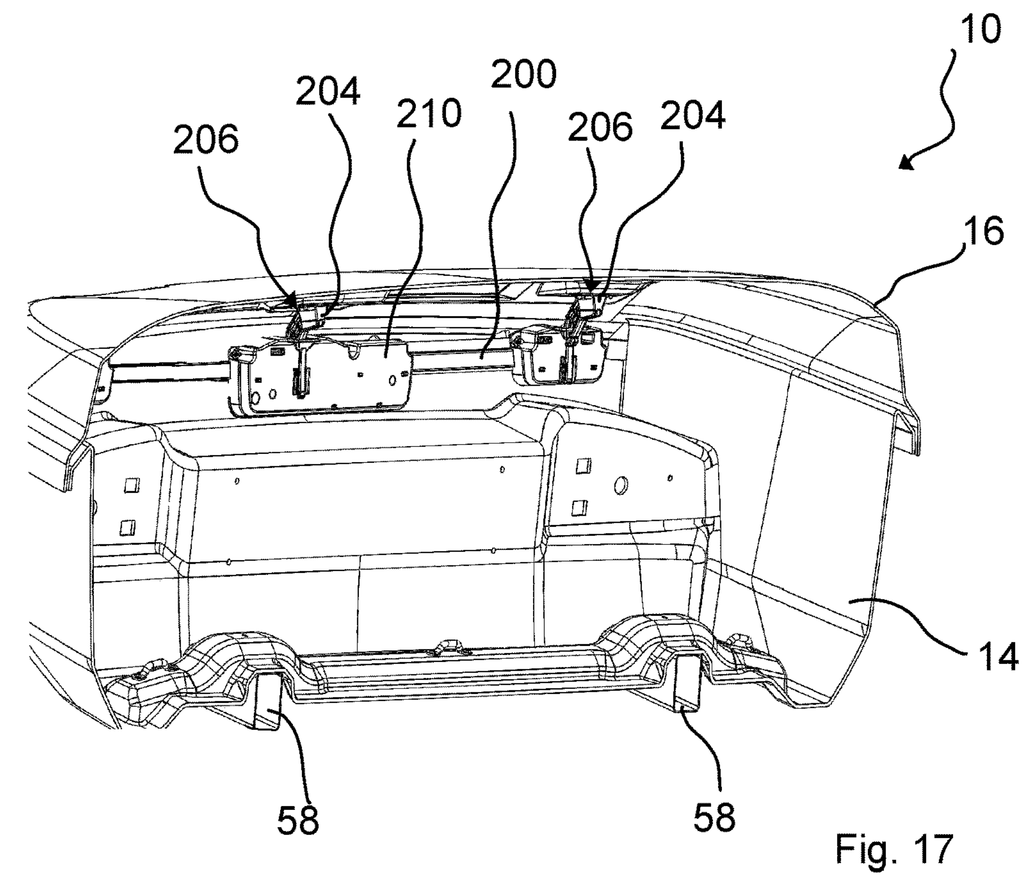
FIG. 17 illustrates the interior of the load carrier of FIG. 1 in a perspective rear view, also showing part of a lock system of the load carrier.
Figure 18:
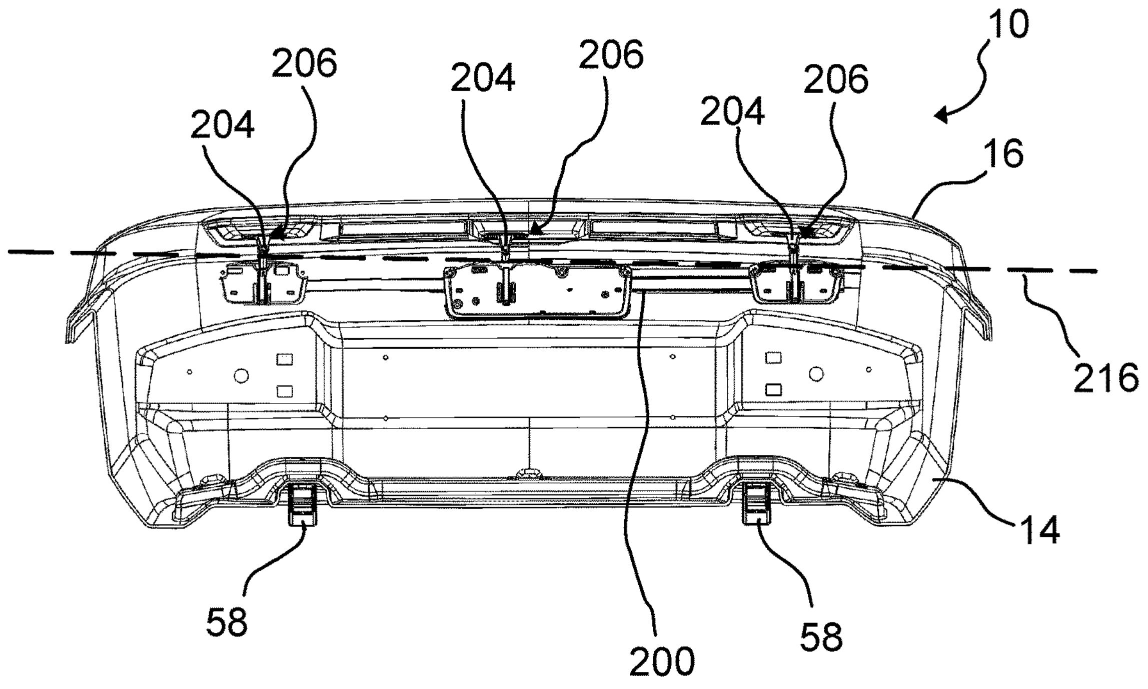
FIG. 18 illustrates the interior of the load carrier of FIG. 1 in a rear elevational view.

FIGS. 12 to 16 illustrate a method of attaching the load carrier 10 to the base 12 with the interlocking engagement of the attachment elements 66. As can be seen in FIG. 12, the receiving elements 58 of the base 12 are hollow and have a through hole 72 at their top side sufficiently large to allow insertion of the attachment elements 66 when the load carrier 10 is tilted upwards with a rear end away from the base 12. In such a tilted position, the attachment elements 66 are inserted into the receiving elements 58. After insertion, the load carrier 10 is slid or moved forward along the base 12 in the tilted position, further driving the attachment element 66 into the receiving element 58. For this movement, the load carrier 10 may rest with a forward lower corner on the frame of the base 12 so that little force is required to hold the load carrier 10. Once a rear side of each attachment element 66 has passed into the through hole 72, as illustrated in FIG. 13, the load carrier 10 can be tilted downwards into alignment with a mounted position. For example, the load carrier 10 can be tilted downwards until its exterior bottom surface 54 rests on the base 12. Such an aligned position is shown in FIG. 14. Afterwards, the load carrier 10 can be slid further in a forward direction until the protrusion 70 reaches a second through hole 74 in the receiving element 58 that corresponds in size and shape. This position is shown in FIG. 15. The protrusion 70 will slot into this second through hole 74, as is shown in FIG. 16. Hence, sliding the load carrier 10 backwards along the base 12 is blocked.

The protrusion 70 may slot into the second through hole 74 due to an elastic deformation and/or deflection of the longitudinal section connecting the two ends of the attachment element 66 before reaching the second through hole 74. Alternatively or additionally, the attachment element 66 may be pulled up towards the exterior bottom surface 54 by tightening a screw or bolt with a lever attaching the attachment element 66 to the first wall element 14 and the bar 64. Such a tightening device is not shown but corresponding holes for attachment are. Alternatively or additionally, the load carrier 10 may be attached to the base 12 with the attachment element 66 already tightened against the exterior bottom surface 54, for example just relying on attachment element 66 deformation for attachment of the load carrier 10 to the base 12. The load carrier 10 may be detached from the base 12 by untightening the attachment element 66 from the exterior bottom surface 54 to disengage an interlocking engagement and perform the steps described for FIGS. 12 to 16 in the reverse order.

The first wall element 14 may collect liquid that has entered into the interior of the load carrier 10. As can be seen in FIG. 8, the first wall element 14 may have at least one through hole connecting the interior of the load carrier 10 to the exterior for draining such a liquid. Through hole 80 may be arranged at a lowest region of the load carrier 10 when mounted to the vehicle. The protrusions in the interior bottom surface 56 for receiving the frame parts below the first wall element 14 may divide the floor of the load carrier 10 in different sections. In such a case, a through hole may be provided at the lowest region of each such section. In the embodiment shown in FIG. 8, the inclination of the interior bottom surface 56 and a non-protruding area surrounding the protrusions in the floor fluidly connects the complete floor with the through hole 80 so that no additional drainage hole is necessary.

Figure 32:
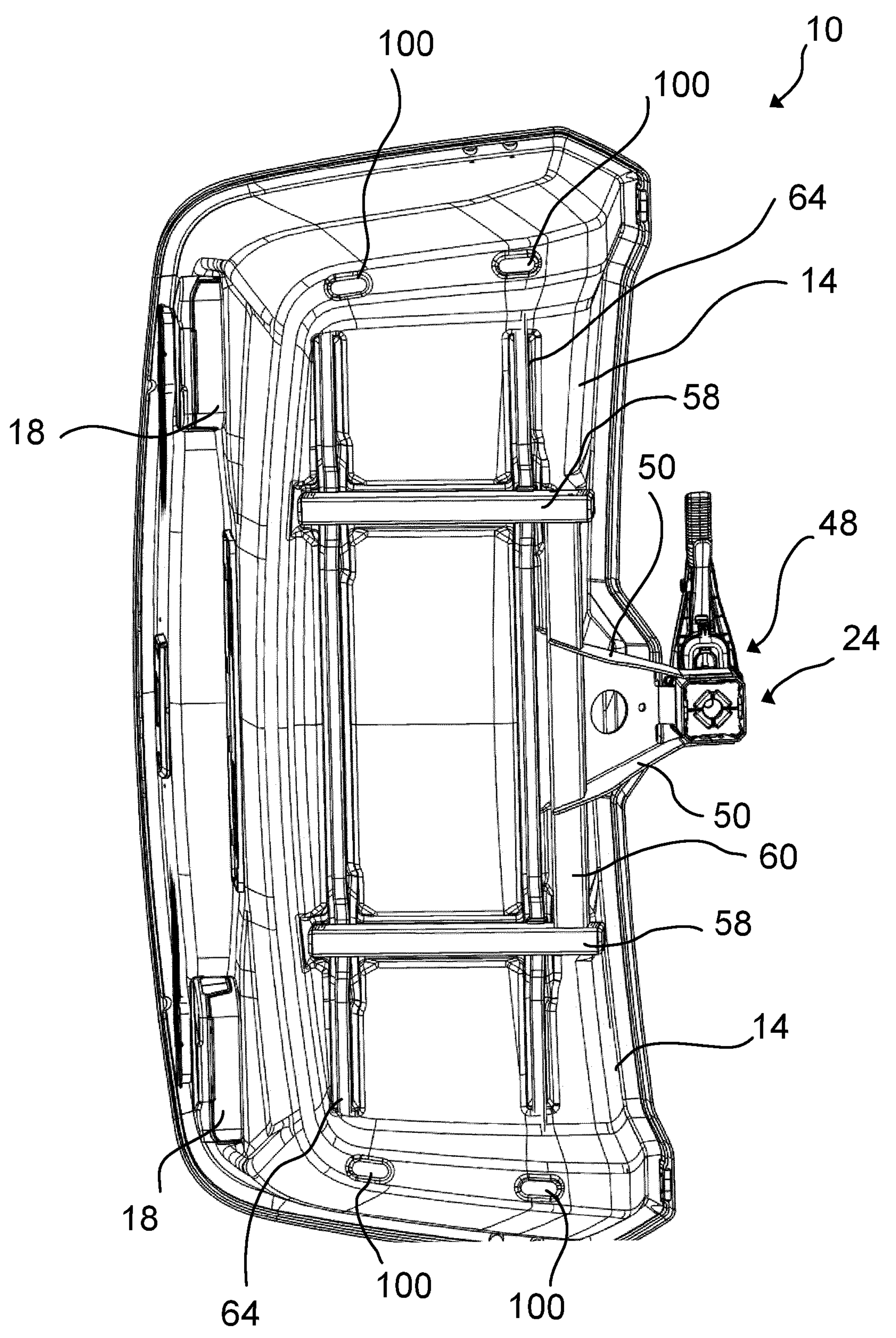
FIG. 32 illustrates another embodiment of a load carrier in a bottom view, the load carrier comprising feet for supporting the load carrier on the ground.

FIG. 32 shows a further very similar embodiment of the load carrier 10. Only relevant differences will be detailed, which primarily relate to liquid draining from the interior. The load carrier 10 of FIG. 32 has additional feet 100 integrally formed in the first wall element 14 and protruding from the exterior bottom surface 54. The feet 100 are configured to together support the load carrier 10 of FIG. 32 when standing on the ground. In each of the feet 100 a through hole is formed to drain liquid from the interior of the load carrier 10 of FIG. 32 when standing on the ground. When standing on the ground, the load carrier 10 will be orientated differently than when mounted to the vehicle. In particular, the bottom side will not be inclined anymore. Hence, the feet 100 will form the lowest region and allow complete draining of nearly all liquid contained in the load carrier 10 of FIG. 32.

FIGS. 17 to 26 illustrate a lock system of the load carrier 10. The lock system comprises a lock element 200 in the form of an essentially straight metal strip. The lock element 200 is moveably attached to an inside of the first wall element 14 and may be moved with an exterior actuation element 202, shown in FIGS. 1 and 26, in a left-right direction. Further, three identical engagement elements 204 of the lock system are fixedly attached to an interior of the second wall element 16.

The lock element 200 is moveable along a predetermined straight engagement path to engage the engagement elements 204. Correspondingly, an engagement region 208 with an eyelet at a bottom side of each engagement elements 204 is arranged on thereto parallel straight line 216, shown in FIG. 18, and in a common plane. The lock element 200 can simultaneously engage and disengage the engagement elements 204. When the engagement elements 204 are engaged by the lock element 200, the lid is fixed to the tub of the load carrier 10 and the load carrier may not be opened.

However, as can also be taken from the drawings, the second wall element 16 is non-planar but rather concavely shaped with a peak in the middle in the left-right direction where the second wall element extends further in an upward direction. Further, the second wall element 16 also slopes from a height front end towards a lower rear end in a forward-backward direction. To align the engagement elements 204 with the predetermined engagement path, each attachment region 206 in the non-planar second wall element 16 is countersunk relative to an adjacent first region. The attachment regions 206 therefore protrude into an interior of the load carrier 10. The attachment regions 206 are configured so that they are arranged in a common plane parallel to line 216. Hence, a middle one of the attachment regions 206 is countersunk further than the outer attachment regions 206. As be taken from FIG. 23, each engagement element 204 is attached to the attachment region by two screws. The adjacent first region surrounds each attachment region 206 and a transition in-between is configured as a stepped transition. Hence, identical engagement elements 204 can be used for the load carrier 10. Each adjacent first region is surrounded by an adjacent second region, which corresponds to the adjacent region 34 surrounding the countersunk exterior region 30 at the top forward corner 26. The transition is also configured as a stepped transition.

The lock element 200 is spring biased towards engagement with the engagement elements 204, thus automatically preventing unwanted opening of the load carrier 10. When pressing the second wall element 16 down on the first wall element 14, the lock element 200 will first be deflected out of an engagement position by the engagement elements 204 to allow full closure and then return by spring force into the engagement position to engage the engagement elements 204. Pulling on the actuation element 202 will displace the lock element 200 from the engagement position into a disengagement position so that the load carrier 10 may be opened.

Figure 26:
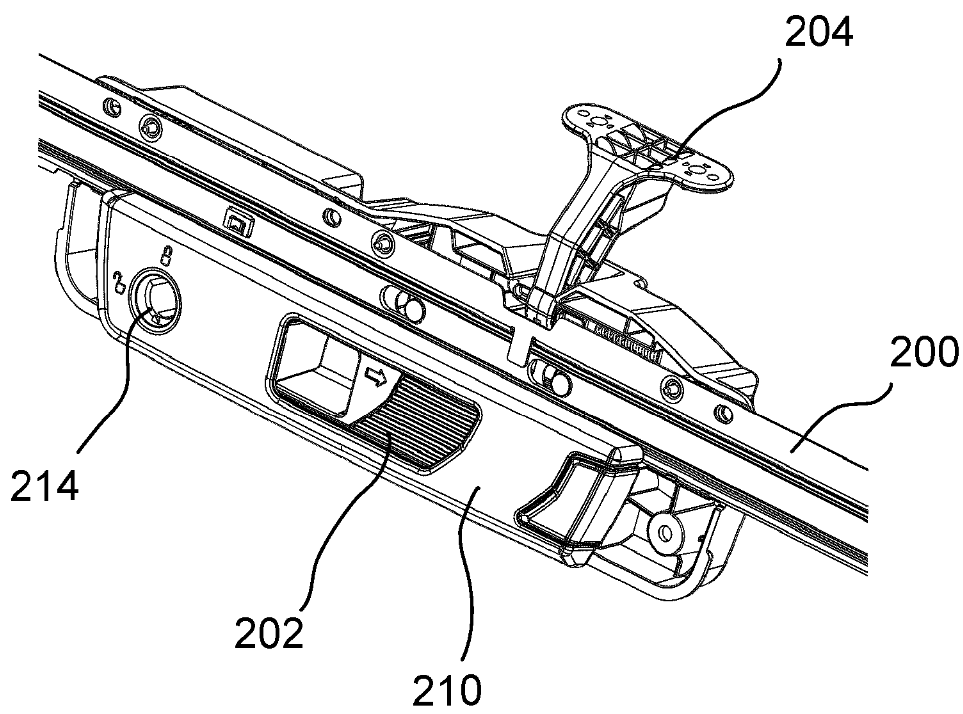
FIG. 26 illustrates means for actuation the lock system in a perspective view.
Figure 27:
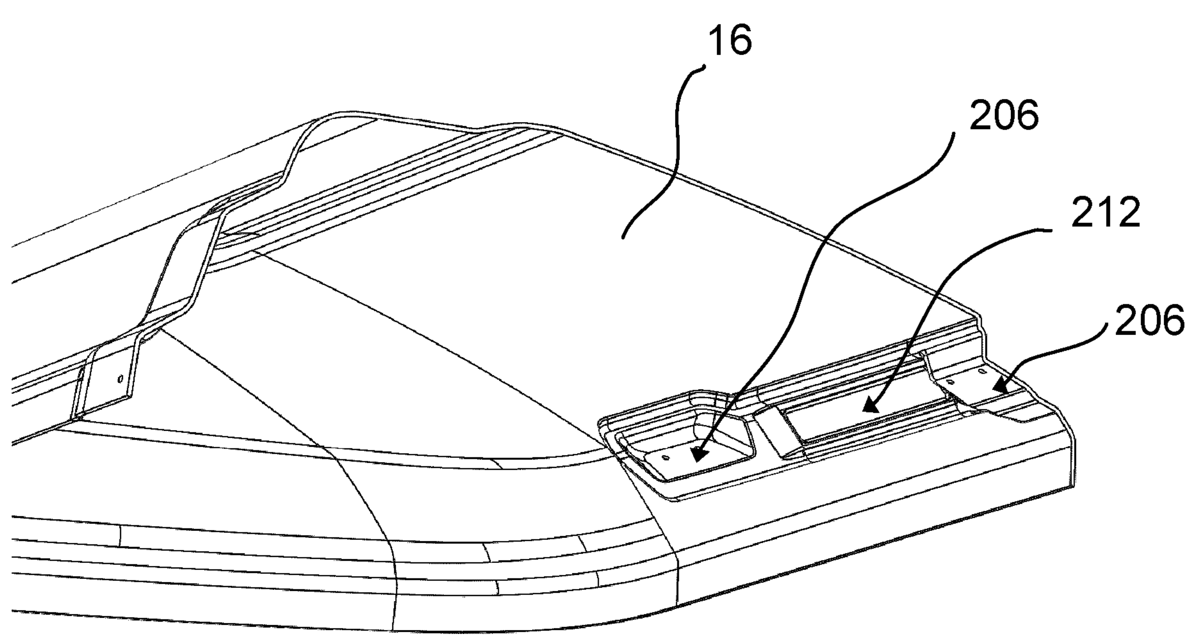
FIG. 27-29 illustrate a second wall element forming a lid of the load carrier of FIG. 1 in different views.
Figure 28:
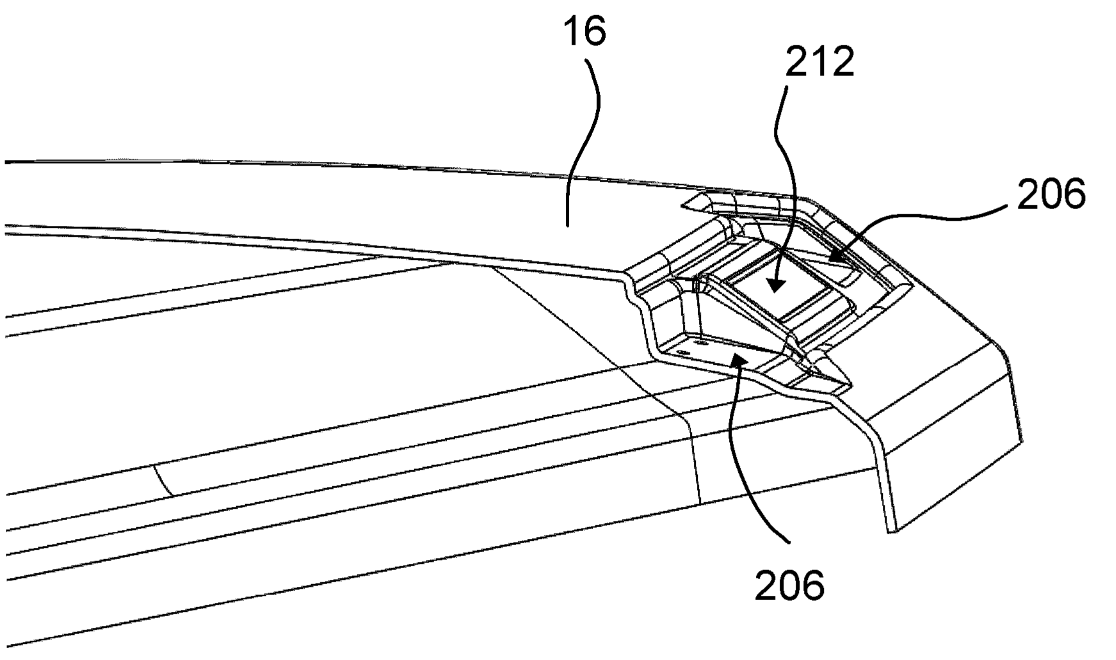
Figure 29:
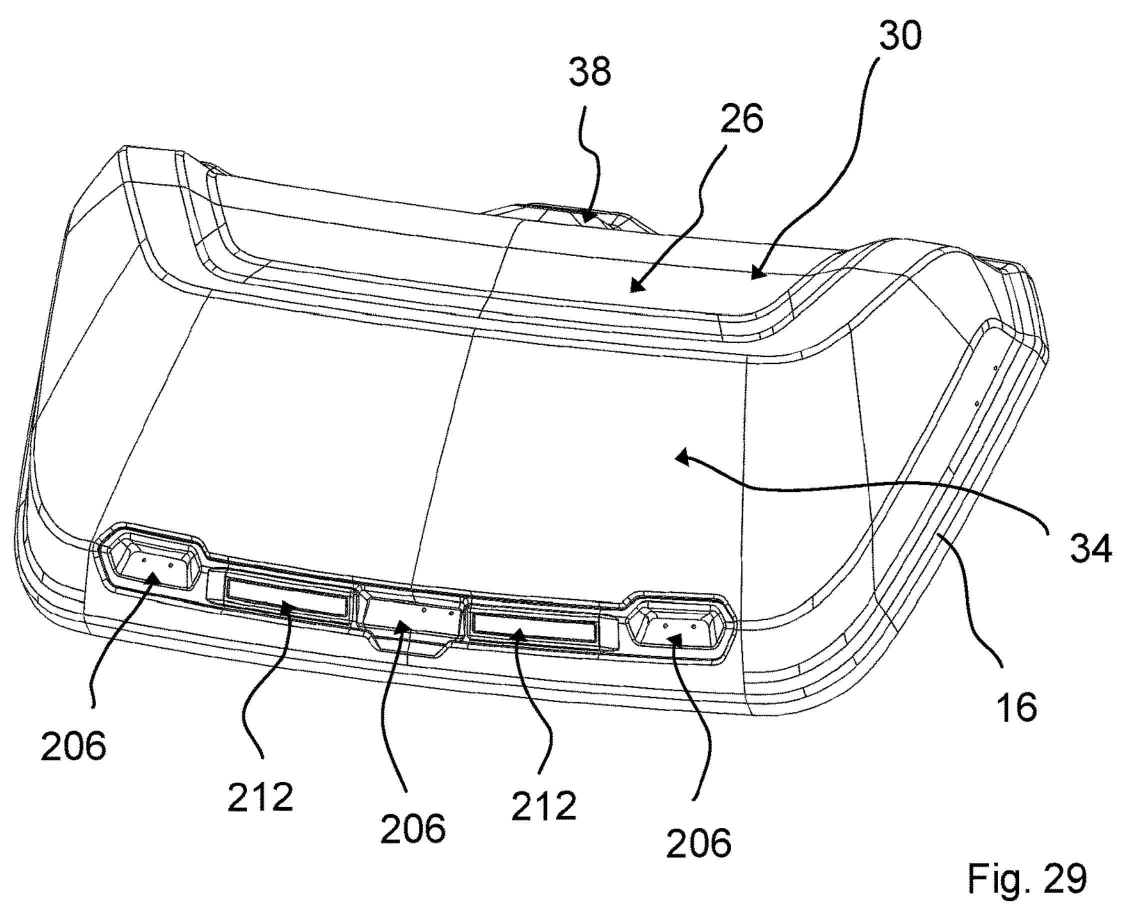

As can be seen in FIG. 26, a body 210 of the lock system holds the lock element 200 and the actuation element 202. Further, the body 210 of the lock system has a receptacle 214 for a lock cylinder. With such a lock cylinder, the lock system is adjustable between a locked state, in which disengagement of the lock element 200 from the engagement elements 204 is prevented, and an unlocked state. Thus, theft of objects stored in the load carrier 10 can be prevented.

Figure 30:
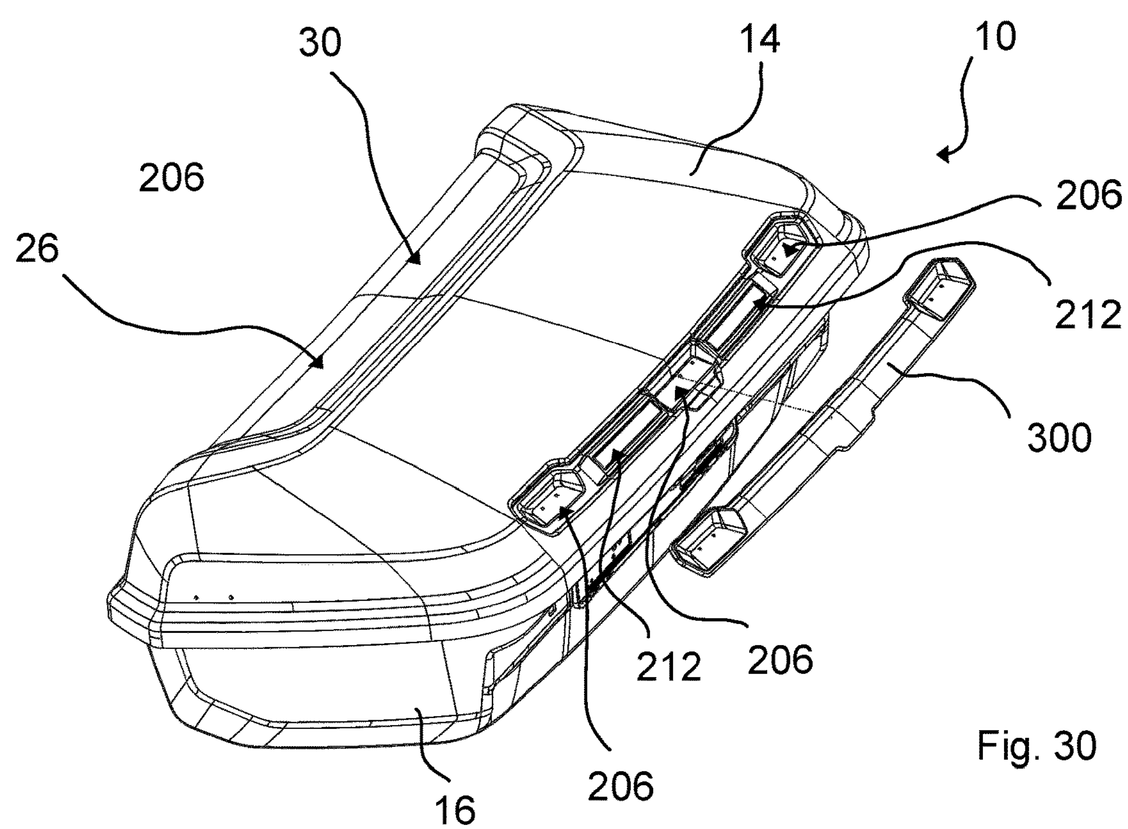
FIG. 30 illustrates the load carrier of FIG. 1 with a detached reinforcement element in a perspective view.
Figure 31:
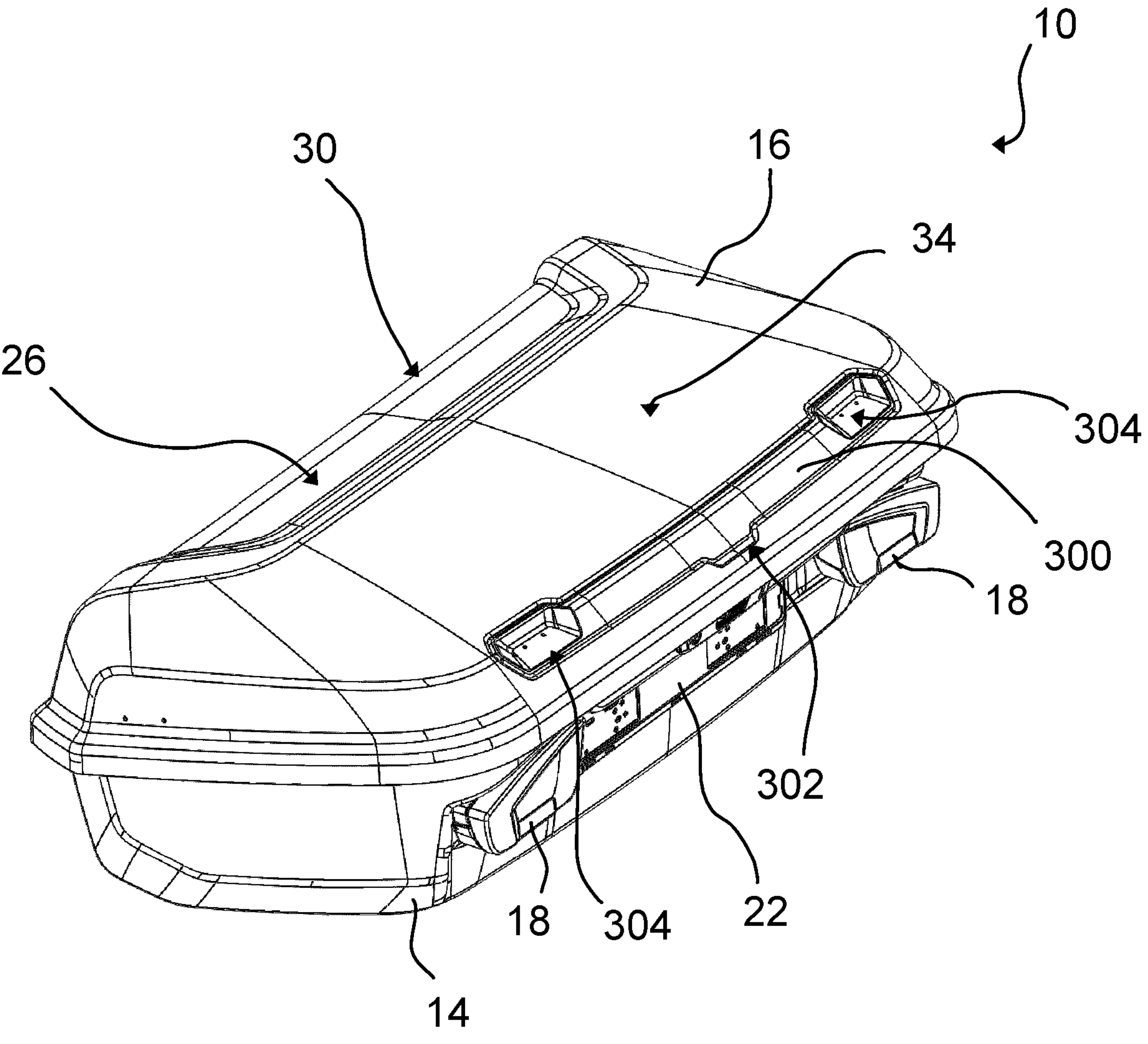
FIG. 31 illustrates the load carrier of FIG. 1 with the reinforcement element attached to the second wall element in a perspective view.

As can be seen in FIG. 30, the attachment regions 206 form recesses in the top side of the second wall element 16. A middle one of said recesses is covered by a reinforcement element 300 to provide a flush exterior surface with the region 34, as can be seen in FIG. 31. In this middle area, a rearward edge of the reinforcement element 300 protrudes away from the second wall element 16. This protruding section 302 forms a hand grip that allows a user to easily pull the lid of the load carrier 10 upwards.

At its left and right end, the reinforcement element 300 is recessed correspondingly to the attachment regions 206. This recessed regions 304 invite a user to place a hand therein when pushing the lid downwards to close the load carrier 10. A user will thus automatically place his hands symmetrically on the lid and in the area of the outermost two of the engagement elements 204. Twisting of the lid is thus avoided or reduced during closing of the load carrier 10, so that the engagement elements 204 and the lock element 200 are more precisely aligned. Closure is thus facilitated and probability of a misaligned engagement is reduced.

The reinforcement element 300 may be mounted to the second wall element 16 with an interference fit and/or with attachment elements such as screws. The reinforcement element 300 stiffens the lid in the area of the engagement elements 204 to support correct lock system engagement. An outer edge of the reinforcement element 300 is bend towards the second wall element 16 to provide a flush and essentially gap-free transition with no corners or protrusions which could cause entanglement. The reinforcement element 300 is formed as a flat sheet and may also be a thermoformed part. In between the attachment regions 206, the second wall element 16 comprises protruding regions 212. These protruding regions 212 do not extend up to being flush with the region 34. The protruding regions 212 rather support the reinforcement element 300 from below.

As can be seen in FIG. 31, the reinforcement element 300 has through holes in the recessed regions 304. The through holes in the recessed regions 304 allow the left and right engagement elements 204 to be attached together to the reinforcement element 300 and the second wall element 16. For example, the screws attaching these engagement elements 204 extend through both the second wall element 16 and the reinforcement element 300. The reinforcement element 300 can thus further stiffen the attachment regions 206 on the left and right side. The screws attaching these engagement elements 204 by extending through both the second wall element 16 and the reinforcement element 300 may be the only means for attaching the reinforcement element 300 to the second wall element 16.

FIG. 33 to FIG. 40 relate to a further embodiment of a load carrier system comprising a load carrier 10 and a base 12. An attachment configuration of the load carrier 10 to the base 12 are the primary differences of this embodiment of the load carrier system to other load carrier systems described above. As such, only these differences will be described and the same reference signs can be used to indicate elements and devices with the same purpose and/or function.

Figure 33:
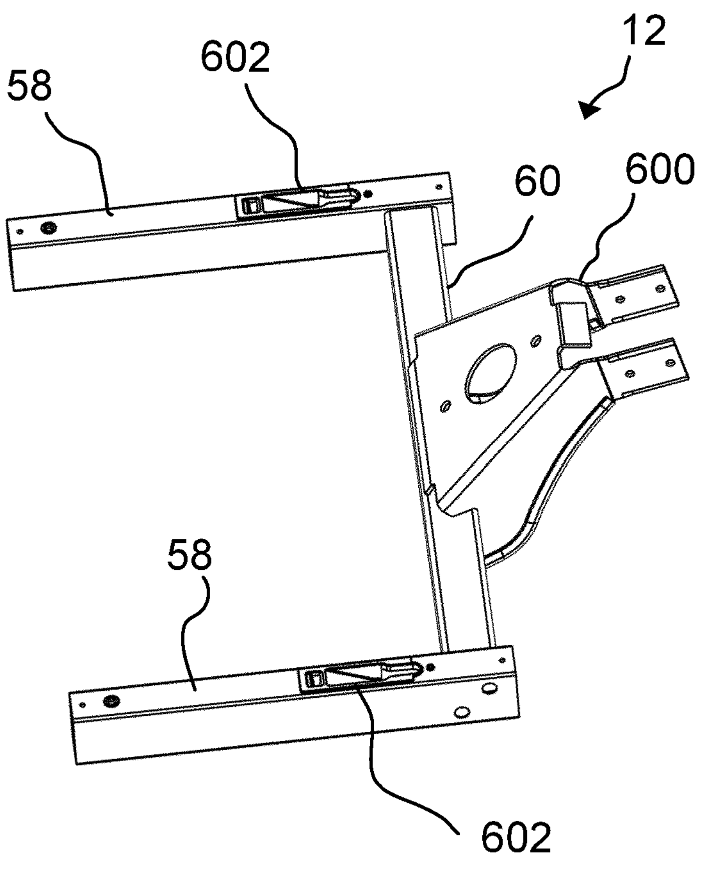
FIG. 33 illustrates a base of a further embodiment of a load carrier system in a perspective view.
Figure 34:
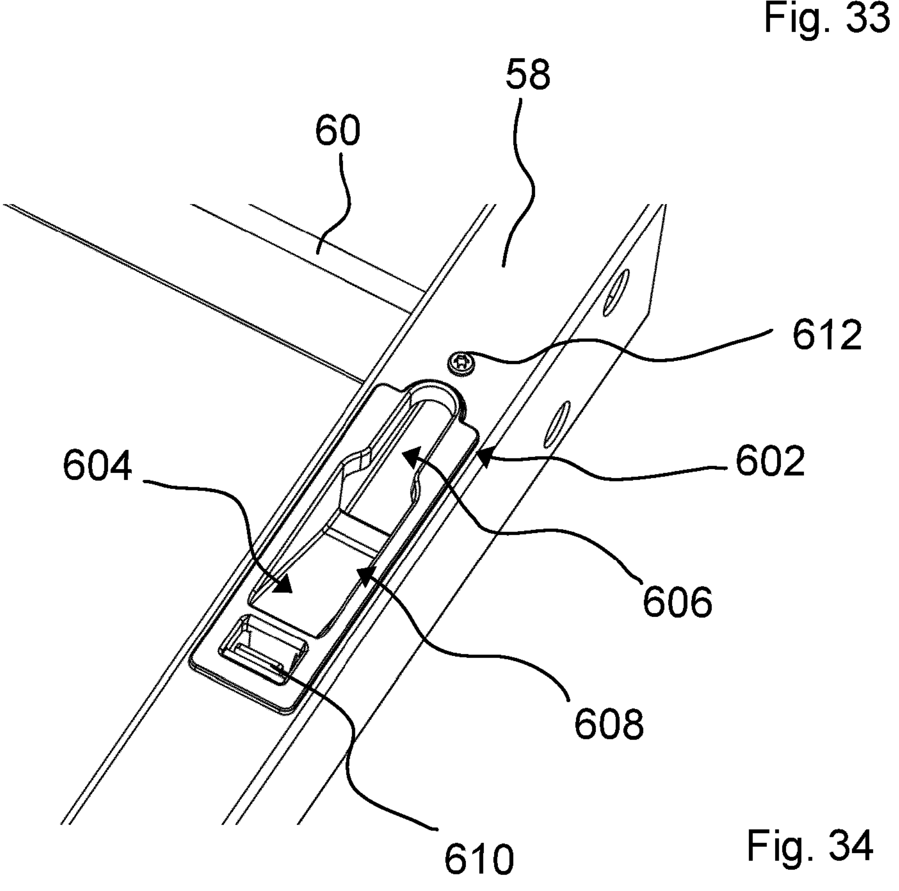
FIG. 34 illustrates details of a receiving element of the base of FIG. 33 in a perspective view.

FIG. 33 illustrates the base 12. The base also has a connection element 600 extending in a forward-backward direction that are connected to a crossbar 60 extending in a left-right direction. The base 12 is shown without a second such crossbar, also other embodiments may have such a second crossbar. The crossbar 60 connects two parallel and spaced apart bars 58 extending in the forward-backward direction.

One receiving element 602 is mounted to a correspondingly formed recess in each bar 58. The receiving element 602 is configured to provide a keyhole joint attachment of the load carrier 10 to the base. The receiving element 602 has a downwardly sloped guiding surface 604 arranged in a first section that has a wide opening 608 at an upper side. Adjacent and forward of the first section is a second section that has a smaller opening 606 at the upper side due to walls of the receiving element 602 projecting inward towards a middle of the opening 606.

Figure 35:
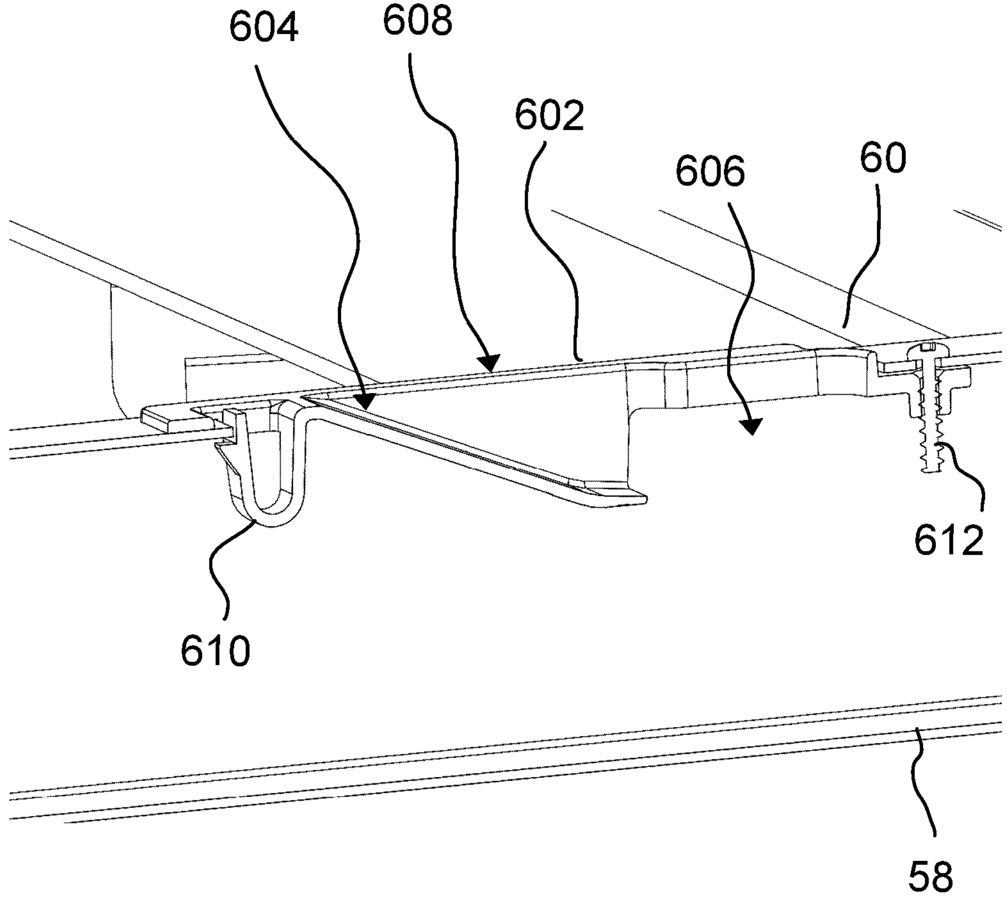
FIG. 35 illustrates details of a receiving element of the base of FIG. 33 in a sectional view.

As can be seen in the sectional view of FIG. 35, the receiving element 602 has no bottom surface at the second section. There is no bottom surface adjacent the sloped guiding surface 604. The receiving element 602 is thus very lightweight. Alternatively, there may be such a surface to prevent ingress of dirt and/or water into the bar 58. The receiving element 602 has a snap connection element 610 configured to engage the bar 58. Further, the receiving element 602 is optionally secured to the bar 58 with a screw 612 at an end opposite the snap connection element 610.

Figure 36:
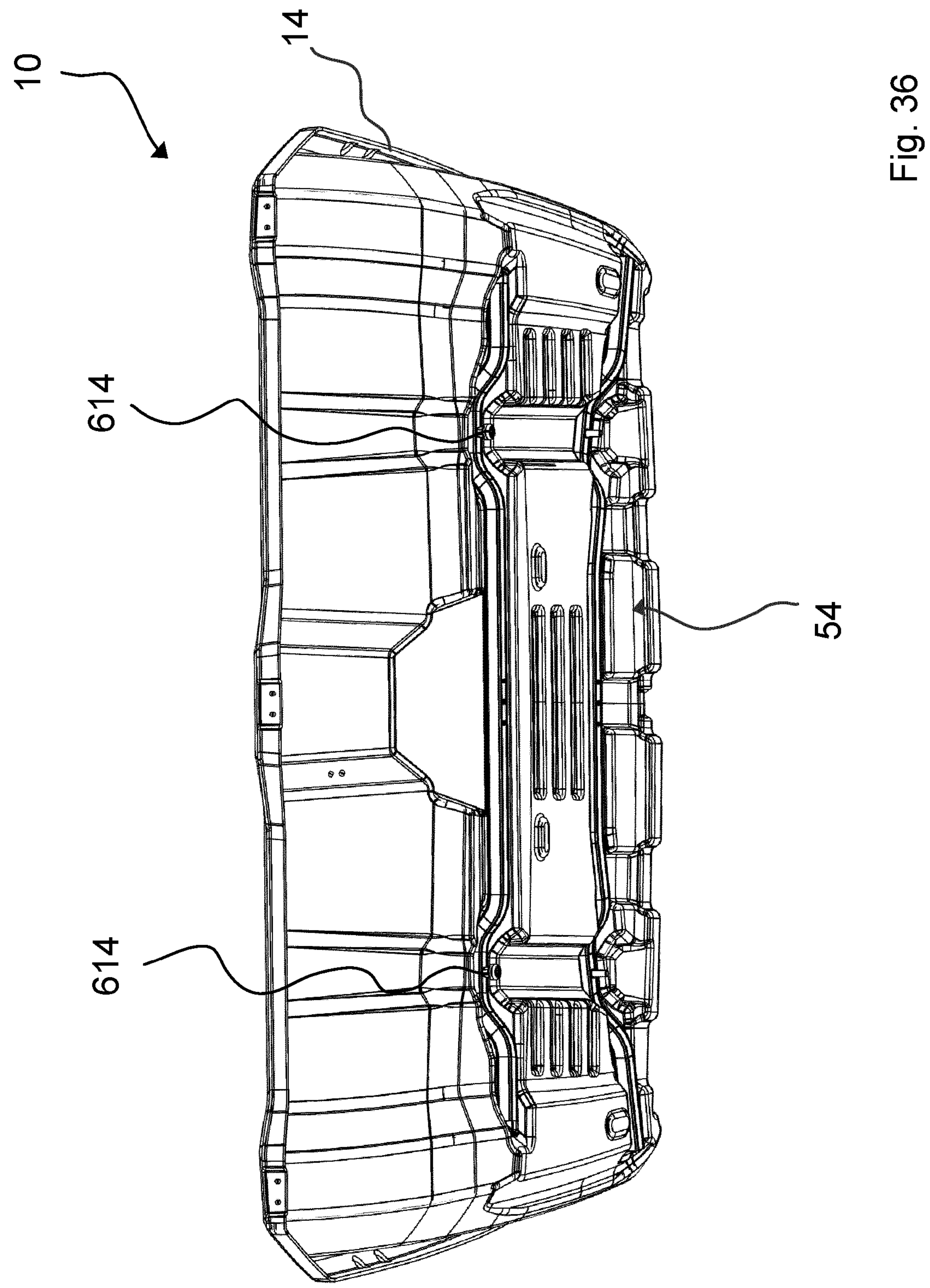
FIG. 36 illustrates a first wall element forming of a load carrier forming a bottom of the load carrier of the further embodiment of the load carrier system in a bottom perspective view.

FIG. 36 illustrates a first wall element 14 of the load carrier 10. The load carrier 10 comprises two attachment elements 66 mounted a bar 64 of a bottom frame 62 of the load carrier 10 and the first wall element 14. Details of the attachment elements 66 can best be seen in FIG. 37. The attachment element 66 comprises a screw element 614 attached to the bar 64 arranged in a recess on the underside of the first wall element 14. The screw element 614 has a head with a width that can be passed through the wide opening 608 at an upper side of the receiving element 602 but not through the smaller opening 606 at the upper side the receiving element 602.

The load carrier 10 may be placed essentially parallel with its bottom surface 54 on the base 12 with the attachment elements 66 slightly backward of the receiving elements 602. The load carrier 10 can then be slid forward, so that the screw elements 614 will glide along the sloped surface 604 of the receiving elements 602. This will guide the heads of the screw elements 614 into the second section of the receiving elements 602, providing a keyhole joint connection without the need to tilt the load carrier 10 for attachment.

Figures 37, 38:
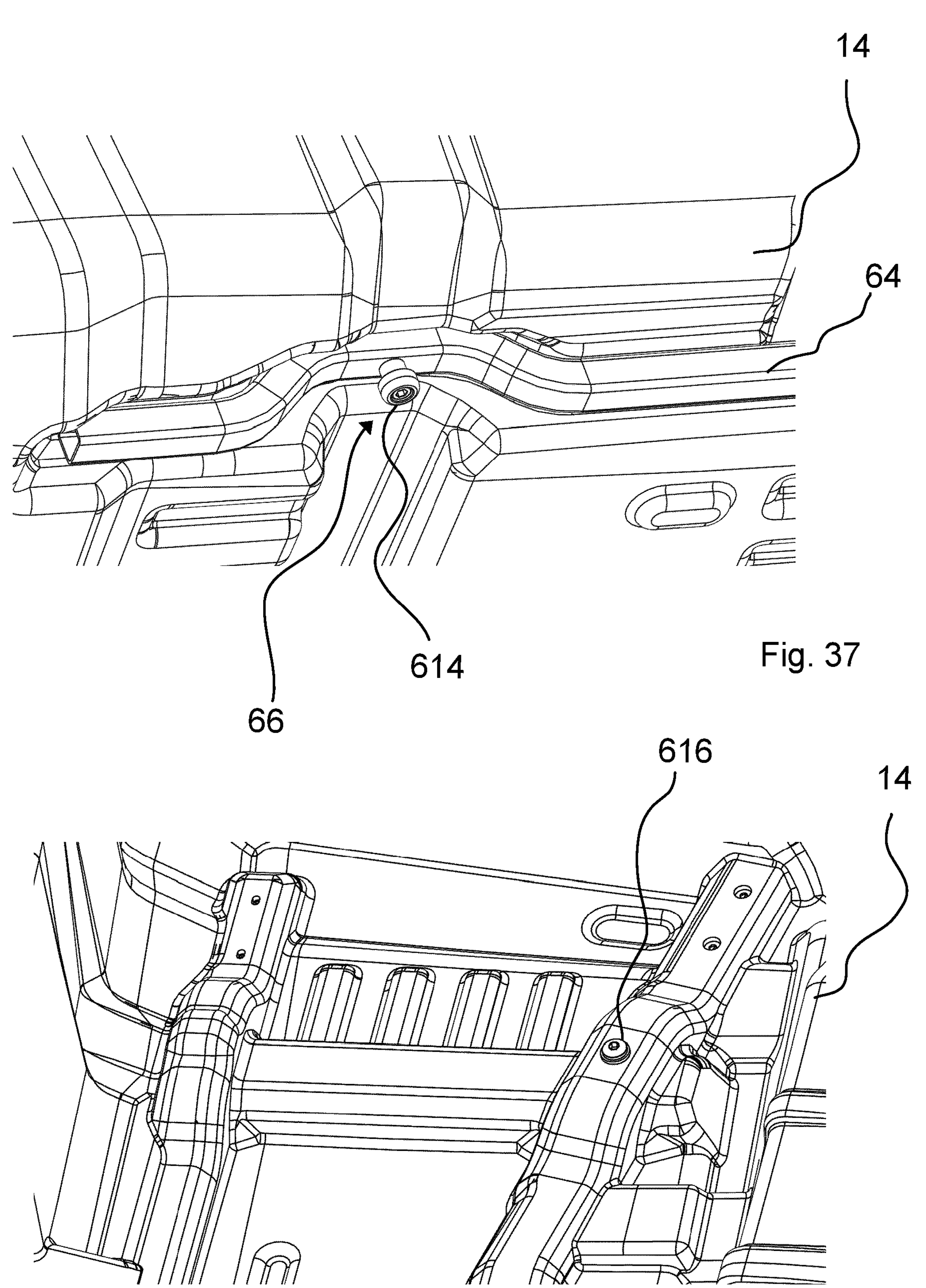
FIG. 37 illustrates details of an attachment element of the load carrier extending from the bottom of the first wall element in a bottom perspective view.
FIG. 38 illustrates details of first wall element of FIG. 36 in a top perspective view.

Once the load carrier 10 has arrived in such a position connected to the base 12, the base 12 may additionally be secured to the load carrier 10. For that purpose, a screw 616 may engage a screw hole 618 that is provided at an end of each bar 58 opposite the receiving element 602. The screw 616 is only accessible from an interior of the load carrier 10, as can be seen in FIG. 38. The screw 616 therefore provides a theft prevention as access to the interior of the load carrier 10 is required before the load carrier 10 can be detached from the base 12. The screw 616 is also holding another a crossbar 620 arranged in a further recess on the underside of the first wall element 14.

Figure 39:
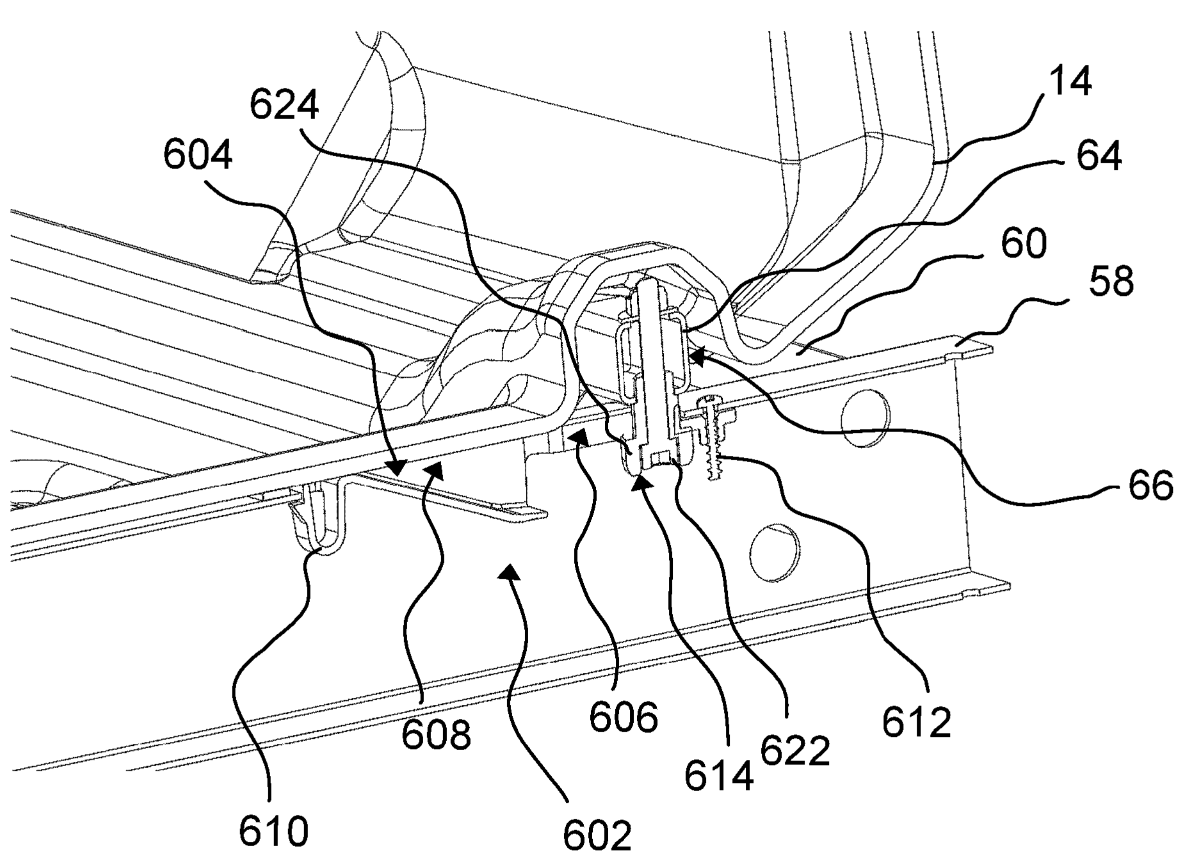
FIG. 39 illustrates details of the attachment of the attachment element illustrated in detail in FIG. 37 to the first wall element shown in FIG. 36 in a sectional view.
Figure 40:
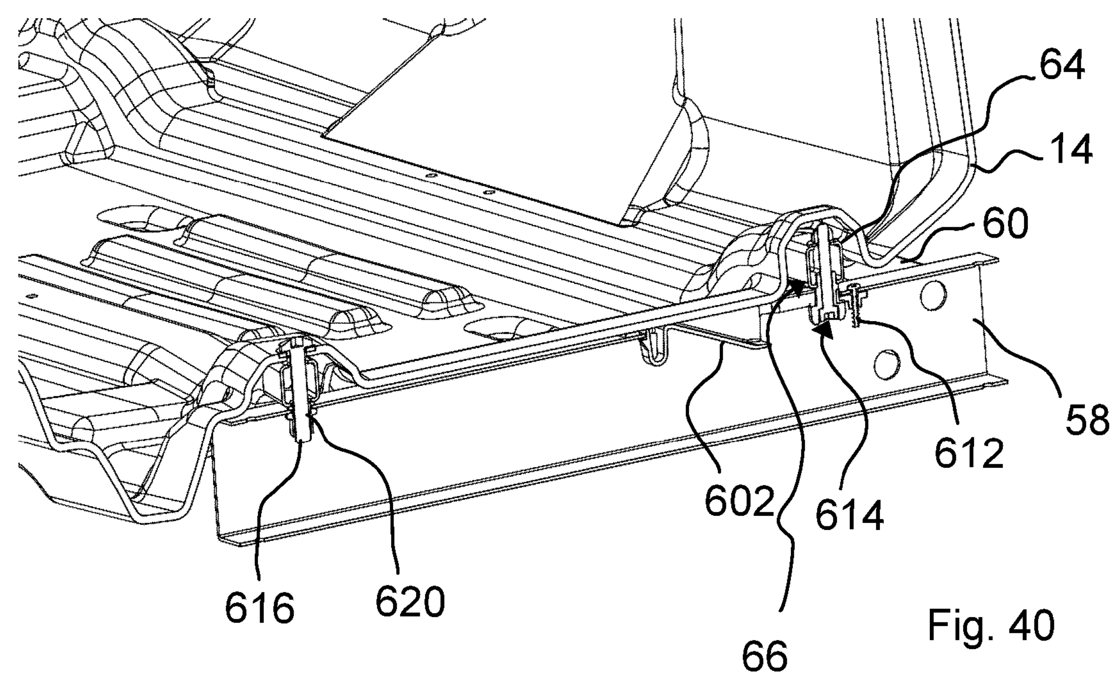
FIG. 40 illustrates how the first wall element of the further embodiment of the load carrier system is secured to the base.

FIG. 39 illustrates the load carrier 10 attached to the base 14 in a sectional view. The screw element 614 is arranged in a most forward position in the second section of the receiving element 602, wherein the small opening 606 prevents upward motion and thus detachment of the screw element 614 and the load carrier 10 from the receiving element 602. FIG. 40 shows in a further sectional view that the screw 616 has been engaged to the screw hole 618 of the bar 58, thus preventing backward movement of the load carrier 10 and the screw element 614 relative to the base 12. Hence, the screw 616 prevents the screw element 614 from being moved to the second section of the receiving element 602 with the wide opening 608, which would allow disengaging the screw element 614 from the receiving element 602.

As can also be seen in FIG. 39, the screw element 614 comprises a screw 622 and a sleeve element 624 arranged at a head section of the screw element 614. The sleeve element 624 provides a large cross-section for the head section of the screw element 614, facilitating retainment in the receiving element 602. Further, the sleeve element 624 may protect the receiving element 602 from damage, for example by being formed from a plastic material instead of being metallic and/or by having rounded edges. Further, the sleeve element 624 allows the use of a cost-effective standard screw 622.

The invention claimed is:

1. A load carrier system for a vehicle comprising:
- a base configured to couple to a towing device of the vehicle; and
- a load carrier mounted to the base,
- wherein a bottom surface of the load carrier is inclined at a first angle relative to a horizontal plane and configured to reduce aerodynamic drag of the vehicle with the load carrier mounted to the vehicle as compared to the vehicle without the load carrier mounted to the vehicle, and
- wherein a portion of the load carrier is arranged below the towing device of the vehicle.

2. The load carrier system according to claim 1, wherein the load carrier tapers from a larger front end towards a smaller rear end.

3. The load carrier system according to claim 1, wherein the first angle of the bottom surface is inclined by about 5° to about 20° relative to the horizontal plane when the load carrier is mounted to the vehicle.

4. The load carrier system according to claim 3, wherein the first angle of the bottom surface is inclined by about 10° to about 15° relative to the horizontal plane.

5. The load carrier system according to claim 1, wherein a height of the load carrier tapers from a larger front end towards a smaller rear end.

6. The load carrier system according to claim 5, wherein a largest height of the load carrier at the front end is about 10 percent to about 50 percent larger than a smallest height of the load carrier at the rear end.

7. The load carrier system according to claim 1, wherein a width of the load carrier tapers from a larger front end towards a smaller rear end.

8. The load carrier system according to claim 7, wherein a largest width of the load carrier at the front end is about 5 percent to about 50 percent larger than a smallest width of the load carrier at the rear end.

9. The load carrier system according to claim 1, wherein the load carrier further comprises an attachment for a rear light,
- wherein a top exterior surface of the load carrier extends backwards beyond the rear light or wherein the rear light is arranged recessed in the load carrier exterior surface, or both.

10. The load carrier system according to claim 1, wherein a forward facing side of the load carrier is curved in a top-view of the load carrier with a left end section of the forward facing side extending more forward than a middle section of the forward facing side of the load carrier.

11. The load carrier system according to claim 1, wherein the load carrier further comprises a first wall element and a second wall element, wherein the first and second wall elements are moveable relative to each other between a closed state and an open state.

12. The load carrier system according to claim 11, wherein the load carrier is configured to attach to the base with an interlocking engagement of an attachment element.

13. The load carrier system according to claim 12, wherein the attachment element is a protruding part of the interlocking engagement, or the attachment element is a screw element with a head protruding from a bottom of the load carrier, or both.

14. The load carrier system according to claim 13, wherein the attachment element is a bayonet joint or keyhole joint.

15. The load carrier system according to claim 1, wherein a portion of a top forward corner of the load carrier comprises a countersunk region configured to increase clearance between a trunk of the vehicle and the load carrier when the load carrier is mounted to the vehicle.

16. The load carrier system according to claim 1, wherein the load carrier further comprises a bottom portion comprising an upper perimeter and a lid coupled to the bottom portion, and wherein the upper perimeter is inclined relative to the horizontal plane when the base is coupled to the towing device of the vehicle.

17. The load carrier system according to claim 1, wherein the load carrier further comprises a left side and a right side, and wherein the left side extends at an angle relative to a longitudinal axis extending in the direction of travel of the vehicle, and the right side extends at an angle relative to the longitudinal axis such that a width of the load carrier tapers from a larger front end towards a smaller rear end.

18. A load carrier system for a vehicle comprising:

a base; and a load carrier, wherein the load carrier is configured to mount to a rear of the vehicle via the base, and wherein a countersunk region is formed in a top surface and a forward surface of the load carrier such that a left end section of a forward facing side or a right end section of the forward facing side, or both, are arranged closer to a rear of the vehicle when the load carrier is mounted to the vehicle than a middle section of the forward facing side of the load carrier.

19. The load carrier system of claim 18, wherein the load carrier comprises a lid and a bottom portion, wherein the countersunk region is formed in the lid, and wherein the countersunk region extends from the lid into a front surface of the bottom portion.

20. A load carrier system for a vehicle comprising:

a base; and a load carrier, wherein the load carrier is configured to mount to a towing device of the vehicle via the base, and wherein a curved shape of a forward facing side extending from a left side to a right side of the load carrier reduces an average distance of the forward facing side of the load carrier to a rear of the vehicle as the forward side extends from the left side to the right side, when the load carrier is mounted to the towing device of the vehicle as compared to a load carrier with a substantially forward facing side that is substantially straight in a top view.

21. A load carrier system for a vehicle comprising:

a base configured to couple to a towing device of the vehicle; and a load carrier comprising:

a bottom surface coupled to the base and inclined relative to a horizontal plane when the base is coupled to the towing device of the vehicle, a bottom portion comprising an upper perimeter, and a lid coupled to the bottom portion, wherein the upper perimeter is inclined relative to the horizontal plane when the base is coupled to the towing device of the vehicle.

22. The load carrier system according to claim 21, wherein the base comprises a plurality of receiving elements, and wherein a plurality of recesses are formed in a bottom surface of the bottom portion of the load carrier and configured to receive the receiving elements.

23. The load carrier system according to claim 21, wherein the lid comprises a top surface having a portion extending at a declining angle relative to the bottom surface such that the top surface tapers toward the bottom surface.

24. The load carrier system according to claim 21, wherein a portion of the load carrier is arranged below the towing device of the vehicle.

25. The load carrier system according to claim 21, wherein the load carrier further comprises a left side and a right side, and wherein the left side extends at an angle relative to a longitudinal axis extending in the direction of travel of the vehicle, and the right side extends at an angle relative to the longitudinal axis such that a width of the load carrier tapers from a larger front end towards a smaller rear end.

26. A load carrier system for a vehicle comprising:

a base configured to couple to a towing device of the vehicle; and a load carrier comprising a forward side, a left side, and a right side, wherein the forward side is spaced apart from a rear-most end of the vehicle, wherein the left side extends at an angle relative to a longitudinal axis extending in the direction of travel of the vehicle, and the right side extends at an angle relative to the longitudinal axis such that a width of the load carrier tapers from a larger front end towards a smaller rear end.

27. The load carrier system according to claim 26, wherein a bottom surface of the load carrier is inclined at an angle relative to a horizontal plane, and wherein a portion of the load carrier is arranged below the towing device of the vehicle.

28. The load carrier system according to claim 26, wherein the load carrier further comprises a bottom portion comprising an upper perimeter and a lid coupled to the bottom portion, and wherein the upper perimeter is inclined relative to a horizontal plane when the base is coupled to the towing device of the vehicle.

* * * * *